United States Patent
Wang et al.

(10) Patent No.: US 12,521,355 B2
(45) Date of Patent: Jan. 13, 2026

(54) NANOPARTICLE SYSTEMS FOR TARGETED DELIVERY OF CRISPR/Cas13 AND METHODS OF USING SAME

(71) Applicants: DUKE UNIVERSITY, Durham, NC (US); OHIO STATE INNOVATION FOUNDATION, Columbus, OH (US)

(72) Inventors: Qianben Wang, Durham, NC (US); Zhifen Cui, Durham, NC (US); Yizhou Dong, Columbus, OH (US)

(73) Assignees: Duke University, Durham, NC (US); Ohio State Innovation Foundation, Columbus, OH (US)

( * ) Notice: Subject to any disclaimer, the term of this patent is extended or adjusted under 35 U.S.C. 154(b) by 1030 days.

(21) Appl. No.: 17/626,482

(22) PCT Filed: Jul. 13, 2020

(86) PCT No.: PCT/US2020/041857
§ 371 (c)(1),
(2) Date: Jan. 11, 2022

(87) PCT Pub. No.: WO2021/011504
PCT Pub. Date: Jan. 21, 2021

(65) Prior Publication Data
US 2022/0347115 A1 Nov. 3, 2022

Related U.S. Application Data

(60) Provisional application No. 62/873,295, filed on Jul. 12, 2019.

(51) Int. Cl.
| | | |
|---|---|---|
| *A61K 9/51* | (2006.01) | |
| *A61K 9/00* | (2006.01) | |
| *A61K 31/7105* | (2006.01) | |
| *A61K 38/46* | (2006.01) | |
| *A61P 13/08* | (2006.01) | |
| *A61P 31/14* | (2006.01) | |
| *A61P 35/00* | (2006.01) | |
| *B82Y 5/00* | (2011.01) | |
| *C12N 9/22* | (2006.01) | |
| *C12N 15/113* | (2010.01) | |
| *C12N 15/67* | (2006.01) | |
| *C12N 15/85* | (2006.01) | |
| *C12N 15/88* | (2006.01) | |

(52) U.S. Cl.
CPC ........ *A61K 9/5153* (2013.01); *A61K 31/7105* (2013.01); *A61K 38/465* (2013.01); *A61P 13/08* (2018.01); *A61P 31/14* (2018.01); *A61P 35/00* (2018.01)

(58) Field of Classification Search
None
See application file for complete search history.

(56) References Cited

U.S. PATENT DOCUMENTS

| | | | |
|---|---|---|---|
| 11,007,187 B1* | 5/2021 | Väänänen | ............ A61K 9/0043 |
| 2019/0002875 A1 | 1/2019 | Cheng et al. | |
| 2019/0002889 A1 | 1/2019 | Cheng et al. | |
| 2019/0010492 A1* | 1/2019 | Wang | ...................... A61P 35/00 |
| 2019/0153412 A1 | 5/2019 | Zhang et al. | |
| 2019/0169595 A1 | 6/2019 | Hsu et al. | |
| 2019/0382759 A1* | 12/2019 | Nelles | ................ C12N 15/1138 |
| 2020/0248169 A1* | 8/2020 | Zhang | .................... C12N 15/10 |

FOREIGN PATENT DOCUMENTS

WO 2018172556 A1 9/2018

OTHER PUBLICATIONS

Cho, et al., "Lecithin nano-liposomal particle as a CRISPR/Cas9 complex delivery system for treating type 2 diabetes", J. Nanobiotech; Jan. 29, 2019, vol. 17:19, p. 1-12.
Yan, et al., "Cas13d is a Compact RNA-Targeting Type VI CRISPR Effector Positively Modulated by a WYL—Domain—Containing Accessory Protein" Mol. Cell.; Apr. 19, 2018, vol. 70; p. 327-339.
International Search Report and Written Opinion mailed Oct. 5, 2020 in corresponding International Patent Application No. PCT/US2020/041857.
Sun W., et al., "Self-Assembled DNA Nanoclews for the Efficient Delivery of CRISPR-Cas9 for Genome Editing," Angewandte Chemie, Oct. 5, 2015, vol. 54, No. 41, 13 pages.
Tang L., et al., "Targeting Tumor Vasculature with Aptamer-Functionalized Doxorubicin-Polylactide Nanoconjugates for Enhanced Cancer Therapy," ACS Nano, May 26, 2015, vol. 9, No. 5, pp. 5072-5081.
Thomas C.E., et al., "Progress and Problems with the Use of Viral Vectors for Gene Therapy," Nature Reviews Genetics, May 2003, vol. 4, No. 5, pp. 346-358.
Tong S., et al., "Engineered Materials for in Vivo Delivery of Genome-Editing Machinery," Nature Reviews Materials, Nov. 2019, vol. 04, 26 pages.
Udager A.M., et al., "Molecular Biomarkers in the Clinical Management of Prostate Cancer," Cold Spring Harbor Perspectives in Medicine, Nov. 1, 2018, vol. 08, No. 11, Article a030601, pp. 1-20.
Wang H., et al., "CCI-779 Inhibits Cell-Cycle G2-M Progression and Invasion of Castration-Resistant Prostate Cancer via Attenuation of UBE2C Transcription and mRNA Stability," Cancer Research, Jul. 15, 2011, vol. 71, No. 14, pp. 4866-4876.
Watson P.A., et al., "Emerging Mechanisms of Resistance to Androgen Receptor Inhibitors in Prostate Cancer," Nature Reviews Cancer, Dec. 2015, vol. 15, No. 12, pp. 701-711.

(Continued)

*Primary Examiner* — Manjunath N Rao
*Assistant Examiner* — Jae W Lee
(74) *Attorney, Agent, or Firm* — POLSINELLI PC

(57) ABSTRACT

The present application relates to nanoparticles for the targeted delivery of CRISPR/Cas13 systems, and their therapeutic use to treat diseases and disorders such as prostate cancer and COVID-19.

20 Claims, 11 Drawing Sheets

Specification includes a Sequence Listing.

(56) References Cited

OTHER PUBLICATIONS

Xu C., et al., "Targeting of NLRP3 Inflammasome with Gene Editing for the Amelioration of Inflammatory Diseases," Nature Communication, Oct. 5, 2018, vol. 9, No. 1, Article 4092, pp. 1-14.
Ye J., et al., "CPP-Assisted Intracellular Drug Delivery, What Is Next?," International Journal of Molecular Sciences, Nov. 14, 2016, vol. 17, No. 11, Article 1892, pp. 1-16.
Yuan X., et al., "Androgen Receptor Functions in Castration-Resistant Prostate Cancer and Mechanisms of Resistance to New Agents Targeting the Androgen Axis," Oncogene, May 29, 2014, vol. 33, No. 22, 26 pages.
Zhou P., et al., "A Pneumonia Outbreak Associated with a New Coronavirus of Probable Bat Origin," Nature, Feb. 3, 2020, vol. 579, pp. 270-273.
Malik A, et al.: "A New Era of Prostate Cancer Precision Medicine", Frontiers in Oncology, vol. 9, Nov. 26, 2019.
Zhen S, et al.: "Targeted Delivery of CRISPR/Cas9 to prostate cancer by modified gRNA using a flexible aptamer- cationic liposome", Onctarget, vol. 8, No. 6, Feb. 7, 2017.
Abbott TR, et al.: "Development of CRISPR as an Antiviral Strategy to Combat SARS-CoV-2 and Influenza", Cell, vol. 181, No. 4, May 14, 2020.
Extended European Search Report mailed Jun. 27, 2023 for EP application No. 20840456.6—Applicant: Duke University and Ohio State Innovation Foundation (12 pages).
Alexis F., et al., "New Frontiers in Nanotechnology for Cancer Treatment," Urologic Oncology, Jan.-Feb. 2008, vol. 26, Issue. 01, pp. 74-85.
Anonymous, "Keep Off-Target Effects in Focus," Nature Medicine, vol. 24, Aug. 6, 2018, p. 1081.
Antonarakis E.S., et al., "AR-V7 and Resistance to Enzalutamide and Abiraterone in Prostate Cancer,"The New England Journal of Medicine, Sep. 11, 2014, vol. 371, No. 11, pp. 1-12.
Aragon-Ching J.B., "Darolutamide: A Novel Androgen-Signaling Agent in Nonmetastatic Castration-Resistant Prostate Cancer," Asian Journal of Andrology, Jan.-Feb. 2020, vol. 22, No. 1, pp. 76-78.
Attard G., et al., "Selective Inhibition of CYP17 with Abiraterone Acetate is Highly Active in the Treatment of Castration-Resistant Prostate Cancer,"Journal of Clinical Oncology, Aug. 10, 2009, vol. 27, No. 23, pp. 3742-3748.
Barrangou R., et al., "Applications of CRISPR Technologies in Research and Beyond," Nature Biotechnology, 2016, vol. 34, No. 9, pp. 933-941.
Bigaeva E., et al., "Assessment of the Developmental Toxicity of Nanoparticles in an Ex Vivo 3D Model, the Murine Limb Bud Culture System," Nanotoxicology, 2015, vol. 9, No. 6, pp. 780-791.
Buttigliero C., et al., "Understanding and Overcoming the Mechanisms of Primary and Acquired Resistance to Abiraterone and Enzalutamide in Castration Resistant Prostate Cancer,"Cancer Treatment Reviews, Dec. 2015, vol. 41, No. 10, pp. 884-892.
Cato L., et al., "ARv7 Represses Tumor-Suppressor Genes in Castration-Resistant Prostate Cancer," Cancer Cell, Mar. 18, 2019, vol. 35, No. 3, pp. 401-413.
Chen Z., et al., "Diverse AR-V7 Cistromes in Castration-Resistant Prostate Cancer are Governed by HoxB13," Proceedings of the National Academy of Sciences of the United States of America, Jun. 26, 2018, vol. 115, No. 26, pp. 6810-6815.
Chen Z., et al., "Ligand-Dependent Genomic Function of Glucocorticoid Receptor in Triple-Negative Breast Cancer," Nature Communication, Sep. 16, 2015, vol. 6, pp. 1-8.
Chen Z., et al., "Phospho-MED1-Enhanced UBE2C Locus Looping Drives Castration-Resistant Prostate Cancer Growth," EMBO Journal, May 10, 2011, vol. 30, No. 12, pp. 2405-2419.
Cheng Q., et al., "Selective ORgan Targeting (SORT) Nanoparticles for Tissue Specific mRNA delivery and CRISPR/Cas Gene Editing," Nature Nanotechnology, Apr. 6, 2020, vol. 15, No. 4, pp. 313-320.
Colella P., et al., "Emerging Issues in AAV-Mediated In Vivo Gene Therapy," Molecular Therapy: Methods and Clinical Development, Dec. 1, 2017, vol. 08, pp. 87-104.
Cui Z., et al., "Nanodiamond Autophagy Inhibitor Allosterically Improves the Arsenical-Based Therapy of Solid Tumors," Nature Communications, Oct. 2018, vol. 9, No. 1, pp. 1-11.
De Bono J.S., et al., "Abiraterone and Increased Survival in Metastatic Prostate Cancer," The New England Journal of Medicine, May 26, 2011, vol. 364, No. 21, pp. 1995-2005.
Debes J.D., et al., "Mechanisms of Androgen-Refractory Prostate Cancer," The New England Journal of Medicine, Oct. 7, 2004, vol. 351, No. 15, pp. 1-3.
Eoh J., et al., "Biomaterials as Vectors for the Delivery of CRISPR-Cas9," Biomaterials Science, Mar. 26, 2019, vol. 7, No. 4, pp. 1240-1261.
Farokhzad O.C., et al., "Targeted Nanoparticle-Aptamer Bioconjugates for Cancer Chemotherapy in Vivo," Proceedings of the National Academy of Sciences of the United States of America, Apr. 18, 2006, vol. 103, No. 16, pp. 6315-6320.
Feldman B.J., et al., "The Development of Androgen-Independent Prostate Cancer," Nature Reviews Cancer, Oct. 1, 2001, vol. 1, No. 1, pp. 34-45.
Fizazi K., et al., "Darolutamide in Nonmetastatic, Castration-Resistant Prostate Cancer," The New England Journal of Medicine, Mar. 28, 2019, vol. 380, No. 13, pp. 1235-1246.
Fu Y., et al., "High-Frequency Off-Target Mutagenesis Induced by CRISPR-Cas Nucleases in Human Cells," Nature Biotechnology, Jun. 23, 2013, vol. 31, pp. 822-826.
Gorges T.M., et al., "Heterogeneous PSMA Expression on Circulating Tumor Cells: A Potential Basis for Stratification and Monitoring of PSMA-Directed Therapies in Prostate Cancer," Oncotarget, Jun. 7, 2016, vol. 07, No. 23, pp. 34930-34941.
Gref R., et al., "Biodegradable Long-Circulating Polymeric Nanospheres," Science, Mar. 18, 1994, vol. 263, No. 5153, pp. 1600-1603.
Gref R., et al., "Poly(ethylene glycol)-Coated Nanospheres: Potential Carriers for Intravenous Drug Administration," Pharmaceutical Biotechnology, 1997, vol. 10, pp. 167-198.
Hardee C.L., et al., "Advances in Non-Viral DNA Vectors for Gene Therapy," Genes (Basel), Feb. 10, 2017, vol. 3, No. 2, pp. 1-22.
Heinlein C.A., et al., "Androgen Receptor in Prostate Cancer," Endocrine Reviews, Apr. 2004, vol. 25, No. 2, pp. 276-308.
Hoffmann M., et al., "A Multibasic Cleavage Site in the Spike Protein of SARS-CoV-2 is Essential for Infection of Human Lung Cells," Molecular Cell, May 21, 2020, vol. 78, No. 4, pp. 779-784.
Hoffmann M., et al., "SARS-CoV-2 Cell Entry Depends on ACE2 and TMPRSS2 and is Blocked by a Clinically Proven Protease Inhibitor," Cell, Apr. 16, 2020, vol. 181, No. 2, pp. 271-280.
Hoti N., et al., "Proteomics Analyses of Prostate Cancer Cells Reveal Cellular Pathways Associated with Androgen Resistance," Proteomics, Mar. 2017, vol. 17, No. 6, pp. 1-22.
Hu R., et al., "Distinct Transcriptional Programs Mediated by the Ligand-Dependent Full-Length Androgen Receptor and its Splice Variants in Castration-Resistant Prostate Cancer," Cancer Research, Jul. 15, 2012, vol. 72, No. 14, pp. 3457-3462.
Imai Y., et al., "Angiotensin-Converting Enzyme 2 Protects from Severe Acute Lung Failure," Nature, Jul. 7, 2005, vol. 436, pp. 112-116.
Islam M.A., et al., "Restoration of Tumour-Growth Suppression in Vivo via Systemic Nanoparticle-Mediated Delivery of PTEN mRNA," Nature Biomedical Engineering, Sep. 17, 2018, vol. 2, 18 pages.
Iwata-Yoshikawa N., et al., "TMPRSS2 Contributes to Virus Spread and Immunopathology in the Airways of Murine Models after Coronavirus Infection," Journal of Virology, Mar. 5, 2019, vol. 93, Issue 6, Article e01815-e01818, pp. 1-15.
Jemaa A.B., et al., "A Novel Regulation of PSMA and PSA expression by Q640X AR in 22Rv1 and LNCaP Prostate Cancer Cells," Cell Biology International, May 2013, vol. 37, No. 5, pp. 464-470.
Kato M., et al., "Cotargeting Androgen Receptor Splice Variants and mTOR Signaling Pathway for the Treatment of Castration-Resistant Prostate Cancer," Clinical Cancer Research, Jun. 1, 2016, vol. 22, No. 11, pp. 2744-2754.
Kim T. S., et al., "Phenotypic Analysis of Mice Lacking the Tmprss2-Encoded Protease," Molecular and Cellular Biology, Feb. 2006, vol. 26, No. 3, pp. 965-975.

(56) References Cited

OTHER PUBLICATIONS

Knudsen K.E., et al., "Partners in Crime: Deregulation of AR Activity and Androgen Synthesis in Prostate Cancer," Trends in Endocrinology & Metabolism, May 2010, vol. 21, No. 5, pp. 315-324.
Konermann S., et al., "Transcriptome Engineering with RNA-Targeting Type VI-D CRISPR Effectors," Cell, Mar. 2018, vol. 173, No. 3, pp. 665-676.
Kuba K., et al., "A Crucial Role of Angiotensin Converting Enzyme 2 (ACE2) in SARS Coronavirus-Induced Lung Injury," Nature Medicine, Jul. 7, 2005, vol. 11, pp. 875-879.
Lee J.K., et al., "Systemic Surfaceome Profiling Identifies Target Antigens for Immune-Based Therapy in Subtypes of Advanced Prostate Cancer," Proceedings of the National Academy of Sciences of the United States of America, May 8, 2018, vol. 115, No. 19, pp. E4473-E4482.
Lee K., et al., "Nanoparticle Delivery of Cas9 Ribonucleoprotein and Donor DNA in Vivo Induces Homology-Directed DNA Repair," Nature Biomedical Engineering, 2017, vol. 1, pp. 889-901.
Liu W., et al., "Fluorescent Thienothiophene-Containing Squaraine Dyes and Threaded Supramolecular Complexes with Tunable Wavelengths between 600(-)800 nm," Molecules, Sep. 1, 2018, vol. 23, No. 9, Article 2229, pp. 1-14.
Nimjee S. M., et al., "Aptamers: an Emerging Class of Therapeutics," Annual Review of Medicine, 2005, vol. 56, pp. 555-583.
Palapattu G.S., "Commentary on "AR-V7 and Resistance to Enzalutamide and Abiraterone in Prostate Cancer,"" The New England Journal of Medicine, 2014, vol. 371, No. 11, pp. 1028-1038.
Ryan C.J., et al., "Abiraterone in Metastatic Prostate Cancer without Previous Chemotherapy," The New England Journal of Medicine, Jan. 10, 2013, vol. 368, No. 2, pp. 1-11.
Scher H.I., et al., "Increased Survival with Enzalutamide in Prostate Cancer after Chemotherapy," The New England Journal of Medicine, Sep. 27, 2012, vol. 367, No. 13, pp. 1187-1197.
Shang J., et al., "Cell Entry Mechanisms of SARS-COV-2," Proceedings of the National Academy of Sciences of the United States of America, May 26, 2020, vol. 117, No. 21, pp. 11727-11734.
Siegel R.L., et al., "Cancer Statistics," Cancer Journal for Clinicians, 2019, vol. 69, No. 1, pp. 07-34.
Sigoillot F.D., et al., "A Bioinformatics Method Identifies Prominent off-Targeted Transcripts in RNAi Screens," Nature Methods, Feb. 19, 2012, vol. 9, No. 4, 15 pages.

\* cited by examiner

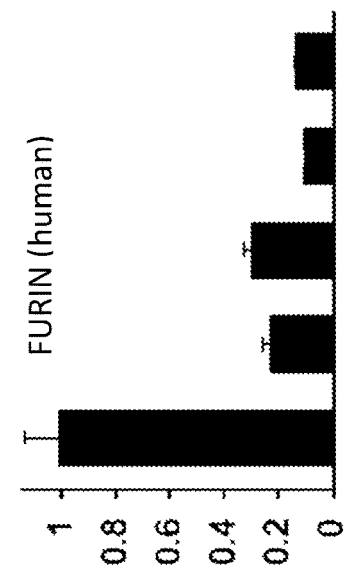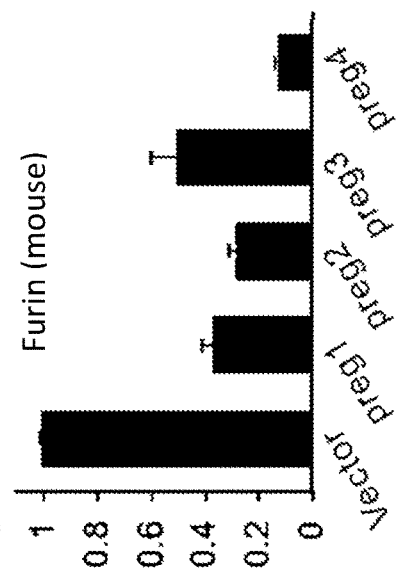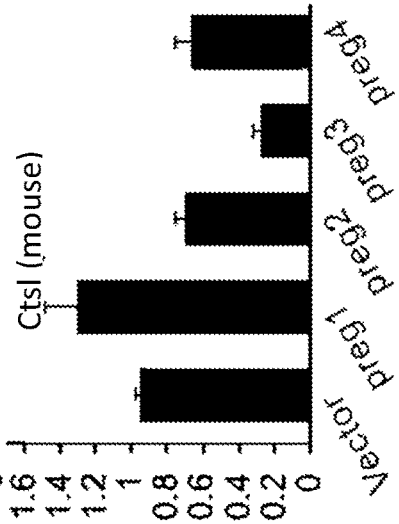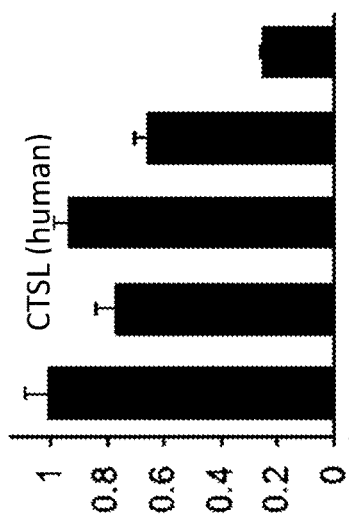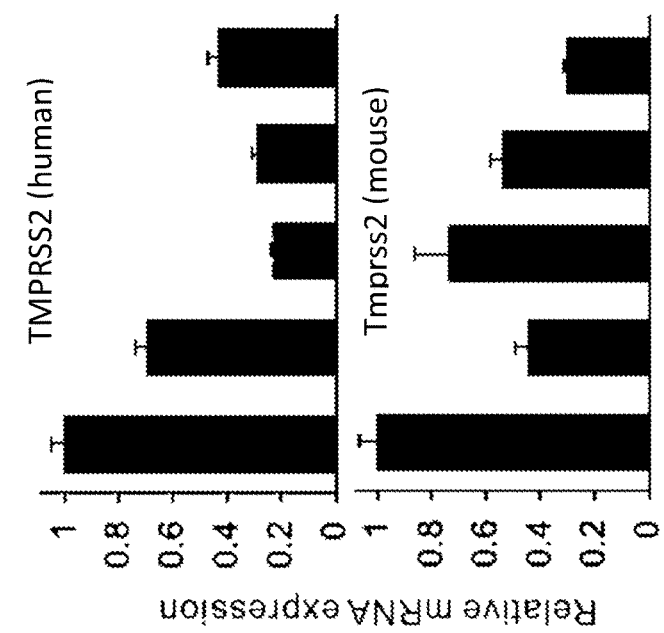

NANOPARTICLE SYSTEMS FOR TARGETED DELIVERY OF CRISPR/Cas13 AND METHODS OF USING SAME

CROSS REFERENCE TO RELATED APPLICATIONS

This application is a U.S. national phase application under 35 U.S.C. § 371 of International Application No. PCT/US2020/041857, filed on Jul. 13, 2020, which claims priority to U.S. Provisional Patent Application Ser. No. 62/873,295, filed Jul. 12, 2019, the contents of each of which are hereby incorporated by reference in their entirety.

STATEMENT REGARDING FEDERALLY SPONSORED RESEARCH OR DEVELOPMENT

This application was made with United States government support under Federal Grant No. CA014236 awarded by the NIH. The United States government has certain rights in this invention.

BACKGROUND OF THE INVENTION

Incorporation by Reference of Sequence Listing Provided Electronically

This application is being filed electronically via EFS-Web and includes an electronically submitted Sequence Listing in .txt format. The .txt file contains a sequence listing entitled "20-1068-WO_SEQ-LISTING_ST25.txt" created on Jul. 13, 2022 and is 60 kilobytes in size. The Sequence Listing contained in this .txt file is part of the specification and is hereby incorporated by reference herein in its entirety.

Field of the Invention

The present application relates to nanoparticles for the targeted delivery of CRISPR/Cas13 systems, and their therapeutic use to treat diseases and disorders such as prostate cancer and COVID-19.

Description of the Related Art

Androgen deprivation therapy is an effective strategy to control androgen-dependent prostate cancer (ADPC) progression. However, the evolution of prostate cancer from an androgen-dependent state (ADPC) to CRPC marks the lethal phase in the progression of the disease (Debes & Tindall N. Engl. J. Med. 351: 1488-1490 (2004)). Next generation androgen receptor (AR)-targeted drugs, including abiraterone acetate (Attard et al. *J. Clin. Oncol.* 27: 3742-3748 (2009); Bono et al. *N. Engl. J. Med.* 364: 1995-2005 (2011); Ryan *N. Engl. J. Med.* 368: 138-148 (2013)), enzalutamide (Tran et al. *Science* 324: 787-790 (2009); Scher et al. *N. Engl. J. Med.* 367: 1187-1197 (2012)), and darolutamide (Fizazi et al. *N. Engl. J. Med.* 380: 1235-1246 (2019)) have recently demonstrated strong anti-cancer activity and initial clinical benefit. However, these agents have not vastly improved overall survival in CRPC patients, due to the rapid development of resistance (Yuan et al. *Oncogene* 33: 2815-2825 (2014); Watson et al. *Nat. Rev. Cancer* 15: 701-711 (2015); Aragon-Ching, *Asian J Androl.*, doi:10.4103/aja.aja_52_19 (2019)). These limited therapeutic options and the inability to clinically counteract other driving transcription factors (TFs) for CRPC demonstrate a need for alternative treatment for advanced prostate cancer.

The emergence of SARS-coronavirus 2 (SARS-CoV-2) has created a global health crisis for which successful treatment has been elusive. Recent studies have demonstrated that SARS-CoV-2 relies on certain host proteases, including TMPRSS2 and Cathepsin L, for S protein priming. (Hoffmann et al. *Cell* 181: 271-280 (2020); Zhou et al. *Nature* 579: 270-273 (2020)). Additionally, recent studies found that lung cell entry of SARS-CoV-2 but not SARS-CoV is pre-activated by the proprotein convertase FURIN. (Shang et al. *PNAS* 117: 11727-11734 (2020); Hoffmann et al. *Mol. Cell* 78: 779-784 (2020)). Accordingly, disruption of the relevant host proteases represents a novel therapeutic pathway toward the treatment of COVID-19.

Gene therapy is a critical alternative strategy for targeting not only AR, but also other undruggable oncogenic transcription factors such as HoxB13, FoxA1, FoxA2, and AR-V7 in CRPC, as well as other diseases like COVID-19. While CRISPR/Cas9 has been a powerful toolbox for targeted gene editing in various cell types and organisms (Barrangou et al., *Nat. Biotechnol.*, 34: 933-941 (2016)), unwanted DNA changes caused by CRISPR/Cas9 gene editing is a major concern. The RNA-editing CRISPR/Cas13d system can knock down RNA with high specificity without altering the genome and without the widespread off-target effects associated with RNA interference (RNAi) strategies due to their key roles in endogenous processes (Konermann et al., *Cell*, 173: 665-676 (2018); Sigoillo et al., *Nat. Methods*, 9: 363-366 (2012)). While the small size of the Cas13d gene makes it easy to package into a low-capacity adeno-associated virus (AAV) vector, clinical application of AAV vectors is limited by mutagenesis, carcinogenesis, and other undesired consequences. (Colella et al. *Mol. Ther. Methods Clin. Dev.*, 8: 87-104 (2018); Thomas, et al. *Nat. Rev. Genet.*, 4: 346-358 (2003)).

Accordingly, there exists a need in the art for the safe and efficient delivery of the CRISPR/Cas13 system.

SUMMARY OF THE INVENTION

In a first aspect, the present invention provides a nanoparticle (NP) for targeted delivery of a CRISPR/Cas13 system comprising a nanoparticle carrier, a first nucleic acid sequence encoding a Cas13, and one or more additional nucleic acid sequences encoding direct repeat RNA sequences and one or more guide RNA or pre-guide RNA sequences. In one embodiment of this aspect of the invention, the Cas13 is Cas13d.

In one embodiment of the first aspect of the invention, the NP further comprises a cell penetrating peptide. In an additional embodiment of this aspect of the invention, the NP further comprises a nucleic acid aptamer immobilized on the surface of the NP. In a further embodiment of the first aspect of the invention, the aptamer targets certain prostate cancer cells.

In certain embodiments of the first aspect of the invention, the one or more additional nucleic acid sequences encoding DR RNA sequences and one or more guide RNA (gRNA) or pre-guide RNA (pre-gRNA) sequences encode gRNAs or pre-gRNAs to a prostate cancer associated transcription factor. In other embodiments of the first aspect of the invention, the one or more additional nucleic acid sequences encoding DR RNA sequences and one or more guide RNA (gRNA) or pre-guide RNA (pre-gRNA) sequences encode gRNAs or pre-gRNAs to a COVID-19 associated protein.

In a further embodiment of the first aspect of the invention, the NPs of the invention are formulated with SORT technology to be lung-, liver-, or spleen-selective.

In a second aspect, the present invention provides a composition comprising the NPs of the invention and a pharmaceutically acceptable carrier or excipient.

In a third aspect, the present invention provides a method of treating a subject with prostate cancer comprising administering to the subject a therapeutically effective amount of the NPs of the invention.

In a fourth aspect, the present invention provides a method of treating a subject with COVID-19 comprising administering to the subject a therapeutically effective amount of the NPs of the invention.

BRIEF DESCRIPTION OF THE DRAWINGS

The features, objects and advantages other than those set forth above will become more readily apparent when consideration is given to the detailed description below. Such detailed description makes reference to the following drawings, wherein:

FIG. 1A shows a graph illustrating mRNA knockdown through CasRx targeting of four endogenous transcripts. Each transcript is targeted with two guides and a non-targeting (NT) guide in 293FT cells (transcript levels are relative to NT guide control). FIG. 1B shows a graph representing mRNA knockdown through CasRx targeting of two additional genes, NF2 and HRAS, in 22RV1 (castration resistant prostate cancer (CRPC)) cells. Transcript levels are relative to NT guide control.

FIG. 2B shows a graph representing mRNA knockdown through CasRx targeting of HoxB13 using a single gRNA in 22RV1 cells.

FIG. 3A shows a diagram of an all-in-one hU6-pregRNAs-EF1α-CasRx-2AEGFP that can express CasRx and pre-gRNAs. FIG. 3B shows a graph representing mRNA knockdown through CasRx targeting of HoxB13 in 22RV1 cells using arrays of three pre-gRNAs. Transcript levels are relative to NT guide control.

FIG. 10A shows UCSC Genome Browser views of representative HoxB13 binding sites and ATAC-seq peaks, showing strong correlation between the two. FIG. 10B shows a correlation plot between HoxB13 binding signals and ATAC-seq signal.

FIGS. 11A-11F illustrate Cas13d-mediated mRNA knockdown of human and mouse transcripts for mediating SARS-CoV-2 cell entry. FIG. 11A shows graphs representing mRNA knockdown of human TMPRSS2 mRNA with four different pre-gRNAs, with preg2 showing the most effective knockdown. FIG. 11B shows graphs representing mRNA knockdown of murine Tmprss2 with four different pre-gRNAs, with preg4 showing the most effective knockdown. FIG. 11C shows graphs representing mRNA knockdown of human mRNA with four different pre-gRNAs, with preg4 showing the most effective knockdown CTSL. FIG. 11D shows graphs representing mRNA knockdown of murine Ctsl mRNA with four different pre-gRNAs, with preg3 showing the most effective knockdown. FIG. 11E shows graphs representing mRNA knockdown of human FURIN mRNA with four different pre-gRNAs, with preg3 showing the most effective knockdown. FIG. 11F shows graphs representing mRNA knockdown of murine Furin mRNA with four different pre-gRNAs, with preg4 showing the most effective knockdown. Transcript levels, for both figures, are relative to NT guide control.

DETAILED DESCRIPTION OF THE INVENTION

Figure 1A:
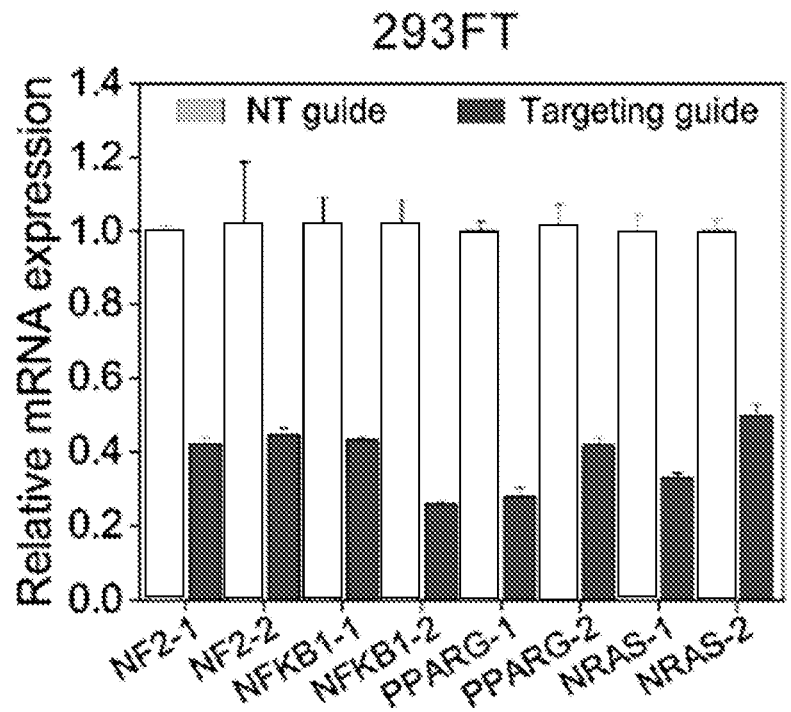
FIGS. 1A-1B illustrate the evaluation of the CRISPR/Cas13d-mediated gene knockdown system.

For the purposes of promoting an understanding of the principles of the present disclosure, reference will now be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Definitions

Articles "a" and "an" are used herein to refer to one or to more than one (i.e. at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of the terms "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

As used herein, the transitional phrase "consisting essentially of" (and grammatical variants) is to be interpreted as encompassing the recited materials or steps "and those that do not materially affect the basic and novel characteristic(s)" of the claimed invention. Thus, the term "consisting essentially of" as used herein should not be interpreted as equivalent to "comprising."

Moreover, the present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Recitation of ranges of values herein are merely intended to serve as a shorthand method of referring individually to each separate value falling within the range, unless otherwise-Indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure.

As used herein, "treatment," "therapy" and/or "therapy regimen" refer to the clinical intervention made in response to a disease, disorder or physiological condition manifested by a patient or to which a patient may be susceptible. The aim of treatment includes the alleviation or prevention of symptoms, slowing or stopping the progression or worsening of a disease, disorder, or condition and/or the remission of the disease, disorder or condition.

The term "effective amount" or "therapeutically effective amount" refers to an amount sufficient to effect beneficial or desirable biological and/or clinical results.

As used herein, the term "subject" and "patient" are used interchangeably herein and refer to both human and nonhuman animals. The term "nonhuman animals" of the disclosure includes all vertebrates, e.g., mammals and non-mammals, such as nonhuman primates, sheep, dog, cat, horse, cow, chickens, amphibians, reptiles, and the like.

Unless otherwise defined, all technical terms used herein have the same meaning as commonly understood by one of ordinary skill in the art to which this disclosure belongs.

Nanoparticles

The present invention advantageously provides nanoparticles that allow for the targeted delivery of a CRISPR/Cas13 system for gene therapy, which overcomes shortcomings of prior gene therapy methods such as unwanted DNA changes and difficulties in delivery associated with the use of CRISPR/Cas9 DNA systems, off target effects of interfering RNAs, and clinical shortcomings (e.g., mutagenesis, carcinogenesis) associated with the delivery of gene therapy tools using AAV vectors.

There are multiple subtypes within the Cas13 family, including at least Cas13a, Cas13b, Cas13c, and Cas13d. Of the subtypes, only Cas13d is small enough for in vivo delivery via an AAV vector. The NPs of the invention, however, are not limited in the same manner, and accordingly the present invention may advantageously be used with any subtype of Cas13, i.e. at least any of Cas13a, Cas13b, Cas13c, and Cas13d. Thus, unless otherwise apparent from the context, any reference to Cas13d within the disclosure is equally applicable to any other Cas13 subtype. It is to be understood then that, unless otherwise apparent from the context, the present disclosure and all inventive aspects disclosed herein are intended to, and do, encompass embodiments in which references to Cas13d are replaced with another Cas13 subtype as though so specifically stated.

Accordingly, in a first aspect, the present invention provides a nanoparticle (NP) comprising a nanoparticle carrier, a first nucleic acid sequence encoding a Cas13d, and one or more additional nucleic acid sequences encoding direct repeat (DR) RNA sequences and one or more guide RNA (gRNA) or pre-guide RNA (pre-gRNA) sequences.

As used herein, "a nanoparticle carrier" is any composition comprising one or more materials that can be formulated into nanoparticles that are capable of encapsulating or otherwise retaining (e.g. by adsorption or otherwise) the first and the one or more additional nucleic acid sequences. The NP carrier may be formulated out of any suitable material, including, but not limited to a polymer-lipid, a lipid (to form a lipid nanoparticle (LNP)), or gold. In certain embodiments, the NP carrier is a lipid.

The NPs may comprise a cationic cell penetrating peptide (cpp), examples of which include the transactivator of transcription peptide (TAT) and nuclear localization sequences (NLS). In vivo delivery of plasmid DNA, for example, can be hindered by systemic instability due to excessive size and negative charge. Accordingly, these cpps are used to stably condense plasmids or nucleic acids and deliver them into the nucleus.

The NPs of the invention may further comprise a nucleic acid aptamer (Apt) immobilized on the surface of the NP. The aptamer serves to achieve cell-specific targeting, including, but not limited to, targeting cancer cells, by recognizing certain cell membrane markers on the desired cells. For example, a prostate-specific membrane antigen (PSMA) aptamer may be utilized to recognize and target PSMA positive castration resistant prostate cancer (CRPC) cells. Similarly, the NPs may be prepared with an Apt to recognize and target neuroendocrine prostate cancer (NEPC) cells. Suitable aptamers for NEPC cell recognition include, but are not limited to, an NCAM1 aptamer, a CHGA aptamer, a SYP aptamer, a SNAP25 aptamer, or a CEACAM5 aptamer.

In this manner, the NPs of the invention have bi-specific targeting capabilities, i.e. they both target cells of interest by way of an Apt immobilized on the NP surface, and target particular transcription factors or other genes whose knockdown or downregulation is desired by way of the CRISPR/Cas13d system, i.e. the gRNA or pre-gRNA sequences.

The first nucleic acid sequence encoding a Cas13d may be a plasmid, or it may be an mRNA sequence. Similarly, the one or more additional nucleic acid sequences encoding DR RNA sequences and one or more gRNA or pre-gRNA sequences may be a plasmid, or may be an mRNA sequence. In certain embodiments, both the first nucleic acid sequence and the one or more additional nucleic acid sequences are a plasmid. In this embodiment, the first nucleic acid sequence and the one or more additional nucleic acid sequences may comprise separate plasmids, or they may comprise the same plasmid. In another embodiment, both the first nucleic acid sequence and the one or more additional nucleic acid sequences are an mRNA sequence. In yet a further embodiment, the first nucleic acid sequence is in the form of a plasmid and the one or more additional nucleic acid sequences are an mRNA sequence. In still yet a further embodiment, the first nucleic acid sequence is an mRNA sequence and the one or more additional nucleic acid sequences are a plasmid. Based on studies with Cas9, there may be certain advantages (faster gene editing kinetics and fewer off-target effects) to the co-delivery of the first nucleic acid sequence and the one or more additional nucleic acid sequences by mRNA rather than plasmids.

In certain embodiments, the NPs comprise a core encapsulating a plasmid encoding a Cas 13d and the one or more additional plasmids encoding DR RNA sequences and gRNA or pre-gRNA for the desired target, and a shell surrounding the core. Alternatively the core may encapsulate a plasmid that encodes both the first nucleic acid sequence and the one or more additional nucleic acid sequences. A cpp may be used to encapsulate the plasmids within the core. The cpp to nucleic acid weight ratio may be readily adjusted by one of skill in the art to a suitable level to keep the plasmids from leaching out of the encapsulated core. The core may comprise poly lactic-co-glycolic acid (PLGA), and the shell may comprise a polyethylene glycol (PEG). In certain embodiments, the PEG is carboxy-modified PEG, e.g. lipid-PEG-COOH. The lipid-PEG-COOH may be, for example, m-PEG-DSPE. PLGA and PEG have certain benefits for use with the invention in that they are FDA approved for therapeutic use.

The first nucleic acid sequence encoding a Cas13d may encode CasRx, a CRISPR/Cas13d from *Ruminococcus flavefaciens* strain XPD3002 optimized for human use and which has been used for programmable RNA knock down in human cells.

The one or more additional nucleic acid sequences encoding DR RNA sequences and gRNA or pre-gRNA for the desired target may comprise any suitable gRNA or pre-gRNA for that target, including traditionally "undruggable" oncogenic transcription factors. Specific sequences for use with the invention can be derived by one of skill in the art, and may include certain modifications to improve functionality, e.g. modifications to avoid degradation in vivo. Target regions having low secondary structure are ideal targets for gRNA or pre-gRNA. In certain embodiments of the invention, the gRNA or pre-gRNA targets prostate cancer associated transcription factors. In this embodiment, exemplary transcription factors include, but are not limited to, AR, AR-V7, HoxB13, FoxA1, FoxA2, and GATA2. The gRNA or pre-gRNA sequences of this embodiment may, for example, comprise any one of SEQ ID NOs: 1-4, 55-58, and 62 (HOXB13).

Recent studies have found that SARS-CoV-2 uses the host receptor ACE2 for cell entry and the serine protease TMPRSS2 and/or the cysteine protease Cathepsin L (CTSL) for S protein priming. Hoffmann et al. Cell 181: 271-280 (2020); Zhou et al. *Nature* 579: 270-273 (2020). Additionally, recent studies found that lung cell entry of SARS-CoV-2 but not SARS-CoV is pre-activated by the proprotein convertase FURIN. Shang et al. PNAS 117: 11727-11734 (2020); Hoffmann et al. *Mol. Cell* 78: 779-784 (2020)). Accordingly, in certain embodiments of the invention, the gRNA or pre-gRNA targets COVID-19 associated proteins including, but not limited to, TMPRSS2, Cathepsin L (CTSL), and Furin. The gRNA or pre-gRNA (preg) sequences of this embodiment may, for example, comprise the various pre-guide 1, pre-guide 2, pre-guide 3, and pre-guide 4 sequences as disclosed herein, infra, or any one of SEQ ID NOs: 5-8, 13-16, 63, and 65 (TMPRSS2), SEQ ID NOs: 9-12, 17-20, 64, and 66 (CTSL), and SEQ ID NOs: 21-24, 25-28, 68, and 69 (Furin).

The NPs of the invention may have a size of 10 nm to 900 nm, or any individual value or range of values within, inclusive of the upper and lower values, whether specifically recited or not. The NPs may, for example, have a size of 50-500 nm, of 100-200 nm, or 150-200 nm. The average size may be, for example, about 100 nm, about 125 nm, about 150 nm, about 175 nm, or about 200 nm.

The NPs of the invention may have a zeta potential of about 2.25 mV.

In embodiments where the first nucleic acid sequence and the one or more additional nucleic acid sequences are mRNA, the weight ratio of the first nucleic acid sequence to the additional nucleic acid sequences within the NPs may be between 1:1 and 1:2, inclusive, including about 1:1.5.

The NPs of the invention may have a cpp to plasmid or RNA weight ratio of about 0.1 to about 20, or any individual value or range of values within, inclusive of the upper and lower values, whether specifically recited or not. The NPs may, for example, have a cpp to plasmid or RNA weight ratio of about 1 to about 18, of about 3 to about 16, or of about 5 to about 15.6.

The NPs of the invention may be prepared by any suitable mechanism which can be readily ascertained by one of skill in the art. For example, the NPs may be prepared by self-assembled nano-precipitation. Apt may be immobilized on the NP surface by way of, e.g., carbodiimide coupling chemistry between the —COOH group of carboxy modified PEG and the amino group at the end of the PSMA Apt. Additionally, one of skill in the art can optimize the nano-precipitation time and weight ratio of cpp to plasmid/nucleic acid to help minimize any batch-to-batch variability.

In certain embodiments of the invention, the NPs may be formulated with selective organ targeting (SORT) technology, as disclosed in Cheng et al. Nat. Nanotechnol. 15: 313-320 (2020), the contents of which are incorporated herein by reference. Briefly, SORT enables the selective delivery of NPs comprising CRISPR/Cas9 to lungs, spleens and livers. While lipid NPs (LNPs) typically comprise ionizable cationic lipids, amphipathic phospholipids, cholesterol and PEG lipids, the addition of charge-modifying agents results in targeted delivery of the LNPs to particular organs. Formulating the NPs of the invention with SORT technology allows targeted therapeutic delivery to specific organs in need thereof, with minimal off-target effects. For example, NPs of the invention for the treatment of COVID-19 may be delivered to the lungs, whereas NPs of the invention for the treatment of prostate cancer patients having metastases to the lungs and/or liver may be delivered to the lungs and/or liver.

As used herein, "formulated with SORT technology" means the NP carrier is a LNP that comprises a charge-modifying agent in accordance with Cheng et al. The particular LNP formulation for use with the invention may be as disclosed in Cheng et al., or it may be a modification thereof within the purview of one of skill in the art. In certain embodiments of the invention, the NP carrier is formulated with SORT technology to be lung-selective, i.e. for the NPs to be delivered to the lungs. In this embodiment, the NP carrier may comprise 1,2-dioleoyl-3-trimethylammonium-propane (DOTAP), dimethyldioctadecylammonium (DDAB), or 1,2-dimyristoyl-sn-glycero-3-ethylphosphocholine (EPC). In a further embodiment, the NP carrier may be formulated with SORT technology to be liver-selective. In this embodiment, the NP carrier may comprise 1,2-dioleoyl-3-dimethylammonium-propane (DODAP) or 5A2-SC8. In another embodiment, the NP carrier may be formulated with SORT technology to be spleen-selective. In this embodiment, the NP carrier may comprise 1,2-dioleoyl-sn-glycero-3-phosphate (18PA), 1,2-dimyristoyl-snglycero-3- phosphate (14PA), or sn-(3-oleoyl-2-hydroxy)-glycerol-1-phospho-sn-3'-(1',2'-dioleoyl)-glycerol (18BMP).

In certain embodiments of the invention where the NPs are formulated with SORT technology to be lung-selective, the LNPs may comprise, in a non-limiting example, DLin-MC3-DMA, DSPC, cholesterol, DMG-PEG2000 and DOTAP in a 25/5/19.3/0.5/50 ratio.

Pharmaceutical Compositions Comprising and Administration of Nanoparticles

The NPs of the invention may be administered by any suitable technique, including, but not limited to oral, aerosol, intranasal, injection, systemic, parenteral, subcutaneous, intravenous, intramuscular, intrathecal, intraperitoneal and rectal. In certain embodiments, the NPs are administered by intravenous injection, intratumoral injection, or by oral administration.

The NPs may be administered at a frequency established based on NP half-life, which can readily be assessed by one of skill in the art.

The NPs provided herein can be administered to a subject, either alone or in combination with a pharmaceutically acceptable excipient and/or carrier, in an amount sufficient to induce an appropriate biological response (e.g., knock down of the desired target).

An effective amount of the NPs described herein may be given in one dose, but is not restricted to one dose. Thus, the administration can be two, three, four, five, six, seven, eight, nine, ten, eleven, twelve, thirteen, fourteen, fifteen, sixteen, seventeen, eighteen, nineteen, twenty, or more, administrations of the NPs. Where there is more than one administration in the present methods, the administrations can be spaced by time intervals of one minute, two minutes, three, four, five, six, seven, eight, nine, ten, or more minutes, by intervals of about one hour, two hours, three, four, five, six, seven, eight, nine, ten, 11, 12, 13, 14, 15, 16, 17, 18, 19, 20, 21, 22, 23, 24 hours, and so on. In the context of hours, the term "about" means plus or minus any time interval within 30 minutes. The administrations can also be spaced by time intervals of one day, two days, three days, four days, five days, six days, seven days, eight days, nine days, ten days, 11 days, 12 days, 13 days, 14 days, 15 days, 16 days, 17 days, 18 days, 19 days, 20 days, 21 days, and combinations thereof. The present disclosure is not limited to dosing intervals that are spaced equally in time, but encompass doses at non-equal intervals, such as a priming schedule consisting of administration at 1 day, 4 days, 7 days, and 25 days, just to provide a non-limiting example.

The NPs disclosed herein may be administered with a pharmaceutically or diagnostically acceptable excipient. A "pharmaceutically acceptable excipient" or "diagnostically acceptable excipient" includes but is not limited to, sterile distilled water, saline, phosphate buffered solutions, amino acid-based buffers, or bicarbonate buffered solutions. An excipient selected and the amount of excipient used will depend upon the mode of administration. Administration may in certain instances comprise an injection, infusion, or a combination thereof.

An effective amount for a particular subject/patient may vary depending on factors such as the condition being treated, the overall health of the patient, the route and dose of administration and the severity of side effects. Guidance for methods of treatment and diagnosis is available (see, e.g., Maynard, et al. (1996) A Handbook of SOPs for Good Clinical Practice, Interpharm Press, Boca Raton, Fla.; Dent (2001) Good Laboratory and Good Clinical Practice, Urch Publ., London, UK).

A dosing schedule of, for example, once/week, twice/week, three times/week, four times/week, five times/week, six times/week, seven times/week, once every two weeks, once every three weeks, once every four weeks, once every five weeks, and the like, is available for the present disclosure. The dosing schedules encompass dosing for a total period of time of, for example, one week, two weeks, three weeks, four weeks, five weeks, six weeks, two months, three months, four months, five months, six months, seven months, eight months, nine months, ten months, eleven months, and twelve months.

Provided are possible cycles of the above dosing schedules. The cycle can be repeated about, e.g., every seven days; every 14 days; every 21 days; every 28 days; every 35 days; 42 days; every 49 days; every 56 days; every 63 days; every 70 days; and the like. An interval of non-dosing can occur between a cycle, where the interval can be about, e.g., seven days; 14 days; 21 days; 28 days; 35 days; 42 days; 49 days; 56 days; 63 days; 70 days; and the like. In this context, the term "about" means plus or minus one day, plus or minus two days, plus or minus three days, plus or minus four days, plus or minus five days, plus or minus six days, or plus or minus seven days.

The NPs according to the present disclosure may also be administered with one or more additional therapeutic agents (e.g., small molecule therapeutics, anti-cancer agents, etc.). The NPs may be functionalized with the one or more additional therapeutic agents, or the one or more additional therapeutic agents may be co-administered with the NPs. Methods for co-administration with an additional therapeutic agent are well known in the art (Hardman, et al. (eds.) (2001) Goodman and Gilman's The Pharmacological Basis of Therapeutics, 10th ed., McGrawHill, New York, N.Y.; Poole and Peterson (eds.) (2001) Pharmacotherapeutics for Advanced Practice: A Practical Approach, Lippincott, Williams & Wilkins, Phila., Pa.; Chabner and Longo (eds.) (2001) Cancer Chemotherapy and Biotherapy, Lippincott, Williams & Wilkins, Phila., Pa.).

Co-administration need not refer to administration at the same time in an individual, but rather may include administrations that are spaced by hours or even days, weeks, or longer, as long as the administration of multiple therapeutic agents is the result of a single treatment plan. The co-administration may comprise administering the NPs according to the present disclosure before, after, or at the same time as the one or more additional therapeutic agents. In one exemplary treatment schedule, the NPs of the present disclosure may be given as an initial dose in a multi-day protocol, with one or more additional therapeutic agent given on later administration days; or the one or more additional therapeutic agents given as an initial dose in a multi-day protocol, with the NPs of the present disclosure given on later administration days. On another hand, one or more additional therapeutic agents and the NPs of the present disclosure may be administered on alternate days in a multi-day protocol. In still another example, a mixture of one or more additional therapeutic agents and the NPs of the present disclosure may be concurrently. This is not meant to be a limiting list of possible administration protocols.

An effective amount of a therapeutic agent is one that will knock down the target by at least 10%, more normally by at least 20%, most normally by at least 30%, typically by at least 40%, more typically by at least 50%, most typically by at least 60%, often by at least 70%, more often by at least 80%, and most often by at least 90%, conventionally by at least 95%, more conventionally by at least 99%, and most conventionally by at least 99.9% as compared to no treatment.

Specific dosing regimens are within the purview of one of ordinary skill in the art. Formulations of therapeutic agents may be prepared for storage by mixing with physiologically acceptable carriers, excipients, or stabilizers in the form of, e.g., lyophilized powders, slurries, aqueous solutions or suspensions (see, e.g., Hardman, et al. (2001) Goodman and Gilman's The Pharmacological Basis of Therapeutics, McGrawHill, New York, N.Y.; Gennaro (2000) Remington: The Science and Practice of Pharmacy, Lippincott, Williams, and Wilkins, New York, N.Y.; Avis, et al. (eds.) (1993) Pharmaceutical Dosage Forms: Parenteral Medications, Marcel Dekker, NY; Lieberman, et al. (eds.) (1990) Pharmaceutical Dosage Forms: Tablets, Marcel Dekker, NY; Lieberman, et al. (eds.) (1990) Pharmaceutical Dosage Forms: Disperse Systems, Marcel Dekker, NY; Weiner and Kotkoskie (2000) Excipient Toxicity and Safety, Marcel Dekker, Inc., New York, N.Y.).

Methods of Using Nanoparticles

The NPs of the invention may be used therapeutically for the treatment of a wide range of diseases and disorders. Of particular interest are those diseases or disorders that are considered "undruggable," i.e. those that have not responded or have not responded well to traditional small molecule therapeutics. The diseases or disorders that may be treated with the NPs of the invention include, but are not limited to, cancer. Exemplary cancers include prostate cancer, such as androgen dependent prostate cancer (ADPC), castration resistant prostate cancer (CRPC), and neuroendocrine prostate cancer (NEPC), the most aggressive form of prostate cancer.

Accordingly, the present invention provides a method of treating a subject with prostate cancer comprising administering to the subject a therapeutically effective amount of the NPs of the invention. The prostate cancer may be ADPC, CRPC, NEPC, or AR-7 variant prostate cancer. Further, the present invention provides a method of treating a subject with prostate cancer that has metastasized to the lungs and/or the liver comprising administering to the subject a therapeutically effective amount an NP of the invention that has been formulated with SORT technology to target the lungs and/or the liver. In yet another embodiment, the invention provides a method of treating a subject with COVID-19 comprising administering to the subject a therapeutically effective amount of an NP of the invention that has been formulated with SORT technology to target the lungs.

EXAMPLES

Example 1

Evaluation of CRISPR/Cas13d RNA Targeting System.

One functional aspect of a bi-targeting Cas13d delivery system is the ability to successfully knock down mRNA levels for gene products implicated in a disease state of interest. In the present example, quantitative reverse transcriptase PCR was utilized to quantify the ability of CasRx (SEQ ID NO: 76), a Cas13d isolated from *Ruminococcus flavefaciens* by Konermann et al., to knock down mRNA transcript levels. The effect of CasRx mRNA targeting on end protein levels were assessed via western blots.

Separately, HEK 293FT and human prostatic carcinoma 22RV1 cells were transfected (Lipofectamine) with the CasRx plasmid (SEQ ID NO: 78) and with non-targeting gRNA/pre-gRNA (Konermann et al. Cell, 173: 665-676 (2018)) or with targeting gRNA (using CasRx gRNA cloning backbone (SEQ ID NO: 76)) or pre-gRNA (using CasRx pre-gRNA cloning backbone (SEQ ID NO: 77)) of interest and cultured for 48 hours, then total RNA was isolated with the RNeasy Mini kit (Qiagen, 74104). qRT-PCR was conducted using the MultiScribe Reverse Transcriptase and Power SYBR Green PCR Master Mix reagents (Applied Biosystems) or Taqman Fast Advanced Master Mix (Applied Biosystem), according to the manufacturer's instructions. Each assay was repeated three to four times, and transcript levels were quantified. Primer sequences were as follows: HOXB13 forward PCR primer, 5'-ACAGAACC-CACCAGGTCCCTTT-3' (SEQ ID NO: 29); HOXB13 reverse PCR primer, 5'-TACG-GAATGCGTTTCTTGCGGC-3' (SEQ ID NO: 30); Human β-actin forward PCR primer, 5'-AGGCACCAGGGCGT-GAT-3' (SEQ ID NO: 45); Human β-actin reverse PCR primer, 5'-GCCCACATAG GAATCCTTCTGAC-3' (SEQ ID NO: 46); NF2 forward PCR primer 5'-TTGCGAGAT-GAAGTGGAAAGG-3' (SEQ ID NO: 47); NF2 reverse PCR primer, 5'-CAAGAAGTGAAAGGTGACTGGTT-3' (SEQ ID NO: 48); NFKB1 forward PCR primer, 5'-AACAGAGAGGATTTCGTTTCCG-3' (SEQ ID NO: 49); NFKB1 reverse PCR primer, 5'-TTTGACCT-GAGGGTAAGACTTCT-3' (SEQ ID NO: 50); PPARG1 forward PCR primer, 5'-GGGATCAGCTCCGTGGATCT-3' (SEQ ID NO: 51); PPARG1 reverse PCR primer, 5'-TGCACTTTGGTACTCTTGAAGTT-3' (SEQ ID NO: 52); NRAS forward PCR primer, 5'-ATGACTGAGTA-CAAACTGGTGGT-3' (SEQ ID NO: 53); NRAS reverse PCR primer, 5'-CATGTATTGGTCTCTCATGGCAC-3 (SEQ ID NO: 54). The probes ID were used as follows: GAPDH: Hs02758991-g1.

Guide RNAs comprise the spacer (or recognition, or targeting) sequence of a specific sequence identifier number (SEQ ID NO) and a single direct repeat sequence at the 5' end of the spacer sequence (SEQ ID NO: 60). Pre-guide RNAs comprise the 30 nucleotide spacer sequence of a specific sequence identifier number (SEQ ID NO) and 36 nucleotide direct repeats flanking each end of the spacer sequence of SEQ ID NO: 61).

Figure 1B:
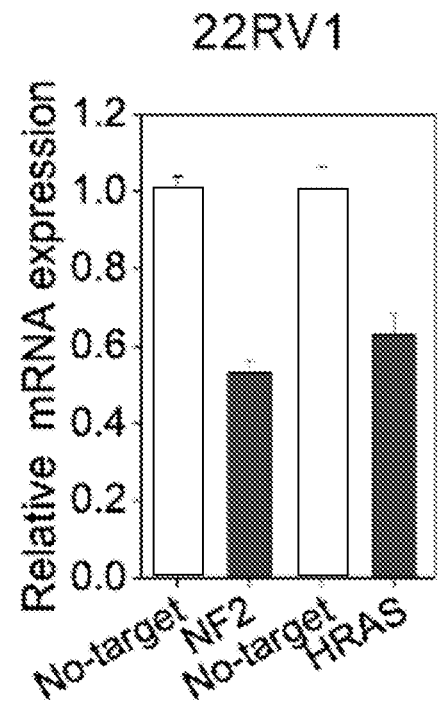

FIG. 1A shows a graph illustrating mRNA knockdown through CasRx targeting of four endogenous transcripts, NF2, NFKB1, PPARG, and NRAS. Each transcript is targeted with two guide RNAs and a non-targeting (NT) guide in 293FT cells. Transcript levels are relative to NT guide control. All transcripts were significantly knocked down, with an average knockdown of approximately 60%. FIG. 1B shows a graph illustrating CasRx-mediated mRNA knockdown of NF2 and HRAS in 22RV1 cells, with abundance relative to NT guide control. Again, significant knockdown of mRNA was achieved in this human prostatic carcinoma cell line.

Figure 2A:
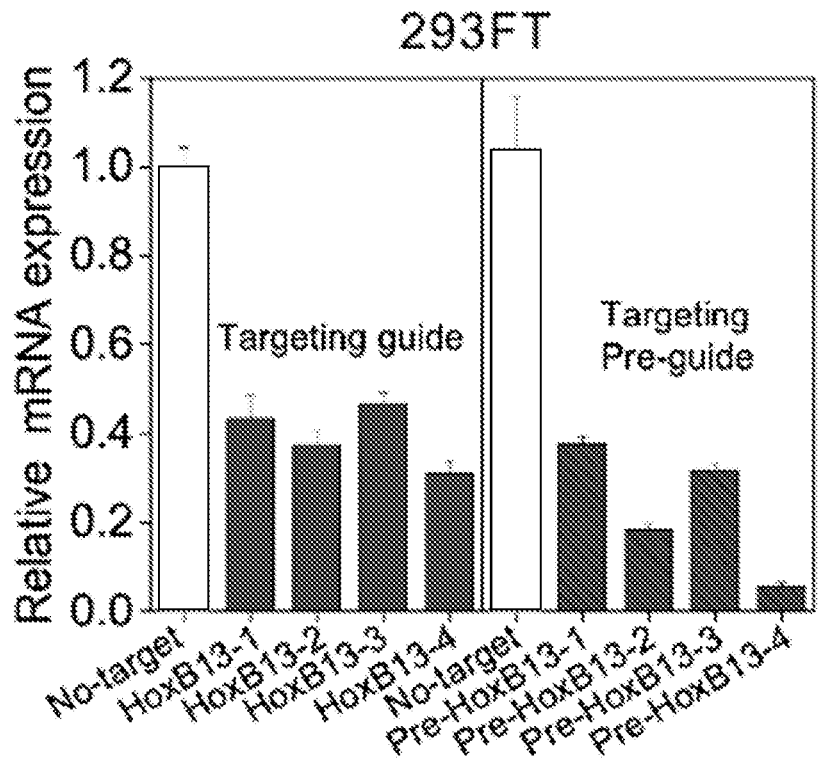
FIGS. 2A-2B. shows graphs representing mRNA knockdown through CasRx targeting of HoxB13 using four guide RNAs and pre-guide RNAs in 293FT cells. Transcript levels are relative to NT guide control.
Figure 2B:
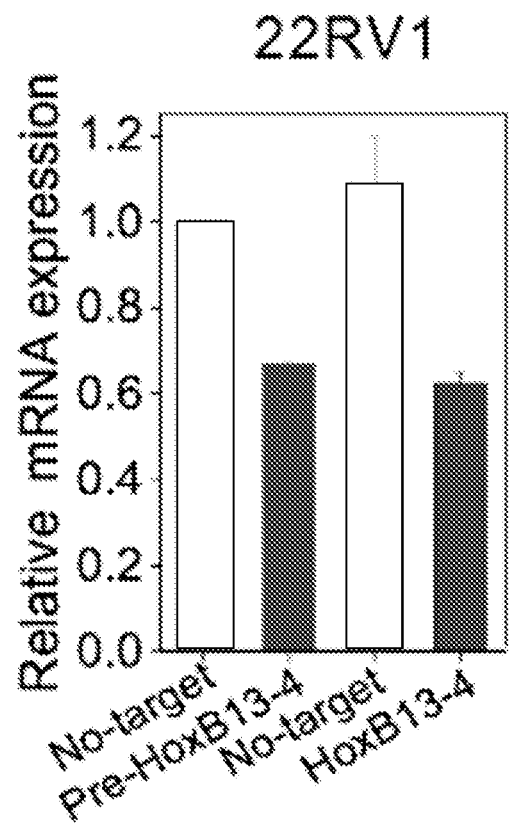

With control experiments completed, the mRNA transcripts for the transcription factor HoxB13 were targeted. Certain variants of HoxB13 are associated with a significantly increased risk of prostate cancer, and HoxB13 has thus far proved undruggable. FIG. 2A shows a graph representing mRNA knockdown through CasRx targeting of HoxB13 using four guide RNAs (or gRNA), with guide 1 having the spacer sequence of (SEQ ID NO: 55), guide 2 having the spacer sequence of (SEQ ID NO: 56), guide 3 having the spacer sequence of (SEQ ID NO: 57), and guide 4 having the spacer sequence of (SEQ ID NO: 58), and four pre-guide RNAs (or pre-gRNA), with pre-guide 1 having the spacer sequence of (SEQ ID NO: 1), pre-guide 2 having the spacer sequence of (SEQ ID NO: 2), pre-guide 3 having the spacer sequence of (SEQ ID NO: 3), and pre-guide 4 having the spacer sequence of (SEQ ID NO: 4), all in 293FT cells. Transcript levels are relative to NT guide control. Significant knockdown was achieved with both guide and pre-guide RNAs, with pre-guide 2 and pre-guide 4 offering the most significant knockdown, with pre-guide 4 suppressing HOXB13 mRNA by over 90%. FIG. 2B shows a graph representing a similar set of experiments of mRNA knockdown through CasRx targeting of HoxB13 in 22RV1 cells. The most effective gRNA (SEQ ID NO: 58) and pre-gRNA (SEQ ID NO: 4) from FIG. 2A were used. Significant knockdown of HOXB13 transcripts were observed with both gRNA 4 and pre-gRNA 4.

To determine the effect of CasRx mRNA targeting on cellular protein levels, western blotting was utilized. Cells were collected and lysed in RIPA buffer (1% NP-40, 0.1% sodium dodecyl sulfate (SDS), 50 mM Tris-HCl pH 7.4, 150 mM NaCl, 0.5% sodium deoxycholate, 1 mM ethylenediaminetetraacetic acid (EDTA), 1×proteinase inhibitor cocktail (Roche)) for 20 minutes on ice and the proteins were resolved on 8% SDS-polyacrylamide gels and transferred onto Nitrocellulose membrane (Bio-Rad). The membrane was blocked with 5% milk powder (Bio-Rad) then incubated with specific antibodies (PSMA #ab19071 from Abcam, HOXB13 #SC-66923 from Santa Cruz Biotechnology, 3-actin # from ab8227 from Abcam) at 4° C. overnight. Following incubation with secondary antibodies, immunoblots were visualized using the C-DiGit Chemiluminescent western Blot Scanner (Li-Cor). The results correlated well with the mRNA knockdown experiments, with all four gRNAs and all four pre-gRNAs substantially suppressing final protein levels relative to NT guide controls.

Figure 3A:
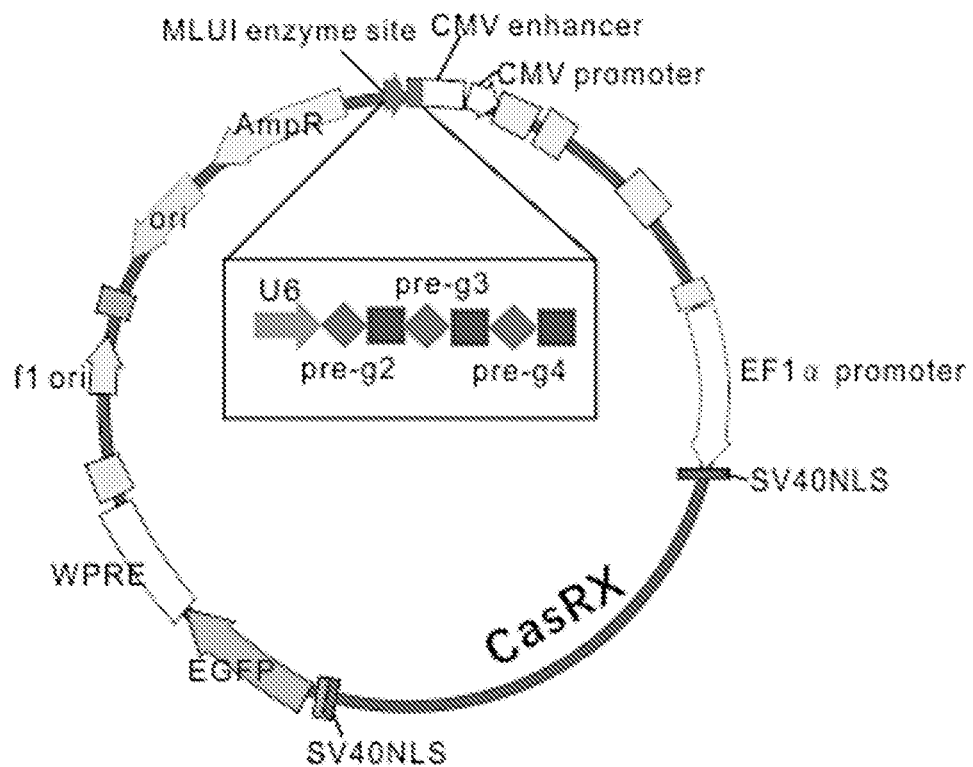
FIGS. 3A-3B illustrates the construction and use of an all-in-one plasmid comprising CasRx and pre-gRNAs.
Figure 3B:
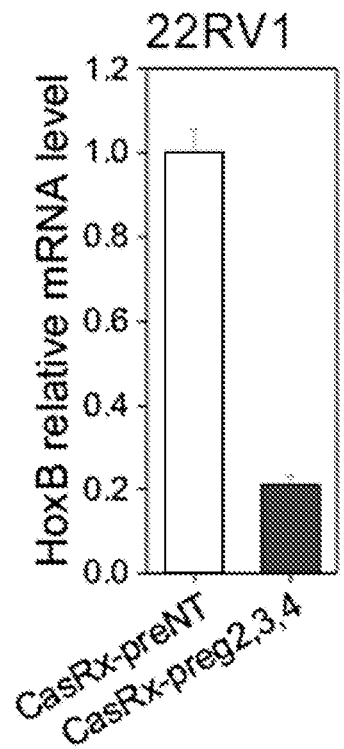

A plasmid was constructed that comprised both CasRx and three pre-gRNAs, starting with the plasmid AddGene #109049 (SEQ ID NO: 78). Pre-gRNA sequences 2, 3, and 4 ((SEQ ID NO: 2 through SEQ ID NO: 4, respectively), separated by direct repeats (SEQ ID NO: 61), were inserted into the MLUI restriction site. FIG. 3A shows a schematic diagram of the hU6-pre-gRNA-EF1α-CasRx-2A-EGFP "all-in-one" plasmid. 22RV1 cells were then transfected with the plasmid (Lipofectamine), and mRNA and protein levels were assessed. FIG. 3B shows a graph representing mRNA knockdown through CasRx targeting of HoxB13 in 22RV1 cells using arrays of three pre-gRNAs. mRNA knockdown of approximately 80% was observed. Transcript levels are relative to NT guide control. As described previously, western blots were also performed that showed a near elimination of HoxB13 protein product compared to controls.

CasRx mRNA Delivery

Figure 4:
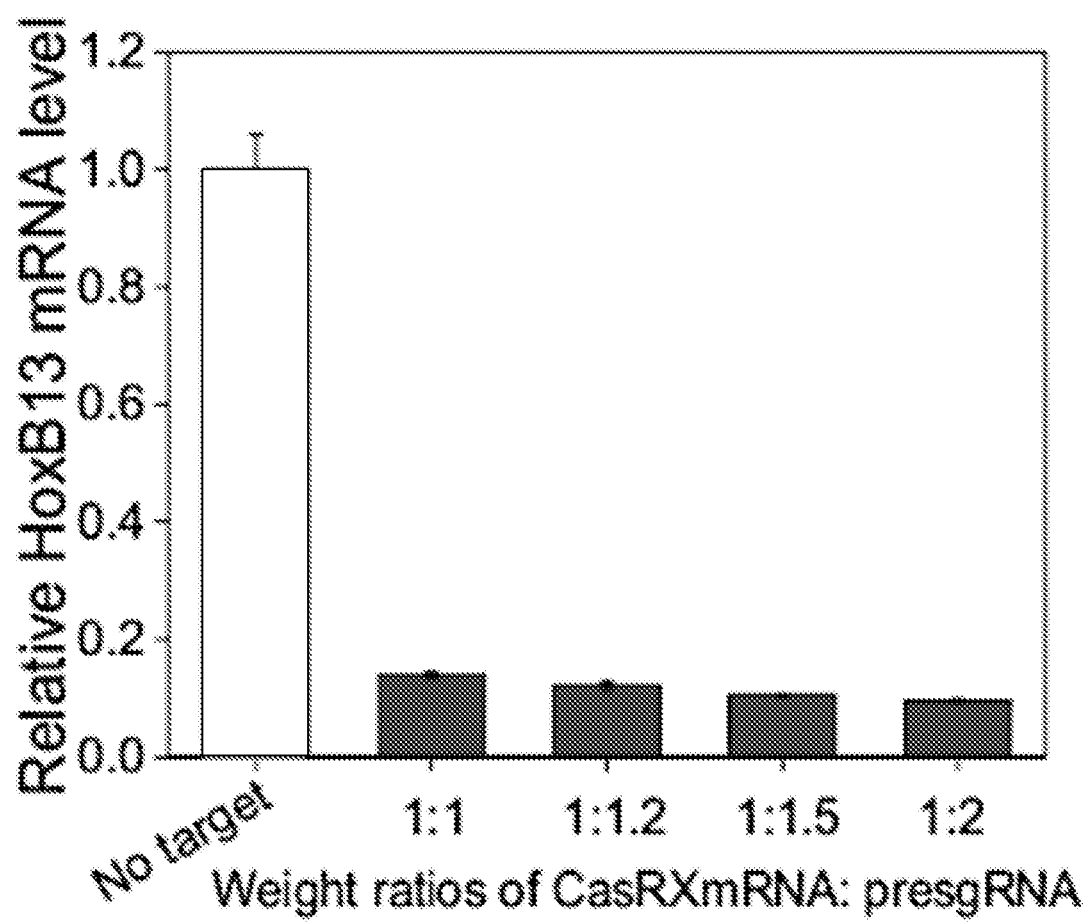
FIG. 4 shows a graph of HoxB13 mRNA expression measured after transfection of CasRx mRNA and pre-gRNA oligo targeting the HoxB13 gene at various weight ratios in 22Rv1 cells. Transcript levels are relative to NT guide control.

Plasmid-based gene therapy faces several obstacles to its clinical application, such as the substantial time requirement for gene editing and the potential to generate small insertions at the target site or large insertions at off-target sites. Co-delivery of Cas9 mRNA with gRNAs into cells has been shown to provide faster gene editing kinetics and fewer off-target effects compared with plasmid-based delivery. 22RV1 Cells were transfected (Lipofectamine) with CasRx mRNA and HoxB13 pre-gRNA-4 oligonucleotide at various weight ratios (1:1, 1:1.2, 1:1.5 and 1:2 CasRx mRNA to pre-gRNA oligos). Results show greater than 80% knockdown for all four weight ratios, with a trend of increased knockdown with increased weight ratio (FIG. 4).

These data demonstrate that the CasRx system, with the pre-gRNAs and gRNAs provided herein, can successfully target and knockdown mRNA transcripts for a transcription factor implicated in prostate cancer that has heretofore proved undruggable by other means, and do so in a relevant, castration-resistant prostate cancer cell line. Protein end products were also confirmed to be significantly suppressed.

Cell Culture of Human Embryonic Kidney (HEK) Cell Line 293FT.

Human embryonic kidney (HEK) cell line 293FT (Thermo Fisher) was maintained in DMEM (4.5 g/L glucose), supplemented with 10% FBS (GE Life Sciences) and 10 mM HEPES at 37° C. with 5% C02. Upon reaching 80-90% confluency, cells were dissociated using TrypLE Express (Life Technologies) and passaged at a ratio of 1:2. This cell line was purchased directly from the manufacturer and was not otherwise authenticated.

Cell Culture of Human Prostatic Carcinoma Cell Line 22RV1.

Human prostatic carcinoma cell line 22Rv1 (ATCC, Cat. #CRL-2505) were purchased from American Type Culture Collection (ATCC) and were authenticated by short tandem repeat (STR) profiling and karyotyping. Cells were grown in a humidified incubator with 5% C02 at 37° C. Cells were routinely tested for mycoplasma contamination using Myco-Alert™ PLUS Mycoplasma Detection Kit (Lonza, Cat. #LT07). Cell lines were cultured in RPMI 1640 medium (Corning, Cat. #10-040-CV) supplemented with 10% fetal bovine serum (Corning, Cat. #35010CV), penicillin-streptomycin (Corning, Cat. #30001C1), and gentamicin (Gibco, Cat. #15710064) as recommended by the supplier. 0.2% Normocin (Invivogen, Cat. #ANT-NR-1) was added to the medium to prevent contamination by mycoplasma, bacteria, or fungi. Cells were dissociated using TrypLE Express (Life Technologies) and passaged at a subculture ratio of 1:3-1:6.

Example 2

Preparation and Characterization of Nanoparticles.

Figure 5:
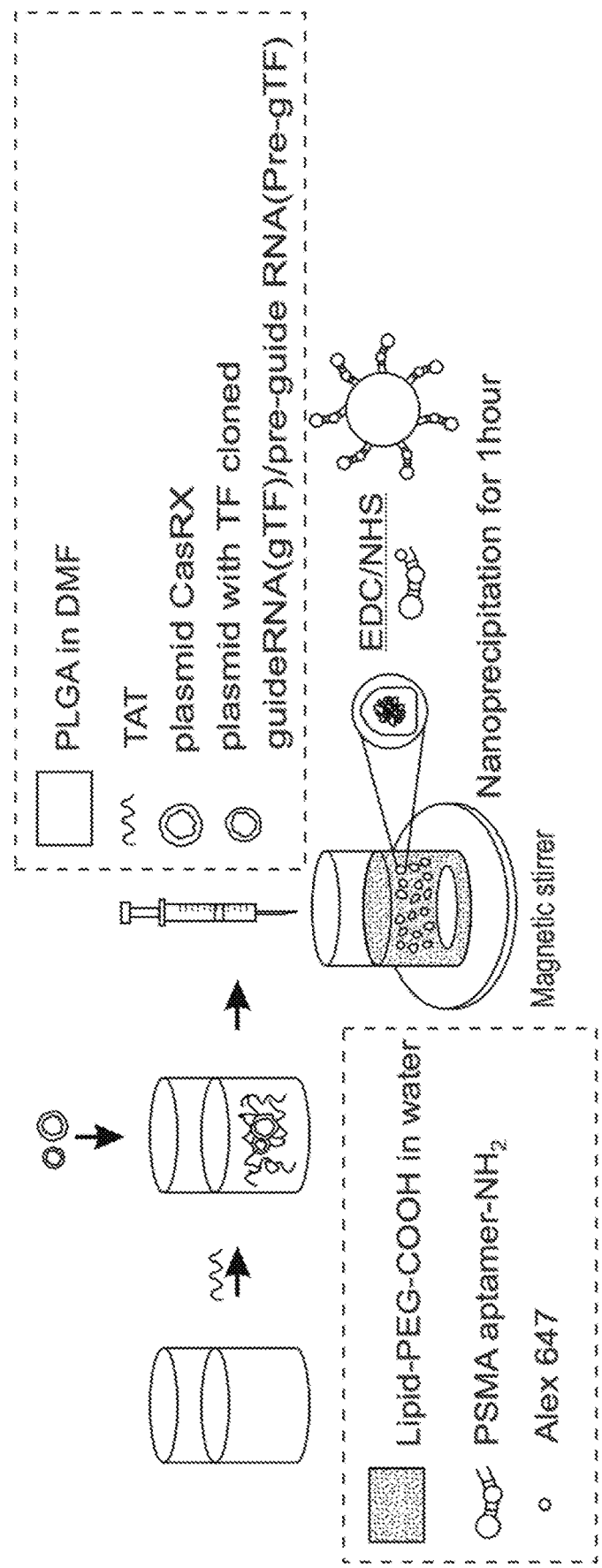
FIG. 5 is a schematic representation of a synthesis of nanoparticles (NPs) and plasmid encapsulation strategy. Positively charged TAT and CasRx plasmid and gRNA/pre-gRNA targeting a transcription factor ("TF") plasmid self-assemble with PLGA in DMF. Polymer cores are then coated with lipid-PEG-COOH. NPs can optionally be conjugated to Alexa Fluor 647-amine-functionalized aptamers by carbodiimide coupling chemistry. In this schematic, an Alexa Fluor labeled aptamer that specifically binds PSMA is used.

A schematic representation of the strategy for nanoparticle (NP) synthesis and plasmid encapsulation is shown in FIG. 5. Briefly, a nucleic acid of interest, in this case two plasmids, one encoding CasRx and another cloned guide RNA and/or pre-guide RNA to the target of interest, were encapsulated into a poly(lactic-co-glycolic acid) (PLGA) core. CasRx mRNA with pre-gRNA oligonucleotides were also encapsulated in a similar manner. A shell was formed over the core by lipid-PEG with Alexa Fluor 647 dye labeling. PEG can optionally be functionalized to help target the NP to a desired tissue. In certain embodiments, the shell was formed by prostate specific membrane antigen-specific (PSMA) aptamer-modified lipid-PEG with Alexa Fluor 647 dye labeling. PSMA is expressed on the surface of certain prostate cancers and most castration resistant prostate cancer cell lines. This cell-specific binding helps a NP dock and deliver its nucleic acid payload to the appropriate cell type. Additional types of nanoparticle delivery systems can be used, such as DNA nanoclew vectors, nanogold and cationic lipid-assisted NPs.

Figure 6A:
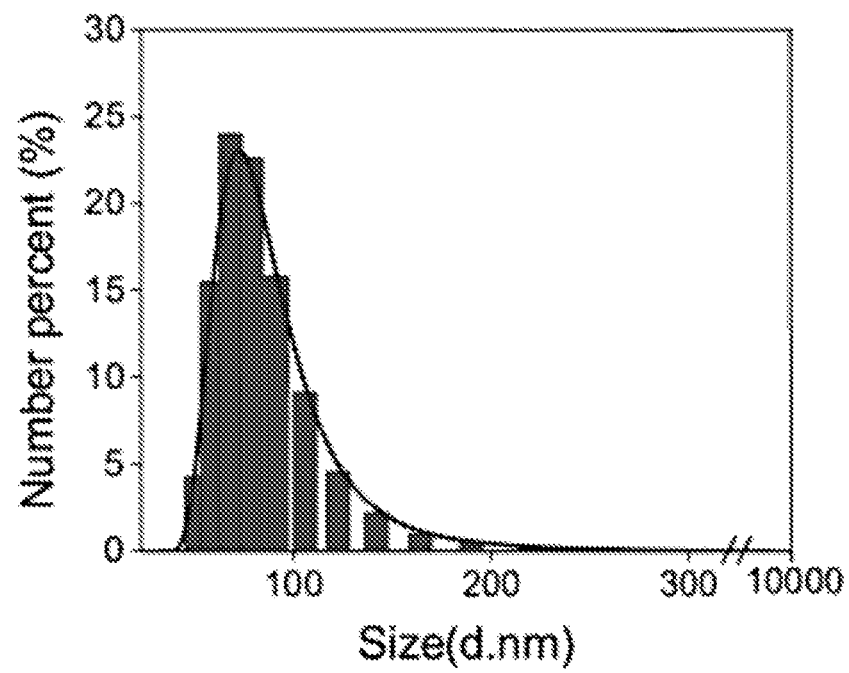
FIGS. 6A-6B show the characterization of nanoparticle size distribution with TAT (FIG. 6A) or without TAT (FIG. 6B).
Figure 6B:
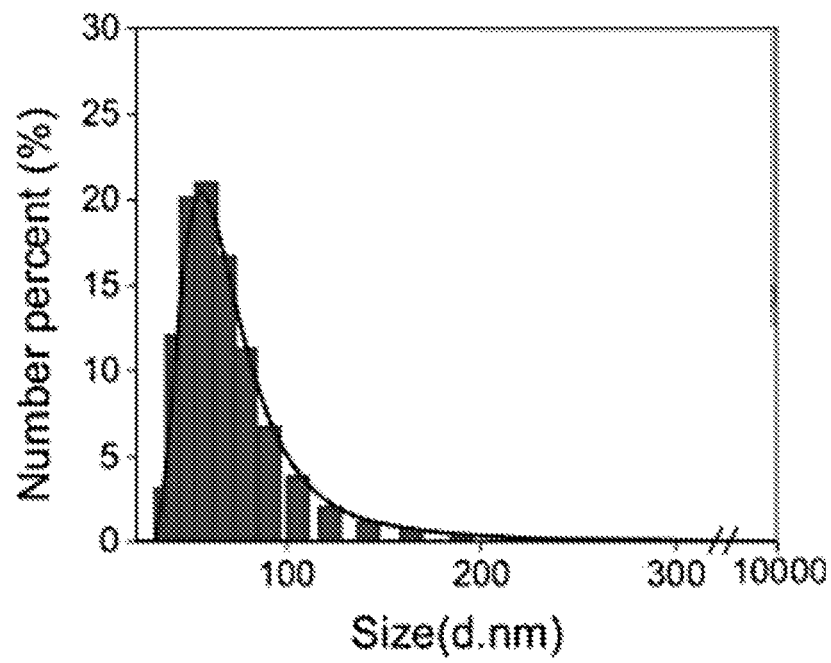

In vivo delivery of plasmid DNA has been severely hindered by systemic instability due to negative charge and excess size (in part due to charge repulsion). To reduce these negative effects, the positively charged TAT peptide was used for plasmid complexation at varying weight ratios of TAT to CasRx and gRNA (0.1:1, 0.5:1, 1:1, 5:1, 10:1, and 20:1). Agarose gel electrophoresis showed that TAT effectively condensed the two plasmids at a weight ratio of 5 or above with no visible evidence of constituent parts of the NP leaking from the NP as compared to NPs without TAT. This indicated that most plasmids were successfully encapsulated. In addition, the organic solvent DMF had no influence on plasmid properties. Previous evidence has shown that polyethylene glycol (PEG)-functionalized NPs are more protected against systemic clearance than similar NPs without PEG. Aspects of our work utilized lipid-PEG (m-PEG-DSPE, or 1,2-distearoyl-sn-glycero-3-phosphoethanolamine-N-[methoxy(polyethylene glycol)) to form a shell, and successfully synthesized NPs with average sizes around 188 nm for those with TAT (FIG. 6A) and 178 nm for those without TAT (FIG. 6B). Zeta potential was nearly neutral (2.25 mv).

Nanoparticle Delivery of Nucleic Acid Payload.

Figure 7:
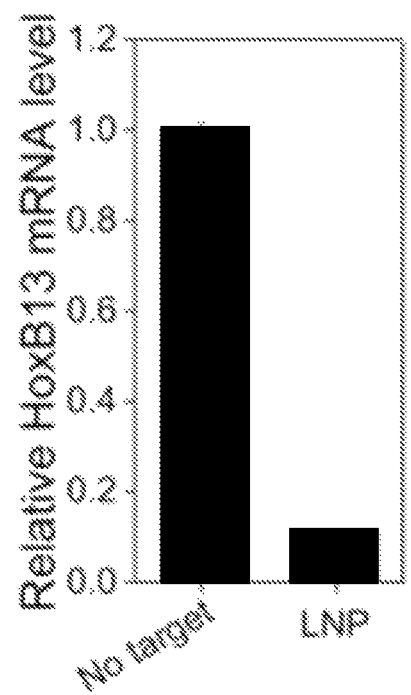
FIG. 7 shows a graph of HoxB13 mRNA expression measured after incubation of CasRx mRNA-HoxB13 pre-gRNA-LNPs with 22RV1 cells at a weight ratio of 1:1.5 (CasRx:pre-gRNA). Transcript levels are relative to NT guide control.

CasRx mRNA and HoxB13 pre-gRNA oligonucleotides were incorporated into lipid-NPs (LNPs) as described above. HoxB13 mRNA expression was measured after incubation of CasRx mRNA-HoxB13 pre-gRNA-LNPs with 22Rv1 cells at a weight ratio of 1:1.5 (CasRx:pre-gRNA). Transcript levels were compared to NT guide control. HoxB13 mRNA levels were knocked down substantially, averaging 89% suppression (FIG. 7). Cells were separately transfected with control LNPs encapsulating GFP mRNA, which indicated high efficiency delivery of GFP mRNA into control 22RV1 cells as evidenced by the presence of GFP under fluorescence, verified by bright-field contrast.

Plasmid Encapsulation Method.

Briefly, poly(lactic-co-glycolic acid) (PLGA) and TAT peptide (SEQ ID NO: 59) were dissolved separately in DMF at concentrations of 5 mg ml$^{-1}$ and 2.5 mg ml$^{-1}$, respectively. Then, 250 μg PLGA and 250 μg TAT were mixed in a small glass vial. Plasmid (16 μg at 1 mg ml$^{-1}$ concentration) in aqueous solution was mixed into the PLGA-TAT organic solution (weight ratio of Plasmid:PLGA:TAT was 1:15:15) to form cationic lipid-Plasmid nanocomplexes. This solution was then quickly nano-precipitated into 10 ml aqueous solution (0.2 mg ml$^{-1}$ concentration in DNase/RNase-free UltraPure water) of lipid-PEG-COOH, then Alexa Fluor 647-amine-functionalized A10-3 will be modified on the surface of NPs via carbodiimide coupling chemistry. Upon nanoprecipitation, NPs formed instantly and were kept for 30 min at 600 r.p.m. stirring at room temperature. The NPs were then washed three times with 1×PBS using Amicon tubes (molecular weight cut-off, 100 kDa) to remove organic solvent and free compounds and finally concentrated into 1 ml PBS solution. The NPs were used fresh or kept at −80° C. to use later for various in vitro and in vivo studies. The plasmid NPs Sizes and Zeta potential were measured by Zetasizer (Malvern), the morphology was visualized by transmission electron microscopy (TEM) at Duke Pathology Research Electron Microscopy Service.

Plasmid Encapsulation Evaluation and Complexation Ability of TAT.

To assess the plasmid encapsulation and its stability in organic solvent (DMF), naked plasmids were incubated with or without DMF for 30 min or plasmids complexed with TAT (in varying weight ratios from 0.1 to 20) were detected. To assess complexation ability of TAT, plasmids with (plasmid and TAT at the weight ratio of 1:15.6) or without TAT were detected. The volumes of samples were adjusted with loading dye (New England Biolabs) and run into 1% agarose (Invitrogen) gel for 40 min at 100 V. Finally, the gel was imaged under ultraviolet and the bands were analysed.

Example 3

HoxB13 as an Exemplary Target for Nanoparticles.

Figure 8:
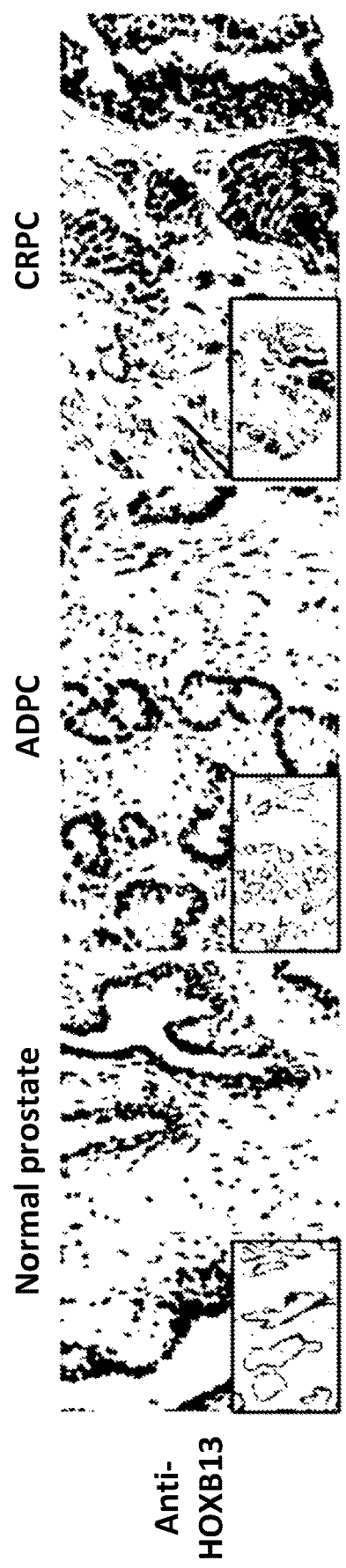
FIG. 8 shows an immunohistochemical (IHC) analysis of HoxB13 in normal prostate, ADPC and CRPC patient tissues.
Figure 9:
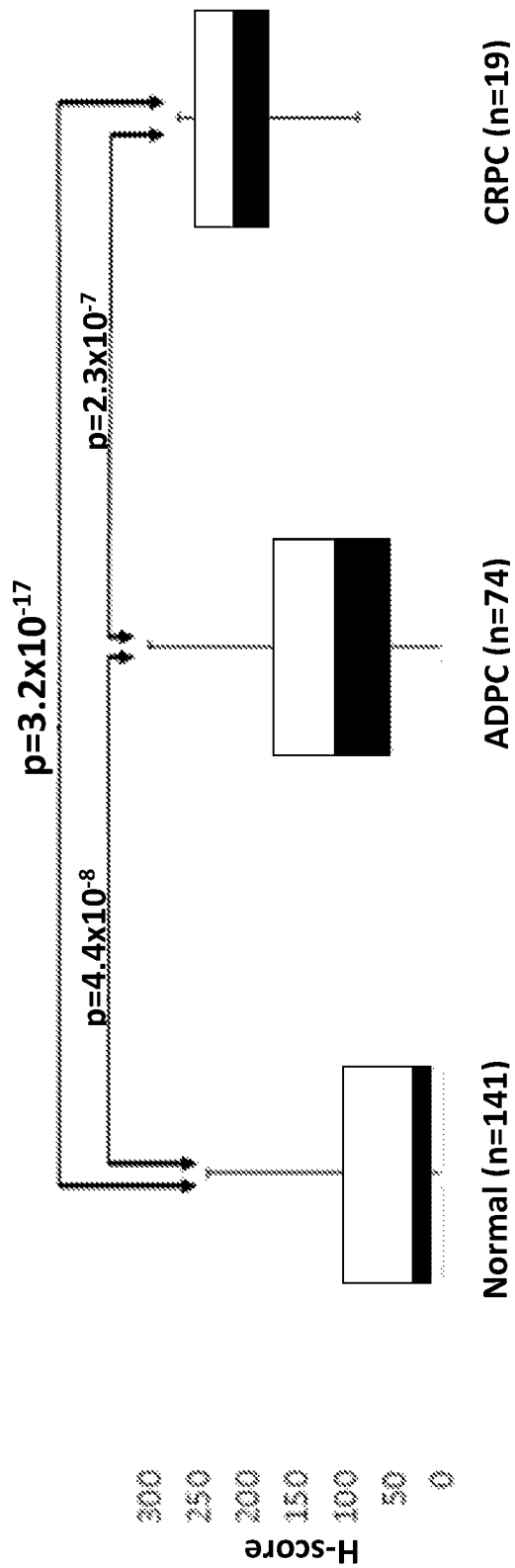
FIG. 9 shows a box plot that compares H-scores of HoxB13 nuclear staining in 234 tissue samples as shown in FIG. 8 showing increased abundance of HoxB13 during prostate cancer progression from ADPC to CRPC.

Previous studies have implicated HoxB13 in promoting or inhibiting full-length androgen receptor (AR) function in androgen dependent prostate cancer (ADPC). However, the genomic function of HOXB13 in castration dependent prostate cancer (CRPC) has only recently been defined through our discovery that HoxB13 acts as a pioneer transcription factor for AR-V7 (an AR splicing variant) and governs AR-V7-positive CRPC growth. To examine the clinical relevance of HoxB13, immunohistochemical (IHC) analyses of HoxB13 were performed in normal prostate, ADPC and CRPC patient tissues. CRPC samples had significantly higher staining of HoxB13 than the ADPC or normal prostate samples (FIG. 8), suggesting that HoxB13 expression increases during prostate cancer progression to the lethal phase. FIG. 9 shows a box plot of H-scores for normal (n=141), ADPC (n=74), and CRPC (n=19) cell samples that were examined immunohistochemically. A highly statistically significant increase in HoxB13 expression was observed from normal to ADPC and from ADPC to CRPC, as well as normal to CRPC samples.

Figure 10A:
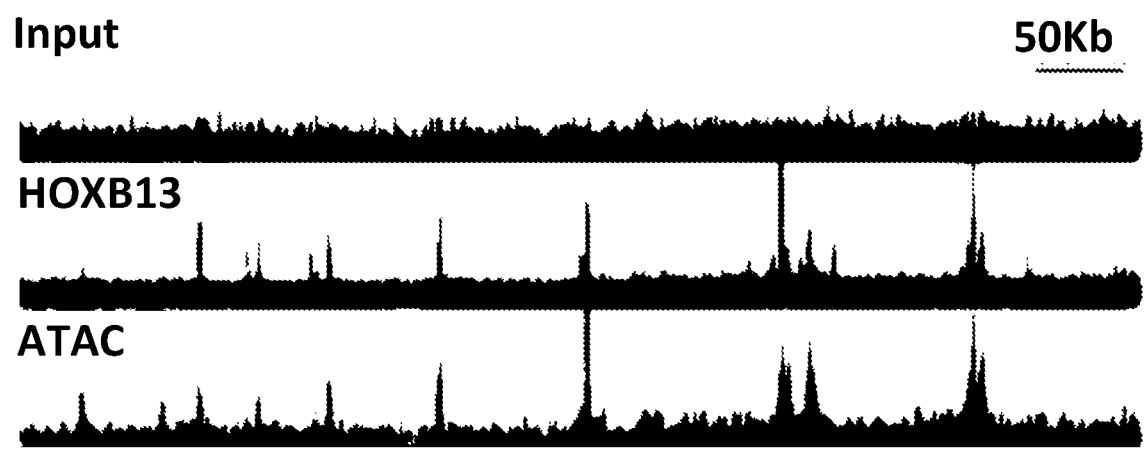
FIGS. 10A-10B illustrate Assays for Transposase Accessible Chromatin by sequencing (ATAC-seq) results in two CRPC patient tissues and correlated chromatin accessibility with HoxB13 genomic binding in the same tissue from the same patients.
Figure 10B:
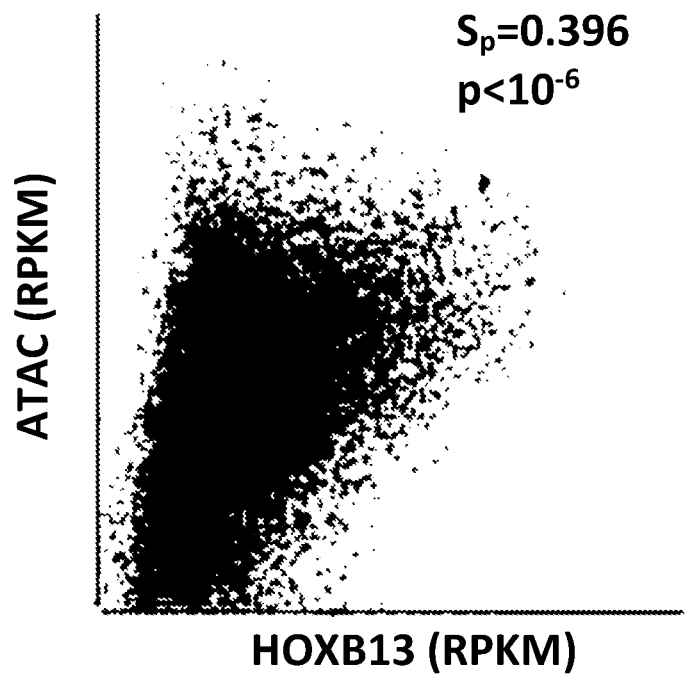

Assays for Transposase Accessible Chromatin by sequencing (ATAC-seq) were performed in two CRPC patient tissues and correlated chromatin accessibility with HoxB13 genomic binding in the same tissue from the same patients. Strong HoxB13 binding was observed, correlated with high chromatin accessibility. For example, UCSC Genome Browser views of representative HOXB13 binding sites and ATAC-seq peaks show strong correlation (FIG. 10A and FIG. 10B), suggesting that HoxB13 may function as a general pioneer factor in opening chromatin. Together with FIG. 8 and FIG. 9, HoxB13 appears to function as a general, oncogenic pioneer transcription factor to drive CRPC growth and is thus an attractive target for NP as described herein.

CasRx and associated pre-gRNAs and gRNAs have been shown to effectively reduce the abundance of HoxB13 mRNA and protein. Nanoparticles of the disclosure comprising nucleic acids (plasmids and mRNAs shown herein) have been shown to deliver their nucleic acid payload to cells in their vicinity. However, it is desirable to not only target a specific transcript, but to also target a specific cell type that comprises the specific target transcript(s). That is, dual targeting functionality.

As briefly mentioned in Example 2, prostate cancer cell types, like 22RV1 and LNCaP95, have not only been shown to transcribe a specific, disease-associated mRNA (HoxB13 in this case), but they have also been shown to express one or more specific moieties on their cell surfaces that are not ubiquitously found in the body. In the case of 22RV1 and LNCaP95, an example is PSMA. PSMA is common to most CRPC cell lines. Thus, targeting a cell surface antigen on the cell type of interest, increases the probability that a nucleic acid payload in a NP will be delivered where it can confer a benefit. Other disease states share similar opportunities for specific targeting, and NP formulations can also be tuned to facilitate tissue-specific targeting.

To confirm endogenous co-expression of PSMA and HoxB13 in prostate cancer-specific cells, western blotting was again utilized. 22RV1 and LNCaP95 cells were collected and lysed in RIPA buffer (1% NP-40, 0.1% sodium dodecyl sulfate (SDS), 50 mM Tris-HCl pH 7.4, 150 mM NaCl, 0.5% sodium deoxycholate, 1 mM ethylenediaminetetraacetic acid (EDTA), 1×proteinase inhibitor cocktail (Roche)) for 20 minutes on ice and the proteins were resolved on 8% SDS-polyacrylamide gels and transferred onto Nitrocellulose membrane (Bio-Rad). The membrane was blocked with 5% milk powder (Bio-Rad) then incubated with specific antibodies (PSMA #ab19071 from Abcam, HOXB13 #SC-66923 from Santa Cruz Biotechnology, β-actin #ab8227 from Abcam) at 4° C. overnight. Following incubation with secondary antibodies, immunoblots were visualized using the C-DiGit Chemiluminescent western Blot Scanner (Li-Cor). The results show that HOXB13 was expressed approximately as abundantly as the #-actin control and PSMA expressed more strongly that β-actin in 22RV1 cells. LNCaP95 cells expressed HoxB13 modestly more than the β-actin control and PSMA approximately 50% as much as the control.

Immunohistochemistry (IHC) Analysis.

Tumor microarrays containing normal prostate (141 samples), androgen dependent prostate cancer (74 samples), or castration-resistant prostate cancer (19 samples) were constructed. Immunohistochemical staining of these samples was performed with a HoxB13 antibody (ab53931, Abcam). Briefly, following deparaffinization, antigen retrieval was performed for 40 min using Reveal Decloaker solution (Biocare Medical), followed by 20 minutes cooling. This was followed by application of Protein Block (Biocare Medical) for 15 minutes and Endogenous Peroxidase Quench (Biocare Medical) for 6 minutes. Primary antibody was applied for 60 min at a dilution of 1:250, while secondary antibody detection was performed as part of the MACH 4™ detection system (Biocare Medical). Counterstaining was performed with hematoxylin. Slides were digitally scanned at 20× magnification using a whole slide scanner (Leica). H-scores ranged from 0 to 300 and were calculated as the product of the Intensity Score for the epithelial region of maximum HOXB13 staining intensity in each sample (assigned on a scale from 0 to 3) multiplied by the percentage of epithelial cells in that sample showing maximum staining intensity (0-100%).

ATAC-Seq Library Preparation and Data Analysis.

All of the steps were carried out at 4° C. A frozen tissue fragment ~20 mg was placed into a pre-chilled 2-ml Dounce homogenizer containing 2 ml of cold 1×homogenization buffer (320 mM sucrose, 0.1 mM EDTA, 0.1% NP40, 5 mM CaCl2, 3 mM Mg(Ac)2, 10 mM Tris pH 7.8, 1×protease inhibitors (Roche, cOmplete), and 167 µM β-mercaptoethanol, in water). Tissue was homogenized with approximately ten strokes with the loose 'A' pestle, followed by 20 strokes with the tight 'B' pestle. Connective tissue and residual debris were precleared by filtration through an 80-µm nylon mesh filter followed by centrifugation for 1 min at 100 r.c.f. While avoiding the pelleted debris, 400 µl was transferred to a pre-chilled 2-ml round bottom Lo-Bind Eppendorf tube. An equal volume (400 µl) of a 50% iodixanol solution (50% iodixanol in 1×homogenization buffer) was added and mixed by pipetting to make a final concentration of 25% iodixanol. 600 µl of a 29% iodixanol solution (29% iodixanol in 1×homogenization buffer containing 480 mM sucrose) was layered underneath the 25% iodixanol mixture. A clearly defined interface should be visible. In a similar fashion, 600 µl of a 35% iodixanol solution (35% iodixanol in 1×homogenization containing 480 mM sucrose) was layered underneath the 29% iodixanol solution. Again, a clearly defined interface should be visible between all three layers. In a swinging-bucket centrifuge, nuclei were centrifuged for 20 min at 3,000 r.c.f. After centrifugation, the nuclei were present at the interface of the 29% and 35% iodixanol solutions. This band with the nuclei was collected in a 300 µl volume and transferred to a pre-chilled tube. Nuclei were counted after addition of trypan blue, which stains all nuclei due to membrane permeabilization from freezing. 50,000 counted nuclei were then transferred to a tube containing 1 ml of ATAC-seq RSB with 0.1% Tween-20. Nuclei were pelleted by centrifugation at 500 r.c.f. for 10 min in a pre-chilled (4° C.) fixed-angle centrifuge. Supernatant was removed using the two pipetting steps described above. Because the nuclei were already permeabilized, no lysis step was performed, and the transposition mix (25 µl×TD buffer, 2.5 µl transposase (100 nM final), 16.5 µl PBS, 0.5 µl 1% digitonin, 0.5 µl 10% Tween-20, 5 µl water) was added directly to the nuclear pellet and mixed by pipetting up and down six times. Transposition reactions were incubated at 37° C. for 30 min in a thermomixer with shaking at 1,000 r.p.m. Reactions were cleaned up with Zymo DNA Clean and Concentrator 5 columns.

Paired-end sequencing was performed using an Illumina HiSeq 4000 instrument. Nextera-based sequencing primers and reagents were used. Paired-end 50-cycle reads generally provide accurate alignments with reasonable costs. For inferring differences in open chromatin within human samples >50M mapped reads are generally used. Sequence reads were obtained and mapped to the human (hg19) genomes using Bowtie2 with standard parameters and a maximum fragment length of 2,000. Picard was then used to remove duplicate reads.

ChIP-Exo and Data Analysis.

CRPC samples were trimmed and chopped into small pieces on ice and fixed immediately with 1% formaldehyde for 20 min at room temperature. Chromatin was sonicated and incubated overnight with 4 µg antibodies against HOXB13 (H-80, Santa Cruz Biotechnology). T4 DNA polymerase, T4 PNK and Klenow DNA Polymerase were used together for end polishing. The ligation step was performed with 1 mM dithiothreitol. Protein A Dynal magnetic beads were washed using modified RIPA buffer (50 mM Tris-HCl pH 8.0, 1 mM EDTA, 0.25% sodium deoxycholate, 1% NP-40, 0.5 M LiCl) followed by Tris pH 8.0 twice during each step. The library was amplified with only 10-12 cycles and prepared without gel-based size selection. Paired-end sequencing (50 bp) was performed using Illumina HiSeq2500 at the OSUCCC sequencing core. Raw reads were aligned to the human reference genome (hg19) using Bowtie with default parameter settings. The binding locations for AR-V7, AR-FL and HoxB13 were identified by BELT and Genomics Suite (v6.6, Partek) from ChIP-exo Reads 2. ChIP-exo borders were called by the MALD model from ChIP-exo Reads 1, and DNA motifs were precisely defined by the BPMotif approach. Briefly, the enriched DNA motifs were defined by a multi-phase cross-validation procedure. Genomics Suite (v6.6) and MEME Suite v4.9 were used to find the candidate motifs. Initial motif candidates were generated using default program settings (one instance per sequence, less than 40 bp of border extension). Motifs were then clustered with the Pearson correlation coefficient. Exo signal was measured to define border patterns and classify motifs. A set of overrepresented motifs was then used to correct border extension according to the enriched motif position. Motif discovery was repeated twice. Motifs with E<1e-10 or that were found in 10% of sequences were retained as reliable predictions for the next round of analysis. Finally, motifs satisfying the following extensible criteria were identified: 1) Motif similarity compared to ARE or Homeobox motifs in the transcription factor binding databases or between core motifs defined in HoxB13 ChIP-exo data; 2) At least one common protected border exists upstream and downstream of the strand-specific motif; and 3) Same distance from borders to the most conserved nucleotides in variable motifs. For those core motifs that did not meet criteria (1), motif comparison and clustering based on criteria 2) and 3) using the exo-defined matrix were also performed.

Immunostaining Assays.

To visualize PSMA in 22RV1 cells, immunostaining assays were performed. In these assays, 22RV1 cells were fixed using 4% paraformaldehyde for 20 minutes at room temperature, then washed twice in PBS. After blocking for 45 min at room temperature in PBS containing 6% BSA and 0.25% Triton X-100, cells were then stained with the PSMA antibody (PSMA #ab19071 from Abcam) for 1 hour at ambient temperature. After extensive washing, cells were then incubated with Goat anti-Mouse Alexa Fluor 488 Secondary Antibody (Invitrogen) for 1 hour at ambient temperature. Nuclei were stained with Hoechst. Stained samples were visualized under a laser confocal microscope (Leica SP8). PSMA could be visualized lighting up the perimeter of visualized cells, confirming its presence on the cell surface.

Example 4

Targeting TMPRSS2, CTSL and FURIN for SARS-CoV-2.

Recent studies have found that SARS-CoV-2 uses the host receptor ACE2 for cell entry and the serine protease TMPRSS2 and/or the cysteine protease Cathepsin L (CatL/CTSL) for S protein priming. The loss of ACE2 leads to acute lung injury. However, RNA editing NP system of the disclosure can be used to target the TMPRSS2 and CatL CTSL genes in lung with minimized off-target effects. In addition, lung cell entry of SARS-CoV-2, but not SARS-CoV, is pre-activated by the proprotein convertase, furin. Effective pre-gRNAs for guiding CasRx to target furin have been determined and used to target human FURIN and murine Furin mRNA.

It is notable that while TMPRSS2 knockout mice exhibit no detectable histological or functional abnormalities in organs such as the lungs, liver, or prostate, suggesting that the role of TMPRSS2 in normal physiology may be dispensable (Kim et al. *Mol. Cell. Biol.* 26: 965-75 (2006)), TMPRSS2 does affirmatively contribute to SARS-CoV spread and immunopathology in the airway of mouse models. (Iwata-Yoshikawa et al. *J Virol.* 93 (2019), doi:10.1128/JVI.01815-18).

As with HoxB13, mRNA transcripts for TMPRSS2 and CatL were targeted with the RNA editing system of the description. FIG. 11A shows a graph representing mRNA knockdown of human TMPRSS2 through CasRx targeting using four pre-guide RNAs (or pre-gRNA), with pre-guide 1 having the spacer sequence of (SEQ ID NO: 5), pre-guide 2 having the spacer sequence of (SEQ ID NO: 6), pre-guide 3 having the spacer sequence of (SEQ ID NO: 7), and pre-guide 4 having the spacer sequence of (SEQ ID NO: 8), all in 293FT cells. Knockdown range varied from about 30% for pre-gRNA 1 to about 80%, with pre-gRNA 2 being the most effective. FIG. 11B shows a graph representing mRNA knockdown of murine Tmprss2 through CasRx targeting using four pre-guide RNAs, with pre-guide 1 having the spacer sequence of (SEQ ID NO: 13), pre-guide 2 having the spacer sequence of (SEQ ID NO: 14), pre-guide 3 having the spacer sequence of (SEQ ID NO: 15), and pre-guide 4 having the spacer sequence of (SEQ ID NO: 16), all in 293FT cells. Knockdown range varied from about 25% for pre-gRNA 2 to about 75%, with pre-gRNA 4 being the most effective. FIG. 11C shows a graph representing mRNA knockdown of human CTSL through CasRx targeting using four pre-gRNAs, with pre-guide 1 having the spacer sequence of (SEQ ID NO: 9), pre-guide 2 having the spacer sequence of (SEQ ID NO: 10), pre-guide 3 having the spacer sequence of (SEQ ID NO: 11), and pre-guide 4 having the spacer sequence of (SEQ ID NO: 12), all in 293FT cells. Knockdown range varied from about 10% to about 70%, with pre-gRNA 4 being the most effective. FIG. 11D shows a graph representing mRNA knockdown of murine Ctsl through CasRx targeting using four pre-guide RNAs, with pre-guide 1 having the spacer sequence of (SEQ ID NO: 17), pre-guide 2 having the spacer sequence of (SEQ ID NO: 18), pre-guide 3 having the spacer sequence of (SEQ ID NO: 19), and pre-guide 4 having the spacer sequence of (SEQ ID NO: 20), all in 293FT cells. Knockdown range varied from about 30% for pre-gRNA 2 to about 70%, with pre-gRNA 3 being the most effective. FIG. 11E shows a graph representing mRNA knockdown of human FURIN through CasRx targeting using four pre-gRNAs, with pre-guide 1 having the spacer sequence of (SEQ ID NO: 21), pre-guide 2 having the spacer sequence of (SEQ ID NO: 22), pre-guide 3 having the spacer sequence of (SEQ ID NO: 23), and pre-guide 4 having the spacer sequence of (SEQ ID NO: 24), all in 293FT cells. Knockdown range varied from about 70% to about 90%, with pre-gRNA 3 being the most effective. FIG. 11F shows a graph representing mRNA knockdown of murine Furin through CasRx targeting using four pre-guide RNAs, with pre-guide 1 having the spacer sequence of (SEQ ID NO: 25), pre-guide 2 having the spacer sequence of (SEQ ID NO: 26), pre-guide 3 having the spacer sequence of (SEQ ID NO: 27), and pre-guide 4 having the spacer sequence of (SEQ ID NO: 28), all in 293FT cells. Knockdown range varied from about 50% for pre-gRNA 3 to about 85%, with pre-gRNA 4 being the most effective. All transcript levels are relative to Vector controls. As 293FT is a TMPRSS2-negative cell line, a TMPRSS2-encoding vector was co-transfected with the CasRx and pre-gRNA plasmids. When screening murine gRNAs, 293FT were co-transfected with murine the Tmprss2, Ctsl or Furin encoding vector along with the CasRx and pre-gRNA plasmids.

22RV1 cells were incubated with LNPs encapsulating GFP-mRNA (GFP mRNA-NP). Fluorescence microscopy revealed high efficiency delivery of GFP mRNA into the 22RV1 cells as evidenced by the presence of robust GFP under fluorescence and verified by bright-field contrast. Similar experiments were conducted in which the surfaces of empty LNPs were modified with the near-IR fluorescent cyanine dye DiR for tracking the location of LNPs. Incubation of the NPs with 22RV1 cells followed by visualization demonstrated co-location of the NPs with the cell surface.

NPs comprising the CasRx/gRNA system for specific knockdown of TMPRSS2 and CatL can be specifically targeted to the lungs using a recently developed selective organ targeting (SORT) technology (Lee, J. K. et al. *Proc Natl Acad Sci USA* 115, E4473-E4482, (2018)). Lung-targeting LNPs have been successfully generated, which LNPs have demonstrated high delivery efficiency in vitro (FIG. 7). These NPs comprised DLin-MC3-DMA/DSPC/cholesterol/DMG-PEG2000/DOTAP at a final molar ratio of 25/5/19.3/0.8/50.

Organ-Specific Nanoparticle Formation.

Unless otherwise stated, all lipids with specified molar ratios were dissolved in ethanol and RNA was dissolved in 10 mM citrate buffer (pH 4.0). The two solutions were rapidly mixed at an aqueous to ethanol ratio of 3/1 by volume (3/1, aq./ethanol, vol./vol.) to satisfy a final weight ratio of 40/1 (total lipids/mRNA), then incubated for 10 min at room temperature. As a representative example, a lung-targeted LNPs (50% DOTAP) was prepared as follows. A solution of lipids in ethanol was prepared consisting of DLin-MC3-DMA, DSPC, cholesterol, DMG-PEG2000 and DOTAP to make the final molar ratio of 25/5/19.3/0.8/50. The systematic names for these reagents are as follows: DLin-MC3-DMA is (6Z,9Z,28Z,31Z)-Heptatriaconta-6,9,28,31-tetraen-19-yl 4-(dimethylamino)butanoate; DSPC is 1,2-Distearoyl-sn-glycero-3-phosphocholine; DMG-PEG2000 is 1,2-dimyristoyl-rac-glycero-3-methoxypolyethylene glycol-2000; and, DOTAP is 1,2-dioleoyl-3-trimethylammonium-propane.

To reach a final ratio of 40/1 (wt/wt) of total lipids/total nucleic acids, 1.16 µl lipid solution was used per µg of RNA. For example, to make a final 5-µg nucleic acid formulation, a mixture of 5.8 µl of lipid and 9.2 µl of ethanol were mixed (total 15 µl), and then a 45 µl nucleic acid solution was prepared consisting of 5 µg of nucleic acid RNA in citrate buffer (10 mM, pH 4.0). Then 45 µl of the nucleic acid solution was rapidly combined with 15 µl of the ethanol/lipid solution to form 50% DOTAP LNPs. For CasRx/sgRNA encapsulation, 1×PBS buffer was used for formulation and the molar ratio of CasRx and sgRNA was fixed at 1:1.5. After LNP formation, the fresh LNP formulations were diluted with 1×PBS to 0.5 ng µl−1 mRNA (with a final ethanol concentration <5%) for in vitro assays and size detection using dynamic light scattering (Malvern MicroV model; He—Ne laser, wavelength=632 nm). For in vivo experiments, the formulations can be dialysed (Pur-A-Lyzer Midi Dialysis Kits, WMCO 3.5 kDa) against 1×PBS for 2 hours and diluted with PBS to 15 µl g$^{-1}$ for i.v. injections.

Additional COVID-19 Studies

Additional mRNA knockdown experiments investigating the efficiency and toxicity of organ-selective LNPs carrying CasRx mRNA and pre-gRNA targeting for TMPRSS2 can be conducted. Further experiments targeting CTSL and FURIN (or all three genes combined) in multiple human cell lines, including Calu-3, Caco-2, and prostate cancer cell lines (22RV1, LNCaP, C4-2B) can be conducted.

The effects of organ-selective LNPs carrying CasRx mRNA and pre-gRNA targeting Tmprss2, Ctsl, Furin or the three genes combined on normal mouse lung histology and function can be assessed. The extent to which organ-selective LNPs carrying CasRx mRNA and pre-gRNA targeting Tmprss2, Ctsl, Furin, or the three genes combined can block SARS-CoV-2 entry can be evaluated in order to determine utility for antiviral intervention.

Additional Methods

Human cells can be incubated with lung-selective LNPs encapsulating 1 µg CasRx mRNA and 1.5 µg pre-gRNA oligo targeting TMPRSS2, CTSL and FURIN or combined 3 genes, respectively, at a weight ratio of 1:1.5 in 6-well plate, for different time points: 6, 12, 24, 48, 72 and 96 hours and subjected for analysis as described below.

For qRT-PCR, total RNA can be extracted from cells using RNeasy mini kit (Qiagen) and reverse transcribed by transcriptase (Thermo). qRT-PCR primer can be ordered from Integrated DNA Technologies (IDT). mRNA expression levels of TMPRSS2, CTSL and FURIN can be determined by SYBR Green gene expression assays (Thermo). Real-time PCR reactions can be carried out in triplicate by using a qTOWER$^3$ system (Analytik Jena). The expression can be calculated with comparative Ct method and the raw data are normalized with the internal control β-actin.

For western blots, cell lysates can be resolved on 4-15% SDS-PAGE, transferred to PVDF membranes and probed with corresponding antibodies. Antibodies to TMPRSS2 (#ab92323), FURIN (#ab183495) and β-actin (#ab8227) are from Abcam (Boston, MA); to Cathepsin L (#MAB9521) from Novus Biological (Centennial, CO). The protein expression can be quantified by densitometry and normalized to β-actin.

For testing the toxicity of treatments disclosed herein, flow cytometric experiments will be performed by first washing cells with 1×PBS, treating with 1×Trypsin EDTA and fixing in 1.6% paraformaldehyde in PBS for 10 minutes. Cells will then be washed with FACS buffer (1×PBS, 0.3% BSA, 1 mM EDTA). A BD Accuri C6 plus flow cytometer will used to collect raw data. Raw data can be processed with Cytobank (BD) software. Data can be presented as representative flow cytometry plots of forward versus side scatter (FSC versus SSC).

To examine the knockdown effects of organ-selective LNPs carrying CasRx mRNA and pre-gRNA targeting Tmprss2, Ctsl, Furin, or all three combined) on normal mouse lung histology and function, the following method can be performed. C57BL/6 male mice (5~6-week-old) can be purchased from Taconic (Albany, NY). Upon receipt, mice are preferably acclimated for one week before the study. All animal experiments are carried out according to a protocol approved by an Institutional Animal Care and Use Committee. Lung-selective LNPs encapsulating CasRx mRNA and pre-gRNA targeting Tmprss2, Ctsl, furin, or all three combined, can be administered via the tail vein at a dose of 10 µg CasRx mRNA and 15 µg pre-gRNA oligos/10 g body weight in a volume of 10 µl/10 g body weight. Mice can be sacrificed at the time points of 24, 72 and 120 hours after injection. Each time point should comprise at least 3-4 mice. Lung tissues can be collected immediately, homogenized and subjected for qRT-PCR and WB analysis to determine its mRNA and protein levels of Tmprss2, Ctsl and Furin, as applicable.

Histology assessment: Lungs are fixed for 7 days in 10% phosphate buffered formalin, paraffin embedded, and sectioned at 4 µm. Serial sections are stained with hematoxylin and eosin (H&E). Two different and complementary quantitative histologic tools, American Thoracic Society lung injury scoring tool and DAD tool, can be used to determine whether knockdown of Tmprss2, Ctsl, Furin or all three combined diminish the histopathological features associated with lung injury.

Testing the extent to which organ-selective LNPs carrying CasRx mRNA and pre-gRNA targeting TMPRSS2 (human)/Tmprss2(mouse), CTSL (human)/Ctsl(mouse), FURIN(human)/Furin (mouse), or all three combined, can block SARS-CoV-2 entry into human cells in vitro and into mouse lung in vivo, is important to evaluate their utility for antiviral intervention.

Method

For in vitro studies: Calu-3 or Caco-2 cells can be: (1) pre-incubated with lung-selective LNPs encapsulating 1 µg CasRx mRNA and 1.5 µg pre-gRNA oligo targeting TMPRSS2, CTSL and FURIN, or all three combined, at a weight ratio of 1:1.5 in 6-well plates, for 24 hours prior to SAS-Cov2 challenge; (2) incubated with lung-selective LNPs encapsulating CasRx mRNA and pre-gRNA targeting TMPRSS2, CTSL, FURIN, or all three combined, for 24 or 48 hours after SAS-Cov2 challenge. Cell supernatant can be collected for testing virus titer and levels of cytokines (IL-6, IL-8, IL-10, TNF-alpha, IFN-gamma) and chemokines (CCL2, CCL3, CCL4). Cells can also be collected for determination of viral copy number and expression levels of TMPRSS2, CTSL and FURIN.

For in vivo studies: K18-hACE2 mice (Jackson Laboratory) can be treated through tail vein with a single dose of lung-selective LNPs encapsulating CasRx mRNA and pregRNA targeting Tmprss2, Ctsl, Furin, or all three combined, respectively, prophylactically at 18 hours prior to infection, therapeutically at 12 hours post infection, and infected with SARS-CoV-2 intranasally. Body weight can be monitored daily. On day 2 post infection, mice can be euthanized by isoflurane overdose and tissue samples can be harvested for analysis. Lung virus titration: lung tissue homogenates can be clarified by centrifugation and the supernatant can be inoculated onto Vero E6 cell cultures for virus titration. Lung histology (hemorrhage and assessment): two different histological assessment tools can be used to quantitate the histological features of lung injury, (i) the American Thoracic Society lung injury scoring tool and (ii) the DAD tool. Both will be used to assess lung histology. Detection of inflammatory cytokines and chemokines: cytokines and chemokines in mouse lung homogenates can be measured using a commercial Mouse Cytokine 20-Plex antibody bead kit (Thermo).

Example 5

Targeting HoxB13 and FoxA2 for Neuroendocrine Prostate Cancer (NEPC).

Neuroendocrine prostate cancer is a lethal form of the disease characterized by loss of androgen receptor (AR) signaling during neuroendocrine transdifferentiation, which results in resistance to AR-targeted therapy. Metastases to the lungs and liver are common and currently undruggable. Generating Mouse Models for Neuroendocrine Prostate Cancer.

Three NEPC cell lines NCI-H660 (H660), MSKCC-EF1, and PARCB2 are established to stably express a luciferase. Cell luciferase signal intensity is examined in vitro before injection into mice. NSG male mice (12~14 week-old) are purchased from Jackson Laboratory (Bar Harbor, ME). Upon receipt, mice are acclimated for one week before the study. All animal experiments are carried out according to a protocol approved by an Institutional Animal Care and Use Committee, or equivalent. Mice are intravenously injected with 0.5 million H660, MSKCC-EF1, or PARCB2 cell lines, respectively, in serum free DMEM or RPMI using insulin syringe (BD). Each cell line is injected into at least 5 mice. Bioluminescence of the full body is monitored using IVIS Lumina XR (Caliper Life Sciences) 1~2 h after cell injection and weekly afterwards until the visceral metastasis is established. Briefly, mice are anesthetized with isoflurane, fixed in the imaging chamber and imaged 15 minutes after Luciferin injection (150 mg/kg, i.p.). Bioluminescence signal is quantified using the Living Image software 4.2 (Caliper Life Sciences).

Counteracting NEPC Metastasis to the Liver and Lungs.

The ability of organ-selective LNPs carrying CasRx mRNA and gRNA (or pre-gRNA) to target HoxB13 and FoxA2 and to effectively counteract NEPC metastasis to the liver and lungs is assessed. Alexa Fluor 647 signal is examined in lung and liver using IVIS Lumina XR to evaluate LNP ability to target these organs as the dye is functionalized on the surfaces of the LNPs through surface-specific antigen binding aptamers bound to the LNP surface. The knockdown efficiency of HoxB13 and FoxA2 in mouse lung is assessed by qRT-PCR and western blot assays via the methods described above. Metastasis is monitored by bioluminescence measurement (photons/second) of the full body using IVIS Lumina XR as described elsewhere herein. HoxB13 and FoxA2 IHC is also performed to evaluate the knockdown efficiency as described above.

Nucleic Acid Aptamer Surface-Functionalized LNPs for NEPC Cell-Specific Targeting.

Specific binding of aptamers to cell membrane markers expressed on NEPC cells will be utilized to target NEPC cells. NEPC cell generally do not express the well-known prostate cancer cell surface marker PSMA, so other membrane markers are targeted, including NCAM1, CHGA, SYP, SNAP25 and CEACAM5. These markers are screened to determine the most effective aptamer-surface marker pair(s) to be used to target aptamer-functionalized LNPs to the NEPC cells. Immunostaining and western blots are used, details for which are described above. For surface-functionalizing LNPs with Apts, Alexa Fluor 647-amine-functionalized NEPC Aptamers are reacted with lipid-PEG-COOH (carboxy-modified PEG) via carbodiimide coupling chemistry. The reaction product lipid-PEG-Aptamer are then incorporated into LNPs by incubation at 4° C. for 48 hours.

Sequences

| SEQ ID NO. | Seq Name | Spacer Sequence (5' to 3') |
|---|---|---|
| 1 | Human-HOXB13-1 pre-gRNA spacer | TCCCGGATAGAAGGCAAACTCAGTGGGGCG |
| 2 | Human-HOXB13-2 pre-gRNA spacer | AGATCTCTTAAGGGGTAGCGCTGTTCTTCA |
| 3 | Human-HOXB13-3 pre-gRNA spacer | AGGGGGCATAGTTGACAGCAGGCATCAGCG |
| 4 | Human-HOXB13-4 pre-gRNA spacer | CAAAAGGGACCTGGTGGGTTCTGTTCTCCC |
| 5 | Human-TMPRSS2-1 pre-gRNA spacer | ATCGACATTGCCGGCACTTGTGTTCAGTTT |
| 6 | Human-TMPRSS2-2 pre-gRNA spacer | TAATTTGGATGAGAAATCACTTTTTCTACT |
| 7 | Human-TMPRSS2-3 pre-gRNA spacer | TGGTTTTCATAGTAAGGTCCAATAGCTGGT |
| 8 | Human-TMPRSS2-4 pre-gRNA spacer | CCCCTATCAGCCACCAGATATTGTTCTTCG |

| 9 | Human-CTSL1 pre-gRNA spacer | CTGAGGCAATTCCACAATGGTTTCTCCGGT |
|---|---|---|
| 10 | Human-CTSL2 pre-gRNA spacer | TTATTGTTATCTGATTCTGTGCTTTCAAAT |
| 11 | Human-CTSL3 pre-gRNA spacer | ACACCATGATCCATGTCTTCACTGCTACAG |
| 12 | Human-CTSL4 pre-gRNA spacer | CCTGCATCAATAGCAACAGAAATGGGCCCC |
| 13 | Mouse-Tmprss2-1 pre-gRNA spacer | TCTCAGAATTCCCGCAAATGCCGTCCAGTA |
| 14 | Mouse-Tmprss2-2 pre-gRNA spacer | TGAGAGCAATGTCGTTATTCTTGGTCTTAG |
| 15 | Mouse-Tmprss2-3 pre-gRNA spacer | CGTCACGTTCCCGTATACTCCAGGTCTGAG |
| 16 | Mouse-Tmprss2-4 pre-gRNA spacer | CAGACTGATACCCGTGGTTCTCATAGCAAG |
| 17 | Mouse-Cts11 pre-gRNA spacer | CCTCATTACCGCTACCCATCAATTCACGAC |
| 18 | Mouse-Cts12 pre-gRNA spacer | GCCGTGCTGCCCGTTGCTGTATTCCCCGTT |
| 19 | Mouse-Cts13 pre-gRNA spacer | TTGCCTTGAGCGTGAGAACAGTCCACAAGG |
| 20 | Mouse-Cts14 pre-gRNA spacer | CACAGCGAACTCGGCTCTGTATTTACAAGA |
| 21 | Human-FURIN-1 pre-gRNA spacer | TCCTGGTACACGTCCCGTTTAGTCCGTCGC |
| 22 | Human-FURIN-2 pre-gRNA spacer | GTTTTCAATCTCTAGGACCCACTCGCCAGA |
| 23 | Human-FURIN-3 pre-gRNA spacer | GCCCAGTCATTAAACCCATCTGCGGAGTAG |
| 24 | Human-FURIN-4 pre-gRNA spacer | CGAAAACTAAAGCCAGAGCGCAGCTGCAGG |
| 25 | Mouse-Furin-1 pre-gRNA spacer | CACCTCTAGCCGTTTGCCGATGTCCTTGGG |
| 26 | Mouse-Furin-2 pre-gRNA spacer | TGCCTGCTAGGTCGGGATGATTCTTCTCAA |
| 27 | Mouse-Furin-3 pre-gRNA spacer | CGTAGCCATACGAATGGCTCACTTTCCGGC |
| 28 | Mouse-Furin-4 pre-gRNA spacer | CAGGGCACATTGCCGAACTGTGTGGCGCTG |
| 29 | HOXB13 forward PCR primer | ACAGAACCCACCAGGTCCCTTT |
| 30 | HOXB13 reverse PCR primer | TACGGAATGCGTTTCTTGCGGC |
| 31 | Human-TMPRSS2 forward PCR primer | GTCCCCACTGTCTACGAGGT |
| 32 | Human-TMPRSS2 reverse PCR primer | CAGACGACGGGGTTGGAAG |
| 33 | Mouse-TMPRSS2 forward PCR primer | GAGAACCGTTGTGTTCGTCTC |
| 34 | Mouse-TMPRSS2 reverse PCR primer | GCTCTGGTCTGGTATCCCTTG |

| | | |
|---|---|---|
| 35 | Human-CTSL forward PCR primer | GTCAGTGTGGTTCTTGTTGG |
| 36 | Human-CTSL reverse-PCR primer | AAGGACTCATGACCTGCATC |
| 37 | Mouse-Cts1 forward PCR primer | ATGGCACGAATGAGGAAGAG |
| 38 | Mouse-Cts1 reverse PCR primer | GAAAAAGCCTCCCCTTCTTG |
| 39 | Human-FURIN forward PCR primer | CCTGGTTGCTATGGGTGGTAG |
| 40 | Human-FURIN reverse-PCR primer | AAGTGGTAATAGTCCCCGAAGA |
| 41 | Mouse-Furin forward PCR primer | TCGGTGACTATTACCACTTCTGG |
| 42 | Mouse-Furin reverse-PCR primer | CTCCTGATACACGTCCCTCTT |
| 43 | Mouse-P-actin forward PCR primer | CCTGAACCCTAAGGCCAACC |
| 44 | Mouse-P-actin reverse PCR primer | ATGGCGTGAGGGAGAGCATA |
| 45 | Human-P-actin forward PCR primer | AGGCACCAGGGCGTGAT |
| 46 | Human-P-actin reverse PCR primer | GCCCACATAGGAATCCTTCTGAC |
| 47 | NF2 forward PCR primer | TTGCGAGATGAAGTGGAAAGG |
| 48 | NF2 reverse PCR primer | CAAGAAGTGAAAGGTGACTGGTT |
| 49 | NFKB1 forward PCR primer | AACAGAGAGGATTTCGTTTCCG |
| 50 | NFKBI reverse PCR primer | TTTGACCTGAGGGTAAGACTTCT |
| 51 | PPARGI forward PCR primer | GGGATCAGCTCCGTGGATCT |
| 52 | PPARGI reverse PCR primer | TGCACTTTGGTACTCTTGAAGTT |
| 53 | NRAS forward PCR primer | ATGACTGAGTACAAACTGGTGGT |
| 54 | NRAS reverse PCR primer | CATGTATTGGTCTCTCATGGCAC |
| 55 | Human-HOXB13-1 gRNA spacer | TCCCGGATAGAAGGCAAACTCA |
| 56 | Human-HOXB13-2 gRNA spacer | AGATCTCTTAAGGGGTAGCGCT |
| 57 | Human-HOXB13-3 gRNA spacer | AGGGGGCATAGTTGACAGCAGG |
| 58 | Human-HOXB13-4 gRNA spacer | CAAAAGGGACCTGGTGGGTTCT |
| 59 | TAT peptide | YGRKKRRQRRR |
| 60 | Cas 13d processed direct repeat at 5' end of 22nt gRNA spacer | AACCCCTACCAACTGGTCGGGGTTTGAAAC |
| 61 | Cas 13d full length direct repeat; flanks | CAAGTAAACCCCTACCAACTGGTCGGGGTTTGAAAC |

| | | full length 30nt spacer |
|---|---|---|
| Pre-gRNA oligos with chemical modifications. Direct repeats and spacer included | | **5' to 3' (N: 2'OMe modification; *: phosphorothioate)** |
| 62 | Human-HOXB13 (the HOXB13 gRNA sequence has been chemically modified for in vivo study) | C*A*A*GUAA*A*C*CCCUACCAACUGGUCGGGGU UUGAAAC CAAAAGGGACCUGGUGGGUUCUGUUCUC CCCAAGUAAACCCCUACCAACUGGUCGGGGUUU G A*A*A*C |
| 63 | Human TMPRSS2 | C*A*A*GUAA*A*C*CCCUACCAACUGGUCGGGGU UUGAAAC UAAUUUGGAUGAGAAAUCACUUUUUCUACUCA AGUAAACC CCUACCAACUGGUCGGGGUUUGA*A*A*C |
| 64 | Human CTSL | C*A*A*GUAA*A*C*CCCUACCAACUGGUCGGGGU UUGAAAC CCUGCAUCAAUAGCAACAGAAAUGGGCCCCCAA GUAAACC CCUACCAACUGGUCGGGGUUUGA*A*A*C |
| 65 | Mouse Tmprss2 | C*A*A*GUAA*A*C*CCCUACCAACUGGUCGGGGU UUGAAAC CAGACUGAUACCCGUGGUUCUCAUAGCAAGCAA GUAAACC CCUACCAACUGGUCGGGGUUUGA*A*A*C |
| 66 | Mouse Cts1 | C*A*A*GUAA*A*C*CCCUACCAACUGGUCGGGGU UUGAAAC UUGCCUUGAGCGUGAGAACAGUCCACAAGGCAA GUAAACC CCUACCAACUGGUCGGGGUUUGA*A*A*C |
| 67 | Non-target | C*A*A*GUAA*A*C*CCCUACCAACUGGUCGGGGU UUGAAAC UCACCAGAAGCGUACCAUACUCACGAACAGCAA GUAAACC CCUACCAACUGGUCGGGGUUUGA*A*A*C |
| 68 | Human FURIN | C*A*A*GUAA*A*C*CCCUACCAACUGGUCGGGGU UUGAAAC GCCCAGUCAUUAAACCCAUCUGCGGAGUAGCAA GUAAACC CCUACCAACUGGUCGGGGUUUGA*A*A*C |
| 69 | Mouse Furin | C*A*A*GUAA*A*C*CCCUACCAACUGGUCGGGGU UUGAAAC CAGGGCACAUUGCCGAACUGUGUGGCGCUGCAA GUAAACC CCUACCAACUGGUCGGGGUUUGA*A*A*C |

NLS-CasRx-NLS-HA-T2A-EGFP portion of Addgene #109049 (SEQ ID NO: 70)

ATGAGCCCCAAGAAGAAGAGAAAGGTGGAGGCCAGCATCGAAAAAAAAAGTCCT

TCGCCAAGGGCATGGGCGTGAAGTCCACACTCGTGTCCGGCTCCAAAGTGTACATG

ACAACCTTCGCCGAAGGCAGCGACGCCAGGCTGGAAAAGATCGTGGAGGGCGACA

GCATCAGGAGCGTGAATGAGGGCGAGGCCTTCAGCGCTGAAATGGCCGATAAAAA

CGCCGGCTATAAGATCGGCAACGCCAAATTCAGCCATCCTAAGGGCTACGCCGTGG

TGGCTAACAACCCTCTGTATACAGGACCCGTCCAGCAGGATATGCTCGGCCTGAAG

GAAACTCTGGAAAAGAGGTACTTCGGCGAGAGCGCTGATGGCAATGACAATATTTG

TATCCAGGTGATCCATAACATCCTGGACATTGAAAAAATCCTCGCCGAATACATTAC

CAACGCCGCCTACGCCGTCAACAATATCTCCGGCCTGGATAAGGACATTATTGGATT

-continued

```
CGGCAAGTTCTCCACAGTGTATACCTACGACGAATTCAAAGACCCCGAGCACCATA
GGGCCGCTTTCAACAATAACGATAAGCTCATCAACGCCATCAAGGCCCAGTATGAC
GAGTTCGACAACTTCCTCGATAACCCCAGACTCGGCTATTTCGGCCAGGCCTTTTTC
AGCAAGGAGGGCAGAAATTACATCATCAATTACGGCAACGAATGCTATGACATTCT
GGCCCTCCTGAGCGGACTGAGGCACTGGGTGGTCCATAACAACGAAGAAGAGTCCA
GGATCTCCAGGACCTGGCTCTACAACCTCGATAAGAACCTCGACAACGAATACATC
TCCACCCTCAACTACCTCTACGACAGGATCACCAATGAGCTGACCAACTCCTTCTCC
AAGAACTCCGCCGCCAACGTGAACTATATTGCCGAAACTCTGGGAATCAACCCTGC
CGAATTCGCCGAACAATATTTCAGATTCAGCATTATGAAAGAGCAGAAAAACCTCG
GATTCAATATCACCAAGCTCAGGGAAGTGATGCTGGACAGGAAGGATATGTCCGAG
ATCAGGAAAAATCATAAGGTGTTCGACTCCATCAGGACCAAGGTCTACACCATGAT
GGACTTTGTGATTTATAGGTATTACATCGAAGAGGATGCCAAGGTGGCTGCCGCCA
ATAAGTCCCTCCCCGATAATGAGAAGTCCCTGAGCGAGAAGGATATCTTTGTGATT
AACCTGAGGGGCTCCTTCAACGACGACCAGAAGGATGCCCTCTACTACGATGAAGC
TAATAGAATTTGGAGAAAGCTCGAAAATATCATGCACAACATCAAGGAATTTAGGG
GAAACAAGACAAGAGAGTATAAGAAGAAGGACGCCCCTAGACTGCCCAGAATCCT
GCCCGCTGGCCGTGATGTTTCCGCCTTCAGCAAACTCATGTATGCCCTGACCATGTT
CCTGGATGGCAAGGAGATCAACGACCTCCTGACCACCCTGATTAATAAATTCGATA
ACATCCAGAGCTTCCTGAAGGTGATGCCTCTCATCGGAGTCAACGCTAAGTTCGTGG
AGGAATACGCCTTTTTCAAAGACTCCGCCAAGATCGCCGATGAGCTGAGGCTGATC
AAGTCCTTCGCTAGAATGGGAGAACCTATTGCCGATGCCAGGAGGGCCATGTATAT
CGACGCCATCCGTATTTTAGGAACCAACCTGTCCTATGATGAGCTCAAGGCCCTCGC
CGACACCTTTTCCCTGGACGAGAACGGAAACAAGCTCAAGAAAGGCAAGCACGGC
ATGAGAAATTTCATTATTAATAACGTGATCAGCAATAAAAGGTTCCACTACCTGATC
AGATACGGTGATCCTGCCCACCTCCATGAGATCGCCAAAAACGAGGCCGTGGTGAA
GTTCGTGCTCGGCAGGATCGCTGACATCCAGAAAAAACAGGGCCAGAACGGCAAG
AACCAGATCGACAGGTACTACGAAACTTGTATCGGAAAGGATAAGGGCAAGAGCG
TGAGCGAAAAGGTGGACGCTCTCACAAAGATCATCACCGGAATGAACTACGACCAA
TTCGACAAGAAAAGGAGCGTCATTGAGGACACCGGCAGGGAAAACGCCGAGAGGG
AGAAGTTTAAAAAGATCATCAGCCTGTACCTCACCGTGATCTACCACATCCTCAAG
AATATTGTCAATATCAACGCCAGGTACGTCATCGGATTCCATTGCGTCGAGCGTGAT
GCTCAACTGTACAAGGAGAAAGGCTACGACATCAATCTCAAGAAACTGGAAGAGA
AGGGATTCAGCTCCGTCACCAAGCTCTGCGCTGGCATTGATGAAACTGCCCCCCGAT
AAGAGAAAGGACGTGGAAAAGGAGATGGCTGAAAGAGCCAAGGAGAGCATTGAC
AGCCTCGAGAGCGCCAACCCCAAGCTGTATGCCAATTACATCAAATACAGCGACGA
GAAGAAAGCCGAGGAGTTCACCAGGCAGATTAACAGGGAGAAGGCCAAAACCGCC
CTGAACGCCTACCTGAGGAACACCAAGTGGAATGTGATCATCAGGGAGGACCTCCT
GAGAATTGACAACAAGACATGTACCCTGTTCAGAAACAAGGCCGTCCACCTGGAAG
TGGCCAGGTATGTCCACGCCTATATCAACGACATTGCCGAGGTCAATTCCTACTTCC
AACTGTACCATTACATCATGCAGAGAATTATCATGAATGAGAGGTACGAGAAAAGC
AGCGGAAAGGTGTCCGAGTACTTCGACGCTGTGAATGACGAGAAGAAGTACAACG
```

-continued

```
ATAGGCTCCTGAAACTGCTGTGTGTGCCTTTCGGCTACTGTATCCCCAGGTTTAAGA
ACCTGAGCATCGAGGCCCTGTTCGATAGGAACGAGGCCGCCAAGTTCGACAAGGAG
AAAAAGAAGGTGTCCGGCAATTCCGGATCCGGACCTAAGAAAAAGAGGAAGGTGG
CGGCCGCTTACCCATACGATGTTCCAGATTACGCTGCTAGCGGCAGTGGAGAGGGC
AGAGGAAGTCTGCTAACATGCGGTGACGTCGAGGAGAATCCTGGCCCAGTGAGCAA
GGGCGAGGAGCTGTTCACCGGGGTGGTGCCCATCCTGGTCGAGCTGGACGGCGACG
TAAACGGCCACAAGTTCAGCGTGTCCGGCGAGGGCGAGGGCGATGCCACCTACGGC
AAGCTGACCCTGAAGTTCATCTGCACCACCGGCAAGCTGCCCGTGCCCTGGCCCAC
CCTCGTGACCACCCTGACCTACGGCGTGCAGTGCTTCAGCCGCTACCCCGACCACAT
GAAGCAGCACGACTTCTTCAAGTCCGCCATGCCCGAAGGCTACGTCCAGGAGCGCA
CCATCTTCTTCAAGGACGACGGCAACTACAAGACCCGCGCCGAGGTGAAGTTCGAG
GGCGACACCCTGGTGAACCGCATCGAGCTGAAGGGCATCGACTTCAAGGAGGACG
GCAACATCCTGGGGCACAAGCTGGAGTACAACTACAACAGCCACAACGTCTATATC
ATGGCCGACAAGCAGAAGAACGGCATCAAGGTGAACTTCAAGATCCGCCACAACA
TCGAGGACGGCAGCGTGCAGCTCGCCGACCACTACCAGCAGAACACCCCCATCGGC
GACGGCCCCGTGCTGCTGCCCGACAACCACTACCTGAGCACCCAGTCCGCCCTGAG
CAAAGACCCCAACGAGAAGCGCGATCACATGGTCCTGCTGGAGTTCGTGACCGCCG
CCGGGATCACTCTCGGCATGGACGAGCTGTACAAGTAA
NLS sequence from NLS-CasRx-NLS-HA-T2A-EGFP (Addgene #109049)                    (SEQ ID NO: 71)
AGCCCCAAGAAGAAGAGAAAGGTG
CasRx sequence from NLS-CasRx-NLS-HA-T2A-EGFP (Addgene #109049)                  (SEQ ID NO: 72)
GAGGCCAGCATCGAAAAAAAAAAGTCCTTCGCCAAGGGCATGGGCGTGAAGTCCA
CACTCGTGTCCGGCTCCAAAGTGTACATGACAACCTTCGCCGAAGGCAGCGACGCC
AGGCTGGAAAAGATCGTGGAGGGCGACAGCATCAGGAGCGTGAATGAGGGCGAGG
CCTTCAGCGCTGAAATGGCCGATAAAAACGCCGGCTATAAGATCGGCAACGCCAAA
TTCAGCCATCCTAAGGGCTACGCCGTGGTGGCTAACAACCCTCTGTATACAGGACCC
GTCCAGCAGGATATGCTCGGCCTGAAGGAAACTCTGGAAAAGAGGTACTTCGGCGA
GAGCGCTGATGGCAATGACAATATTTGTATCCAGGTGATCCATAACATCCTGGACA
TTGAAAAAATCCTCGCCGAATACATTACCAACGCCGCCTACGCCGTCAACAATATCT
CCGGCCTGGATAAGGACATTATTGGATTCGGCAAGTTCTCCACAGTGTATACCTACG
ACGAATTCAAAGACCCCGAGCACCATAGGGCCGCTTTCAACAATAACGATAAGCTC
ATCAACGCCATCAAGGCCCAGTATGACGAGTTCGACAACTTCCTCGATAACCCCAG
ACTCGGCTATTTCGGCCAGGCCTTTTTCAGCAAGGAGGGCAGAAATTACATCATCA
ATTCGGCAACGAATGCTATGACATTCTGGCCCTCCTGAGCGGACTGAGGCACTGG
GTGGTCCATAACAACGAAGAAGAGTCCAGGATCTCCAGGACCTGGCTCTACAACCT
CGATAAGAACCTCGACAACGAATACATCTCCACCCTCAACTACCTCTACGACAGGA
TCACCAATGAGCTGACCAACTCCTTCTCCAAGAACTCCGCCGCCAACGTGAACTATA
TTGCCGAAACTCTGGGAATCAACCCTGCCGAATTCGCCGAACAATATTTCAGATTCA
GCATTATGAAAGAGCAGAAAAACCTCGGATTCAATATCACCAAGCTCAGGGAAGTG
ATGCTGGACAGGAAGGATATGTCCGAGATCAGGAAAAATCATAAGGTGTTCGACTC
```

-continued

```
CATCAGGACCAAGGTCTACACCATGATGGACTTTGTGATTTATAGGTATTACATCGA

AGAGGATGCCAAGGTGGCTGCCGCCAATAAGTCCCTCCCCGATAATGAGAAGTCCC

TGAGCGAGAAGGATATCTTTGTGATTAACCTGAGGGGCTCCTTCAACGACGACCAG

AAGGATGCCCTCTACTACGATGAAGCTAATAGAATTTGGAGAAAGCTCGAAAATAT

CATGCACAACATCAAGGAATTTAGGGGAAACAAGACAAGAGAGTATAAGAAGAAG

GACGCCCCTAGACTGCCCAGAATCCTGCCCGCTGGCCGTGATGTTTCCGCCTTCAGC

AAACTCATGTATGCCCTGACCATGTTCCTGGATGGCAAGGAGATCAACGACCTCCT

GACCACCCTGATTAATAAATTCGATAACATCCAGAGCTTCCTGAAGGTGATGCCTCT

CATCGGAGTCAACGCTAAGTTCGTGGAGGAATACGCCTTTTTCAAAGACTCCGCCA

AGATCGCCGATGAGCTGAGGCTGATCAAGTCCTTCGCTAGAATGGGAGAACCTATT

GCCGATGCCAGGAGGGCCATGTATATCGACGCCATCCGTATTTTAGGAACCAACCT

GTCCTATGATGAGCTCAAGGCCCTCGCCGACACCTTTTCCCTGGACGAGAACGGAA

ACAAGCTCAAGAAAGGCAAGCACGGCATGAGAAATTTCATTATTAATAACGTGATC

AGCAATAAAAGGTTCCACTACCTGATCAGATACGGTGATCCTGCCCACCTCCATGA

GATCGCCAAAAACGAGGCCGTGGTGAAGTTCGTGCTCGGCAGGATCGCTGACATCC

AGAAAAAACAGGGCCAGAACGGCAAGAACCAGATCGACAGGTACTACGAAACTTG

TATCGGAAAGGATAAGGGCAAGAGCGTGAGCGAAAAGGTGGACGCTCTCACAAAG

ATCATCACCGGAATGAACTACGACCAATTCGACAAGAAAAGGAGCGTCATTGAGGA

CACCGGCAGGGAAAACGCCGAGAGGGAGAAGTTTAAAAAGATCATCAGCCTGTAC

CTCACCGTGATCTACCACATCCTCAAGAATATTGTCAATATCAACGCCAGGTACGTC

ATCGGATTCCATTGCGTCGAGCGTGATGCTCAACTGTACAAGGAGAAAGGCTACGA

CATCAATCTCAAGAAACTGGAAGAGAAGGGATTCAGCTCCGTCACCAAGCTCTGCG

CTGGCATTGATGAAACTGCCCCCGATAAGAGAAAGGACGTGGAAAAGGAGATGGC

TGAAAGAGCCAAGGAGAGCATTGACAGCCTCGAGAGCGCCAACCCCAAGCTGTAT

GCCAATTACATCAAATACAGCGACGAGAAGAAAGCCGAGGAGTTCACCAGGCAGA

TTAACAGGGAGAAGGCCAAAACCGCCCTGAACGCCTACCTGAGGAACACCAAGTG

GAATGTGATCATCAGGGAGGACCTCCTGAGAATTGACAACAAGACATGTACCCTGT

TCAGAAACAAGGCCGTCCACCTGGAAGTGGCCAGGTATGTCCACGCCTATATCAAC

GACATTGCCGAGGTCAATTCCTACTTCCAACTGTACCATTACATCATGCAGAGAATT

ATCATGAATGAGAGGTACGAGAAAAGCAGCGGAAAGGTGTCCGAGTACTTCGACG

CTGTGAATGACGAGAAGAAGTACAACGATAGGCTCCTGAAACTGCTGTGTGTGCCT

TTCGGCTACTGTATCCCCAGGTTTAAGAACCTGAGCATCGAGGCCCTGTTCGATAGG

AACGAGGCCGCCAAGTTCGACAAGGAGAAAAAGAAGGTGTCCGGCAATTCCGGAT

CCGGA

HA sequence from NLS-CasRx-NLS-HA-T2A-EGFP (Addgene #109049)
                                                                 (SEQ ID NO: 73)
GCGGCCGCTTACCCATACGATGTTCCAGATTACGCT T2A sequence from NLS-CasRx-NLS-HA-T2A-EGFP (Addgene #109049)
                                                                 (SEQ ID NO: 74)
GAGGGCAGAGGAAGTCTGCTAACATGCGGTGACGTCGAGGAGAATCCTGGCCCA EGFP sequence from NLS-CasRx-NLS-HA-T2A-EGFP (Addgene #109049)
                                                                 (SEQ ID NO: 75)
GTGAGCAAGGGCGAGGAGCTGTTCACCGGGGTGGTGCCCATCCTGGTCGAGCTGGA

CGGCGACGTAAACGGCCACAAGTTCAGCGTGTCCGGCGAGGGCGAGGGCGATGCC
```

```
ACCTACGGCAAGCTGACCCTGAAGTTCATCTGCACCACCGGCAAGCTGCCCGTGCC

CTGGCCCACCCTCGTGACCACCCTGACCTACGGCGTGCAGTGCTTCAGCCGCTACCC

CGACCACATGAAGCAGCACGACTTCTTCAAGTCCGCCATGCCCGAAGGCTACGTCC

AGGAGCGCACCATCTTCTTCAAGGACGACGGCAACTACAAGACCCGCGCCGAGGTG

AAGTTCGAGGGCGACACCCTGGTGAACCGCATCGAGCTGAAGGGCATCGACTTCAA

GGAGGACGGCAACATCCTGGGGCACAAGCTGGAGTACAACTACAACAGCCACAAC

GTCTATATCATGGCCGACAAGCAGAAGAACGGCATCAAGGTGAACTTCAAGATCCG

CCACAACATCGAGGACGGCAGCGTGCAGCTCGCCGACCACTACCAGCAGAACACCC

CCATCGGCGACGGCCCCGTGCTGCTGCCCGACAACCACTACCTGAGCACCCAGTCC

GCCCTGAGCAAAGACCCCAACGAGAAGCGCGATCACATGGTCCTGCTGGAGTTCGT

GACCGCCGCCGGGATCACTCTCGGCATGGACGAGCTGTACAAG
```

CasRx gRNA cloning backbone (Addgene #109053)       (SEQ ID NO: 76)

```
GCTAGCGAGGGCCTATTTCCCATGATTCCTTCATATTTGCATATACGATACAAGGCT

GTTAGAGAGATAATTGGAATTAATTTGACTGTAAACACAAAGATATTAGTACAAAA

TACGTGACGTAGAAAGTAATAATTTCTTGGGTAGTTTGCAGTTTTAAAATTATGTTT

TAAAATGGACTATCATATGCTTACCGTAACTTGAAAGTATTTCGATTTCTTGGCTTT

ATATATCTTGTGGAAAGGACGAAACACCGAACCCCTACCAACTGGTCGGGGTTTGA

AACGGGTCTTCGAGAAGACCTTTTTTTTGAATTCTGATGCGGTATTTTCTCCTTACGC

ATCTGTGCGGTATTTCACACCGCATACGTCAAAGCAACCATAGTACGCGCCCTGTAG

CGGCGCATTAAGCGCGGCGGGTGTGGTGGTTACGCGCAGCGTGACCGCTACACTTG

CCAGCGCCTTAGCGCCCGCTCCTTTCGCTTTCTTCCCTTCCTTTCTCGCCACGTTCGC

CGGCTTTCCCCGTCAAGCTCTAAATCGGGGGCTCCCTTTAGGGTTCCGATTTAGTGC

TTTACGGCACCTCGACCCCAAAAAACTTGATTTGGGTGATGGTTCACGTAGTGGGCC

ATCGCCCTGATAGACGGTTTTTCGCCCTTTGACGTTGGAGTCCACGTTCTTTAATAGT

GGACTCTTGTTCCAAACTGGAACAACACTCAACTCTATCTCGGGCTATTCTTTTGAT

TTATAAGGGATTTTGCCGATTTCGGTCTATTGGTTAAAAAATGAGCTGATTTAACAA

AAATTTAACGCGAATTTTAACAAAATATTAACGTTTACAATTTTATGGTGCACTCTC

AGTACAATCTGCTCTGATGCCGCATAGTTAAGCCAGCCCCGACACCCGCCAACACC

CGCTGACGCGCCCTGACGGGCTTGTCTGCTCCCGGCATCCGCTTACAGACAAGCTGT

GACCGTCTCCGGGAGCTGCATGTGTCAGAGGTTTTCACCGTCATCACCGAAACGCG

CGAGACGAAAGGGCCTCGTGATACGCCTATTTTTATAGGTTAATGTCATGATAATAA

TGGTTTCTTAGACGTCAGGTGGCACTTTTCGGGGAAATGTGCGCGGAACCCCTATTT

GTTTATTTTTCTAAATACATTCAAATATGTATCCGCTCATGAGACAATAACCCTGAT

AAATGCTTCAATAATATTGAAAAAGGAAGAGTATGAGTATTCAACATTTCCGTGTC

GCCCTTATTCCCTTTTTTGCGGCATTTTGCCTTCCTGTTTTTGCTCACCCAGAAACGC

TGGTGAAAGTAAAAGATGCTGAAGATCAGTTGGGTGCACGAGTGGGTTACATCGAA

CTGGATCTCAACAGCGGTAAGATCCTTGAGAGTTTTCGCCCCGAAGAACGTTTTCCA

ATGATGAGCACTTTTAAAGTTCTGCTATGTGGCGCGGTATTATCCCGTATTGACGCC

GGGCAAGAGCAACTCGGTCGCCGCATACACTATTCTCAGAATGACTTGGTTGAGTA

CTCACCAGTCACAGAAAAGCATCTTACGGATGGCATGACAGTAAGAGAATTATGCA
```

```
GTGCTGCCATAACCATGAGTGATAACACTGCGGCCAACTTACTTCTGACAACGATC

GGAGGACCGAAGGAGCTAACCGCTTTTTTGCACAACATGGGGGATCATGTAACTCG

CCTTGATCGTTGGGAACCGGAGCTGAATGAAGCCATACCAAACGACGAGCGTGACA

CCACGATGCCTGTAGCAATGGCAACAACGTTGCGCAAACTATTAACTGGCGAACTA

CTTACTCTAGCTTCCCGGCAACAATTAATAGACTGGATGGAGGCGGATAAAGTTGC

AGGACCACTTCTGCGCTCGGCCCTTCCGGCTGGCTGGTTTATTGCTGATAAATCTGG

AGCCGGTGAGCGTGGAAGCCGCGGTATCATTGCAGCACTGGGGCCAGATGGTAAGC

CCTCCCGTATCGTAGTTATCTACACGACGGGGAGTCAGGCAACTATGGATGAACGA

AATAGACAGATCGCTGAGATAGGTGCCTCACTGATTAAGCATTGGTAACTGTCAGA

CCAAGTTTACTCATATATACTTTAGATTGATTTAAAACTTCATTTTTAATTTAAAAGG

ATCTAGGTGAAGATCCTTTTTGATAATCTCATGACCAAAATCCCTTAACGTGAGTTT

TCGTTCCACTGAGCGTCAGACCCCGTAGAAAAGATCAAAGGATCTTCTTGAGATCCT

TTTTTTCTGCGCGTAATCTGCTGCTTGCAAACAAAAAAACCACCGCTACCAGCGGTG

GTTTGTTTGCCGGATCAAGAGCTACCAACTCTTTTTCCGAAGGTAACTGGCTTCAGC

AGAGCGCAGATACCAAATACTGTTCTTCTAGTGTAGCCGTAGTTAGGCCACCACTTC

AAGAACTCTGTAGCACCGCCTACATACCTCGCTCTGCTAATCCTGTTACCAGTGGCT

GCTGCCAGTGGCGATAAGTCGTGTCTTACCGGGTTGGACTCAAGACGATAGTTACC

GGATAAGGCGCAGCGGTCGGGCTGAACGGGGGGTTCGTGCACACAGCCCAGCTTGG

AGCGAACGACCTACACCGAACTGAGATACCTACAGCGTGAGCTATGAGAAAGCGCC

ACGCTTCCCGAAGGGAGAAAGGCGGACAGGTATCCGGTAAGCGGCAGGGTCGGAA

CAGGAGAGCGCACGAGGGAGCTTCCAGGGGGAAACGCCTGGTATCTTTATAGTCCT

GTCGGGTTTCGCCACCTCTGACTTGAGCGTCGATTTTTGTGATGCTCGTCAGGGGG

CGGAGCCTATGGAAAAACGCCAGCAACGCGGCCTTTTTACGGTTCCTGGCCTTTTGC

TGGCCTTTTGCTCA

CasRx pre-gRNA cloning backbone (Addgene #109054)                (SEQ ID NO: 77)

GCTAGCGAGGGCCTATTTCCCATGATTCCTTCATATTTGCATATACGATACAAGGCT

GTTAGAGAGATAATTGGAATTAATTTGACTGTAAACACAAAGATATTAGTACAAAA

TACGTGACGTAGAAAGTAATAATTTCTTGGGTAGTTTGCAGTTTTAAAATTATGTTT

TAAAATGGACTATCATATGCTTACCGTAACTTGAAAGTATTTCGATTTCTTGGCTTT

ATATATCTTGTGGAAAGGACGAAACACCGCAAGTAAACCCCTACCAACTGGTCGGG

GTTTGAAACGGGTCTTCGAGAAGACCTCAAGTAAACCCCTACCAACTGGTCGGGGT

TTGAAACTTTTTTTGAATTCTGATGCGGTATTTTCTCCTTACGCATCTGTGCGGTATT

TCACACCGCATACGTCAAAGCAACCATAGTACGCGCCCTGTAGCGGCGCATTAAGC

GCGGCGGGTGTGGTGGTTACGCGCAGCGTGACCGCTACACTTGCCAGCGCCTTAGC

GCCCGCTCCTTTCGCTTTCTTCCCTTCCTTTCTCGCCACGTTCGCCGGCTTTCCCCGTC

AAGCTCTAAATCGGGGGCTCCCTTTAGGGTTCCGATTTAGTGCTTTACGGCACCTCG

ACCCCAAAAAACTTGATTTGGGTGATGGTTCACGTAGTGGGCCATCGCCCTGATAG

ACGGTTTTTCGCCCTTTGACGTTGGAGTCCACGTTCTTTAATAGTGGACTCTTGTTCC

AAACTGGAACAACACTCAACTCTATCTCGGGCTATTCTTTTGATTTATAAGGGATTT

TGCCGATTTCGGTCTATTGGTTAAAAAATGAGCTGATTTAACAAAAATTTAACGCGA

ATTTTAACAAAATATTAACGTTTACAATTTTATGGTGCACTCTCAGTACAATCTGCT
```

-continued

CTGATGCCGCATAGTTAAGCCAGCCCCGACACCCGCCAACACCCGCTGACGCGCCC

TGACGGGCTTGTCTGCTCCCGGCATCCGCTTACAGACAAGCTGTGACCGTCTCCGGG

AGCTGCATGTGTCAGAGGTTTTCACCGTCATCACCGAAACGCGCGAGACGAAAGGG

CCTCGTGATACGCCTATTTTTATAGGTTAATGTCATGATAATAATGGTTTCTTAGAC

GTCAGGTGGCACTTTTCGGGGAAATGTGCGCGGAACCCCTATTTGTTTATTTTTCTA

AATACATTCAAATATGTATCCGCTCATGAGACAATAACCCTGATAAATGCTTCAATA

ATATTGAAAAAGGAAGAGTATGAGTATTCAACATTTCCGTGTCGCCCTTATTCCCTT

TTTTGCGGCATTTTGCCTTCCTGTTTTTGCTCACCCAGAAACGCTGGTGAAAGTAAA

AGATGCTGAAGATCAGTTGGGTGCACGAGTGGGTTACATCGAACTGGATCTCAACA

GCGGTAAGATCCTTGAGAGTTTTCGCCCCGAAGAACGTTTTCCAATGATGAGCACTT

TTAAAGTTCTGCTATGTGGCGCGGTATTATCCCGTATTGACGCCGGGCAAGAGCAAC

TCGGTCGCCGCATACACTATTCTCAGAATGACTTGGTTGAGTACTCACCAGTCACAG

AAAAGCATCTTACGGATGGCATGACAGTAAGAGAATTATGCAGTGCTGCCATAACC

ATGAGTGATAACACTGCGGCCAACTTACTTCTGACAACGATCGGAGGACCGAAGGA

GCTAACCGCTTTTTTGCACAACATGGGGGATCATGTAACTCGCCTTGATCGTTGGGA

ACCGGAGCTGAATGAAGCCATACCAAACGACGAGCGTGACACCACGATGCCTGTAG

CAATGGCAACAACGTTGCGCAAACTATTAACTGGCGAACTACTTACTCTAGCTTCCC

GGCAACAATTAATAGACTGGATGGAGGCGGATAAAGTTGCAGGACCACTTCTGCGC

TCGGCCCTTCCGGCTGGCTGGTTTATTGCTGATAAATCTGGAGCCGGTGAGCGTGGA

AGCCGCGGTATCATTGCAGCACTGGGGCCAGATGGTAAGCCCTCCCGTATCGTAGT

TATCTACACGACGGGGAGTCAGGCAACTATGGATGAACGAAATAGACAGATCGCTG

AGATAGGTGCCTCACTGATTAAGCATTGGTAACTGTCAGACCAAGTTTACTCATATA

TACTTTAGATTGATTTAAAACTTCATTTTTAATTTAAAAGGATCTAGGTGAAGATCC

TTTTTGATAATCTCATGACCAAAATCCCTTAACGTGAGTTTTCGTTCCACTGAGCGTC

AGACCCCGTAGAAAAGATCAAAGGATCTTCTTGAGATCCTTTTTTTCTGCGCGTAAT

CTGCTGCTTGCAAACAAAAAAACCACCGCTACCAGCGGTGGTTTGTTTGCCGGATC

AAGAGCTACCAACTCTTTTTCCGAAGGTAACTGGCTTCAGCAGAGCGCAGATACCA

AATACTGTTCTTCTAGTGTAGCCGTAGTTAGGCCACCACTTCAAGAACTCTGTAGCA

CCGCCTACATACCTCGCTCTGCTAATCCTGTTACCAGTGGCTGCTGCCAGTGGCGAT

AAGTCGTGTCTTACCGGGTTGGACTCAAGACGATAGTTACCGGATAAGGCGCAGCG

GTCGGGCTGAACGGGGGGTTCGTGCACACAGCCCAGCTTGGAGCGAACGACCTACA

CCGAACTGAGATACCTACAGCGTGAGCTATGAGAAAGCGCCACGCTTCCCGAAGGG

AGAAAGGCGGACAGGTATCCGGTAAGCGGCAGGGTCGGAACAGGAGAGCGCACGA

GGGAGCTTCCAGGGGGAAACGCCTGGTATCTTTATAGTCCTGTCGGGTTTCGCCACC

TCTGACTTGAGCGTCGATTTTTGTGATGCTCGTCAGGGGGGCGGAGCCTATGGAAA

AACGCCAGCAACGCGGCCTTTTTACGGTTCCTGGCCTTTTGCTGGCCTTTTGCTCA

Full length sequence for Addgene #109049 containing, in part, NLS-CasRx-NLS-HA-T2A-EGFP
(SEQ ID NO: 78)

GTCGACGGATCGGGAGATCTCCCGATCCCCTATGGTGCACTCTCAGTACAATCTGCT

CTGATGCCGCATAGTTAAGCCAGTATCTGCTCCCTGCTTGTGTGTTGGAGGTCGCTG

AGTAGTGCGCGAGCAAAATTTAAGCTACAACAAGGCAAGGCTTGACCGACAATTGC

-continued

```
ATGAAGAATCTGCTTAGGGTTAGGCGTTTTGCGCTGCTTCGCGATGTACGGGCCAGA
TATACGCGTTGACATTGATTATTGACTAGTTATTAATAGTAATCAATTACGGGGTCA
TTAGTTCATAGCCCATATATGGAGTTCCGCGTTACATAACTTACGGTAAATGGCCCG
CCTGGCTGACCGCCCAACGACCCCCGCCCATTGACGTCAATAATGACGTATGTTCCC
ATAGTAACGCCAATAGGGACTTTCCATTGACGTCAATGGGTGGAGTATTTACGGTA
AACTGCCCACTTGGCAGTACATCAAGTGTATCATATGCCAAGTACGCCCCCTATTGA
CGTCAATGACGGTAAATGGCCCGCCTGGCATTATGCCCAGTACATGACCTTATGGG
ACTTTCCTACTTGGCAGTACATCTACGTATTAGTCATCGCTATTACCATGGTGATGC
GGTTTTGGCAGTACATCAATGGGCGTGGATAGCGGTTTGACTCACGGGGATTTCCA
AGTCTCCACCCCATTGACGTCAATGGGAGTTTGTTTTGGCACCAAAATCAACGGGAC
TTTCCAAAATGTCGTAACAACTCCGCCCCATTGACGCAAATGGGCGGTAGGCGTGT
ACGGTGGGAGGTCTATATAAGCAGCGCGTTTTGCCTGTACTGGGTCTCTCTGGTTAG
ACCAGATCTGAGCCTGGGAGCTCTCTGGCTAACTAGGGAACCCACTGCTTAAGCCT
CAATAAAGCTTGCCTTGAGTGCTTCAAGTAGTGTGTGCCCGTCTGTTGTGTGACTCT
GGTAACTAGAGATCCCTCAGACCCTTTTAGTCAGTGTGGAAAATCTCTAGCAGTGGC
GCCCGAACAGGGACTTGAAAGCGAAAGGGAAACCAGAGGAGCTCTCTCGACGCAG
GACTCGGCTTGCTGAAGCGCGCACGGCAAGAGGCGAGGGGCGGCGACTGGTGAGT
ACGCCAAAAATTTTGACTAGCGGAGGCTAGAAGGAGAGAGATGGGTGCGAGAGCG
TCAGTATTAAGCGGGGGAGAATTAGATCGCGATGGGAAAAAATTCGGTTAAGGCCA
GGGGGAAAGAAAAAATATAAATTAAAACATATAGTATGGGCAAGCAGGGAGCTAG
AACGATTCGCAGTTAATCCTGGCCTGTTAGAAACATCAGAAGGCTGTAGACAAATA
CTGGGACAGCTACAACCATCCCTTCAGACAGGATCAGAAGAACTTAGATCATTATA
TAATACAGTAGCAACCCTCTATTGTGTGCATCAAAGGATAGAGATAAAAGACACCA
AGGAAGCTTTAGACAAGATAGAGGAAGAGCAAAACAAAAGTAAGACCACCGCACA
GCAAGCGGCCGCTGATCTTCAGACCTGGAGGAGGAGATATGAGGGACAATTGGAG
AAGTGAATTATATAAATATAAAGTAGTAAAAATTGAACCATTAGGAGTAGCACCCA
CCAAGGCAAAGAGAAGAGTGGTGCAGAGAGAAAAAAGAGCAGTGGGAATAGGAG
CTTTGTTCCTTGGGTTCTTGGGAGCAGCAGGAAGCACTATGGGCGCAGCGTCAATG
ACGCTGACGGTACAGGCCAGACAATTATTGTCTGGTATAGTGCAGCAGCAGAACAA
TTTGCTGAGGGCTATTGAGGCGCAACAGCATCTGTTGCAACTCACAGTCTGGGGCAT
CAAGCAGCTCCAGGCAAGAATCCTGGCTGTGGAAAGATACCTAAAGGATCAACAGC
TCCTGGGGATTTGGGGTTGCTCTGGAAAACTCATTTGCACCACTGCTGTGCCTTGGA
ATGCTAGTTGGAGTAATAAATCTCTGGAACAGATTTGGAATCACACGACCTGGATG
GAGTGGGACAGAGAAATTAACAATTACACAAGCTTAATACACTCCTTAATTGAAGA
ATCGCAAAACCAGCAAGAAAAGAATGAACAAGAATTATTGGAATTAGATAAATGG
GCAAGTTTGTGGAATTGGTTTAACATAACAAATTGGCTGTGGTATATAAAATTATTC
ATAATGATAGTAGGAGGCTTGGTAGGTTTAAGAATAGTTTTTGCTGTACTTTCTATA
GTGAATAGAGTTAGGCAGGGATATTCACCATTATCGTTTCAGACCCACCTCCCAACC
CCGAGGGGACCCGACAGGCCCGAAGGAATAGAAGAAGAAGGTGGAGAGAGAGAC
AGAGACAGATCCATTCGATTAGTGAACGGATCGGCACTGCGTGCGCCAATTCTGCA
```

-continued

```
GACAAATGGCAGTATTCATCCACAATTTTAAAAGAAAAGGGGGGATTGGGGGGTAC

AGTGCAGGGGAAAGAATAGTAGACATAATAGCAACAGACATACAAACTAAAGAAT

TACAAAAACAAATTACAAAAATTCAAAATTTTCGGGTTTATTACAGGGACAGCAGA

GATCCAGTTTGGTTAATTAATGCAAAGATGGATAAAGTTTTAAACAGAGAGGAATC

TTTGCAGCTAATGGACCTTCTAGGTCTTGAAAGGAGTGGGAATTGGCTCCGGTGCCC

GTCAGTGGGCAGAGCGCACATCGCCCACAGTCCCCGAGAAGTTGGGGGGAGGGGT

CGGCAATTGAACCGGTGCCTAGAGAAGGTGGCGCGGGGTAAACTGGGAAAGTGAT

GTCGTGTACTGGCTCCGCCTTTTTCCCGAGGGTGGGGGAGAACCGTATATAAGTGCA

GTAGTCGCCGTGAACGTTCTTTTTCGCAACGGGTTTGCCGCCAGAACACAGGTAAGT

GCCGTGTGTGGTTCCCGCGGGCCTGGCCTCTTTACGGGTTATGGCCCTTGCGTGCCT

TGAATTACTTCCACTGGCTGCAGTACGTGATTCTTGATCCCGAGCTTCGGGTTGGAA

GTGGGTGGGAGAGTTCGAGGCCTTGCGCTTAAGGAGCCCCTTCGCCTCGTGCTTGA

GTTGAGGCCTGGCCTGGGCGCTGGGGCCGCCGCGTGCGAATCTGGTGGCACCTTCG

CGCCTGTCTCGCTGCTTTCGATAAGTCTCTAGCCATTTAAAATTTTTGATGACCTGCT

GCGACGCTTTTTTTCTGGCAAGATAGTCTTGTAAATGCGGGCCAAGATCTGCACACT

GGTATTTCGGTTTTTGGGGCCGCGGGCGGCGACGGGGCCCGTGCGTCCCAGCGCAC

ATGTTCGGCGAGGCGGGGCCTGCGAGCGCGGCCACCGAGAATCGGACGGGGGTAG

TCTCAAGCTGGCCGGCCTGCTCTGGTGCCTGGCCTCGCGCCGCCGTGTATCGCCCCG

CCCTGGGCGGCAAGGCTGGCCCGGTCGGCACCAGTTGCGTGAGCGGAAAGATGGCC

GCTTCCCGGCCCTGCTGCAGGGAGCTCAAAATGGAGGACGCGGCGCTCGGGAGAGC

GGGCGGGTGAGTCACCCACACAAAGGAAAAGGGCCTTTCCGTCCTCAGCCGTCGCT

TCATGTGACTCCACGGAGTACCGGGCGCCGTCCAGGCACCTCGATTAGTTCTCGAGC

TTTTGGAGTACGTCGTCTTTAGGTTGGGGGGAGGGGTTTTATGCGATGGAGTTTCCC

CACACTGAGTGGGTGGAGACTGAAGTTAGGCCAGCTTGGCACTTGATGTAATTCTC

CTTGGAATTTGCCCTTTTTGAGTTTGGATCTTGGTTCATTCTCAAGCCTCAGACAGTG

GTTCAAAGTTTTTTCTTCCATTTCAGGTGTCGTGACGTACGGCCACCATGAGCCCC

AAGAAGAAGAGAAAGGTGGAGGCCAGCATCGAAAAAAAAAAGTCCTTCGCCAAGG

GCATGGGCGTGAAGTCCACACTCGTGTCCGGCTCCAAAGTGTACATGACAACCTTC

GCCGAAGGCAGCGACGCCAGGCTGGAAAAGATCGTGGAGGGCGACAGCATCAGGA

GCGTGAATGAGGGCGAGGCCTTCAGCGCTGAAATGGCCGATAAAAACGCCGGCTAT

AAGATCGGCAACGCCAAATTCAGCCATCCTAAGGGCTACGCCGTGGTGGCTAACAA

CCCTCTGTATACAGGACCCGTCCAGCAGGATATGCTCGGCCTGAAGGAAACTCTGG

AAAAGAGGTACTTCGGCGAGAGCGCTGATGGCAATGACAATATTTGTATCCAGGTG

ATCCATAACATCCTGGACATTGAAAAAATCCTCGCCGAATACATTACCAACGCCGC

CTACGCCGTCAACAATATCTCCGGCCTGGATAAGGACATTATTGGATTCGGCAAGTT

CTCCACAGTGTATACCTACGACGAATTCAAAGACCCCGAGCACCATAGGGCCGCTT

TCAACAATAACGATAAGCTCATCAACGCCATCAAGGCCCAGTATGACGAGTTCGAC

AACTTCCTCGATAACCCCAGACTCGGCTATTTCGGCCAGGCCTTTTTCAGCAAGGAG

GGCAGAAATTACATCATCAATTACGGCAACGAATGCTATGACATTCTGGCCCTCCTG

AGCGGACTGAGGCACTGGGTGGTCCATAACAACGAAGAAGAGTCCAGGATCTCCA

GGACCTGGCTCTACAACCTCGATAAGAACCTCGACAACGAATACATCTCCACCCTC
```

-continued

```
AACTACCTCTACGACAGGATCACCAATGAGCTGACCAACTCCTTCTCCAAGAACTCC
GCCGCCAACGTGAACTATATTGCCGAAACTCTGGGAATCAACCCTGCCGAATTCGC
CGAACAATATTTCAGATTCAGCATTATGAAAGAGCAGAAAAACCTCGGATTCAATA
TCACCAAGCTCAGGGAAGTGATGCTGGACAGGAAGGATATGTCCGAGATCAGGAA
AAATCATAAGGTGTTCGACTCCATCAGGACCAAGGTCTACACCATGATGGACTTTGT
GATTTATAGGTATTACATCGAAGAGGATGCCAAGGTGGCTGCCGCCAATAAGTCCC
TCCCCGATAATGAGAAGTCCCTGAGCGAGAAGGATATCTTTGTGATTAACCTGAGG
GGCTCCTTCAACGACGACCAGAAGGATGCCCTCTACTACGATGAAGCTAATAGAAT
TTGGAGAAAGCTCGAAAATATCATGCACAACATCAAGGAATTTAGGGGAAACAAG
ACAAGAGAGTATAAGAAGAAGGACGCCCCTAGACTGCCCAGAATCCTGCCCGCTGG
CCGTGATGTTTCCGCCTTCAGCAAACTCATGTATGCCCTGACCATGTTCCTGGATGG
CAAGGAGATCAACGACCTCCTGACCACCCTGATTAATAAATTCGATAACATCCAGA
GCTTCCTGAAGGTGATGCCTCTCATCGGAGTCAACGCTAAGTTCGTGGAGGAATAC
GCCTTTTTCAAAGACTCCGCCAAGATCGCCGATGAGCTGAGGCTGATCAAGTCCTTC
GCTAGAATGGGAGAACCTATTGCCGATGCCAGGAGGGCCATGTATATCGACGCCAT
CCGTATTTTAGGAACCAACCTGTCCTATGATGAGCTCAAGGCCCTCGCCGACACCTT
TTCCCTGGACGAGAACGGAAACAAGCTCAAGAAAGGCAAGCACGGCATGAGAAAT
TTCATTATTAATAACGTGATCAGCAATAAAAGGTTCCACTACCTGATCAGATACGGT
GATCCTGCCCACCTCCATGAGATCGCCAAAAACGAGGCCGTGGTGAAGTTCGTGCT
CGGCAGGATCGCTGACATCCAGAAAAAACAGGGCCAGAACGGCAAGAACCAGATC
GACAGGTACTACGAAACTTGTATCGGAAAGGATAAGGGCAAGAGCGTGAGCGAAA
AGGTGGACGCTCTCACAAAGATCATCACCGGAATGAACTACGACCAATTCGACAAG
AAAAGGAGCGTCATTGAGGACACCGGCAGGGAAAACGCCGAGAGGGAGAAGTTTA
AAAAGATCATCAGCCTGTACCTCACCGTGATCTACCACATCCTCAAGAATATTGTCA
ATATCAACGCCAGGTACGTCATCGGATTCCATTGCGTCGAGCGTGATGCTCAACTGT
ACAAGGAGAAAGGCTACGACATCAATCTCAAGAAACTGGAAGAGAAGGGATTCAG
CTCCGTCACCAAGCTCTGCGCTGGCATTGATGAAACTGCCCCCGATAAGAGAAAGG
ACGTGGAAAAGGAGATGGCTGAAAGAGCCAAGGAGAGCATTGACAGCCTCGAGAG
CGCCAACCCCAAGCTGTATGCCAATTACATCAAATACAGCGACGAGAAGAAAGCCG
AGGAGTTCACCAGGCAGATTAACAGGGAGAAGGCCAAAACCGCCCTGAACGCCTA
CCTGAGGAACACCAAGTGGAATGTGATCATCAGGGAGGACCTCCTGAGAATTGACA
ACAAGACATGTACCCTGTTCAGAAACAAGGCCGTCCACCTGGAAGTGGCCAGGTAT
GTCCACGCCTATATCAACGACATTGCCGAGGTCAATTCCTACTTCCAACTGTACCAT
TACATCATGCAGAGAATTATCATGAATGAGAGGTACGAGAAAAGCAGCGGAAAGG
TGTCCGAGTACTTCGACGCTGTGAATGACGAGAAGAAGTACAACGATAGGCTCCTG
AAACTGCTGTGTGTGCCTTTCGGCTACTGTATCCCCAGGTTTAAGAACCTGAGCATC
GAGGCCCTGTTCGATAGGAACGAGGCCGCCAAGTTCGACAAGGAGAAAAAGAAGG
TGTCCGGCAATTCCGGATCCGGACCTAAGAAAAAGAGGAAGGTGGCGGCCGCTTAC
CCATACGATGTTCCAGATTACGCTGCTAGCGGCAGTGGAGAGGGCAGAGGAAGTCT
GCTAACATGCGGTGACGTCGAGGAGAATCCTGGCCCAGTGAGCAAGGGCGAGGAG
```

-continued

```
CTGTTCACCGGGGTGGTGCCCATCCTGGTCGAGCTGGACGGCGACGTAAACGGCCA

CAAGTTCAGCGTGTCCGGCGAGGGCGAGGGCGATGCCACCTACGGCAAGCTGACCC

TGAAGTTCATCTGCACCACCGGCAAGCTGCCCGTGCCCTGGCCCACCCTCGTGACCA

CCCTGACCTACGGCGTGCAGTGCTTCAGCCGCTACCCCGACCACATGAAGCAGCAC

GACTTCTTCAAGTCCGCCATGCCCGAAGGCTACGTCCAGGAGCGCACCATCTTCTTC

AAGGACGACGGCAACTACAAGACCCGCGCCGAGGTGAAGTTCGAGGGCGACACCC

TGGTGAACCGCATCGAGCTGAAGGGCATCGACTTCAAGGAGGACGGCAACATCCTG

GGGCACAAGCTGGAGTACAACTACAACAGCCACAACGTCTATATCATGGCCGACAA

GCAGAAGAACGGCATCAAGGTGAACTTCAAGATCCGCCACAACATCGAGGACGGC

AGCGTGCAGCTCGCCGACCACTACCAGCAGAACACCCCCATCGGCGACGGCCCCGT

GCTGCTGCCCGACAACCACTACCTGAGCACCCAGTCCGCCCTGAGCAAAGACCCCA

ACGAGAAGCGCGATCACATGGTCCTGCTGGAGTTCGTGACCGCCGCCGGGATCACT

CTCGGCATGGACGAGCTGTACAAGTAAGAATTCGATATCAAGCTTATCGATAATCA

ACCTCTGGATTACAAAATTTGTGAAAGATTGACTGGTATTCTTAACTATGTTGCTCC

TTTTACGCTATGTGGATACGCTGCTTTAATGCCTTTGTATCATGCTATTGCTTCCCGT

ATGGCTTTCATTTTCTCCTCCTTGTATAAATCCTGGTTGCTGTCTCTTTATGAGGAGT

TGTGGCCCGTTGTCAGGCAACGTGGCGTGGTGTGCACTGTGTTTGCTGACGCAACCC

CCACTGGTTGGGGCATTGCCACCACCTGTCAGCTCCTTTCCGGGACTTTCGCTTTCCC

CCTCCCTATTGCCACGGCGGAACTCATCGCCGCCTGCCTTGCCCGCTGCTGGACAGG

GGCTCGGCTGTTGGGCACTGACAATTCCGTGGTGTTGTCGGGGAAATCATCGTCCTT

TCCTTGGCTGCTCGCCTGTGTTGCCACCTGGATTCTGCGCGGGACGTCCTTCTGCTAC

GTCCCTTCGGCCCTCAATCCAGCGGACCTTCCTTCCCGCGGCCTGCTGCCGGCTCTG

CGGCCTCTTCCGCGTCTTCGCCTTCGCCCTCAGACGAGTCGGATCTCCCTTTGGGCC

GCCTCCCCGCATCGATACCGTCGACCTCGAGACCTAGAAAAACATGGAGCAATCAC

AAGTAGCAATACAGCAGCTACCAATGCTGATTGTGCCTGGCTAGAAGCACAAGAGG

AGGAGGAGGTGGGTTTTCCAGTCACACCTCAGGTACCTTTAAGACCAATGACTTAC

AAGGCAGCTGTAGATCTTAGCCACTTTTTAAAAGAAAAGGGGGGACTGGAAGGGCT

AATTCACTCCCAACGAAGACAAGATATCCTTGATCTGTGGATCTACCACACACAAG

GCTACTTCCCTGATTGGCAGAACTACACACCAGGGCCAGGGATCAGATATCCACTG

ACCTTTGGATGGTGCTACAAGCTAGTACCAGTTGAGCAAGAGAAGGTAGAAGAAGC

CAATGAAGGAGAGAACACCCGCTTGTTACACCCTGTGAGCCTGCATGGGATGGATG

ACCCGGAGAGAGAAGTATTAGAGTGGAGGTTTGACAGCCGCCTAGCATTTCATCAC

ATGGCCCGAGAGCTGCATCCGGACTGTACTGGGTCTCTCTGGTTAGACCAGATCTGA

GCCTGGGAGCTCTCTGGCTAACTAGGGAACCCACTGCTTAAGCCTCAATAAAGCTT

GCCTTGAGTGCTTCAAGTAGTGTGTGCCCGTCTGTTGTGTGACTCTGGTAACTAGAG

ATCCCTCAGACCCTTTTAGTCAGTGTGGAAAATCTCTAGCAGGGCCCGTTTAAACCC

GCTGATCAGCCTCGACTGTGCCTTCTAGTTGCCAGCCATCTGTTGTTTGCCCCTCCCC

CGTGCCTTCCTTGACCCTGGAAGGTGCCACTCCCACTGTCCTTTCCTAATAAAATGA

GGAAATTGCATCGCATTGTCTGAGTAGGTGTCATTCTATTCTGGGGGGTGGGGTGGG

GCAGGACAGCAAGGGGGAGGATTGGGAAGACAATAGCAGGCATGCTGGGGATGCG

GTGGGCTCTATGGCTTCTGAGGCGGAAAGAACCAGCTGGGGCTCTAGGGGGTATCC
```

-continued

```
CCACGCGCCCTGTAGCGGCGCATTAAGCGCGGCGGGTGTGGTGGTTACGCGCAGCG
TGACCGCTACACTTGCCAGCGCCCTAGCGCCCGCTCCTTTCGCTTTCTTCCCTTCCTT
TCTCGCCACGTTCGCCGGCTTTCCCCGTCAAGCTCTAAATCGGGGGCTCCCTTTAGG
GTTCCGATTTAGTGCTTTACGGCACCTCGACCCCAAAAAACTTGATTAGGGTGATGG
TTCACGTAGTGGGCCATCGCCCTGATAGACGGTTTTTCGCCCTTTGACGTTGGAGTC
CACGTTCTTTAATAGTGGACTCTTGTTCCAAACTGGAACAACACTCAACCCTATCTC
GGTCTATTCTTTTGATTTATAAGGGATTTTGCCGATTTCGGCCTATTGGTTAAAAAT
GAGCTGATTTAACAAAAATTTAACGCGAATTAATTCTGTGGAATGTGTGTCAGTTAG
GGTGTGGAAAGTCCCCAGGCTCCCCAGCAGGCAGAAGTATGCAAAGCATGCATCTC
AATTAGTCAGCAACCAGGTGTGGAAAGTCCCCAGGCTCCCCAGCAGGCAGAAGTAT
GCAAAGCATGCATCTCAATTAGTCAGCAACCATAGTCCCGCCCCTAACTCCGCCCAT
CCCGCCCCTAACTCCGCCCAGTTCCGCCCATTCTCCGCCCCATGGCTGACTAATTTTT
TTTATTTATGCAGAGGCCGAGGCCGCCTCTGCCTCTGAGCTATTCCAGAAGTAGTGA
GGAGGCTTTTTTGGAGGCCTAGGCTTTTGCAAAAAGCTCCCGGGAGCTTGTATATCC
ATTTTCGGATCTGATCAGCACGTGTTGACAATTAATCATCGGCATAGTATATCGGCA
TAGTATAATACGACAAGGTGAGGAACTAAACCATGGCCAAGTTGACCAGTGCCGTT
CCGGTGCTCACCGCGCGCGACGTCGCCGGAGCGGTCGAGTTCTGGACCGACCGGCT
CGGGTTCTCCCGGGACTTCGTGGAGGACGACTTCGCCGGTGTGGTCCGGGACGACG
TGACCCTGTTCATCAGCGCGGTCCAGGACCAGGTGGTGCCGGACAACACCCTGGCC
TGGGTGTGGGTGCGCGGCCTGGACGAGCTGTACGCCGAGTGGTCGGAGGTCGTGTC
CACGAACTTCCGGGACGCCTCCGGGCCGGCCATGACCGAGATCGGCGAGCAGCCGT
GGGGGCGGGAGTTCGCCCTGCGCGACCCGGCCGGCAACTGCGTGCACTTCGTGGCC
GAGGAGCAGGACTGACACGTGCTACGAGATTTCGATTCCACCGCCGCCTTCTATGA
AAGGTTGGGCTTCGGAATCGTTTTCCGGGACGCCGGCTGGATGATCCTCCAGCGCG
GGGATCTCATGCTGGAGTTCTTCGCCCACCCCAACTTGTTTATTGCAGCTTATAATG
GTTACAAATAAAGCAATAGCATCACAAATTTCACAAATAAAGCATTTTTTTCACTGC
ATTCTAGTTGTGGTTTGTCCAAACTCATCAATGTATCTTATCATGTCTGTATACCGTC
GACCTCTAGCTAGAGCTTGGCGTAATCATGGTCATAGCTGTTTCCTGTGTGAAATTG
TTATCCGCTCACAATTCCACACAACATACGAGCCGGAAGCATAAAGTGTAAAGCCT
GGGGTGCCTAATGAGTGAGCTAACTCACATTAATTGCGTTGCGCTCACTGCCCGCTT
TCCAGTCGGGAAACCTGTCGTGCCAGCTGCATTAATGAATCGGCCAACGCGCGGGG
AGAGGCGGTTTGCGTATTGGGCGCTCTTCCGCTTCCTCGCTCACTGACTCGCTGCGC
TCGGTCGTTCGGCTGCGGCGAGCGGTATCAGCTCACTCAAAGGCGGTAATACGGTT
ATCCACAGAATCAGGGGATAACGCAGGAAAGAACATGTGAGCAAAAGGCCAGCAA
AAGGCCAGGAACCGTAAAAAGGCCGCGTTGCTGGCGTTTTTCCATAGGCTCCGCCC
CCCTGACGAGCATCACAAAAATCGACGCTCAAGTCAGAGGTGGCGAAACCCGACA
GGACTATAAAGATACCAGGCGTTTCCCCCTGGAAGCTCCCTCGTGCGCTCTCCTGTT
CCGACCCTGCCGCTTACCGGATACCTGTCCGCCTTTCTCCCTTCGGGAAGCGTGGCG
CTTTCTCATAGCTCACGCTGTAGGTATCTCAGTTCGGTGTAGGTCGTTCGCTCCAAG
CTGGGCTGTGTGCACGAACCCCCCGTTCAGCCCGACCGCTGCGCCTTATCCGGTAAC
```

-continued
TATCGTCTTGAGTCCAACCCGGTAAGACACGACTTATCGCCACTGGCAGCAGCCACT

GGTAACAGGATTAGCAGAGCGAGGTATGTAGGCGGTGCTACAGAGTTCTTGAAGTG

GTGGCCTAACTACGGCTACACTAGAAGAACAGTATTTGGTATCTGCGCTCTGCTGAA

GCCAGTTACCTTCGGAAAAAGAGTTGGTAGCTCTTGATCCGGCAAACAAACCACCG

CTGGTAGCGGTGGTTTTTTTGTTTGCAAGCAGCAGATTACGCGCAGAAAAAAGGA

TCTCAAGAAGATCCTTTGATCTTTTCTACGGGGTCTGACGCTCAGTGGAACGAAAAC

TCACGTTAAGGGATTTTGGTCATGAGATTATCAAAAAGGATCTTCACCTAGATCCTT

TTAAATTAAAAATGAAGTTTTAAATCAATCTAAAGTATATATGAGTAAACTTGGTCT

GACAGTTACCAATGCTTAATCAGTGAGGCACCTATCTCAGCGATCTGTCTATTTCGT

TCATCCATAGTTGCCTGACTCCCCGTCGTGTAGATAACTACGATACGGGAGGGCTTA

CCATCTGGCCCCAGTGCTGCAATGATACCGCGAGACCCACGCTCACCGGCTCCAGA

TTTATCAGCAATAAACCAGCCAGCCGGAAGGGCCGAGCGCAGAAGTGGTCCTGCAA

CTTTATCCGCCTCCATCCAGTCTATTAATTGTTGCCGGGAAGCTAGAGTAAGTAGTT

CGCCAGTTAATAGTTTGCGCAACGTTGTTGCCATTGCTACAGGCATCGTGGTGTCAC

GCTCGTCGTTTGGTATGGCTTCATTCAGCTCCGGTTCCCAACGATCAAGGCGAGTTA

CATGATCCCCATGTTGTGCAAAAAAGCGGTTAGCTCCTTCGGTCCTCCGATCGTTG

TCAGAAGTAAGTTGGCCGCAGTGTTATCACTCATGGTTATGGCAGCACTGCATAATT

CTCTTACTGTCATGCCATCCGTAAGATGCTTTTCTGTGACTGGTGAGTACTCAACCA

AGTCATTCTGAGAATAGTGTATGCGGCGACCGAGTTGCTCTTGCCCGGCGTCAATAC

GGGATAATACCGCGCCACATAGCAGAACTTTAAAAGTGCTCATCATTGGAAAACGT

TCTTCGGGGCGAAAACTCTCAAGGATCTTACCGCTGTTGAGATCCAGTTCGATGTAA

CCCACTCGTGCACCCAACTGATCTTCAGCATCTTTTACTTTCACCAGCGTTTCTGGGT

GAGCAAAAACAGGAAGGCAAAATGCCGCAAAAAAGGGAATAAGGGCGACACGGA

AATGTTGAATACTCATACTCTTCCTTTTTCAATATTATTGAAGCATTTATCAGGGTTA

TTGTCTCATGAGCGGATACATATTTGAATGTATTTAGAAAAATAAACAAATAGGGG

TTCCGCGCACATTTCCCCGAAAAGTGCCACCTGAC

One skilled in the art will readily appreciate that the present disclosure is well adapted to carry out the objects and obtain the ends and advantages mentioned, as well as those inherent therein. The disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims. In addition, the section headings used herein are for organizational purposes only and are not to be construed as limiting the subject matter described.

No admission is made that any reference, including any non-patent or patent document cited in this specification, constitutes prior art. In particular, it will be understood that, unless otherwise stated, reference to any document herein does not constitute an admission that any of these documents form part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise.

The present disclosure shall control in the event there are any disparities between any definitions and/or description found in any cited references or elsewhere.

We claim:

1. A nanoparticle (NP) for targeted delivery of a CRISPR/Cas13d system comprising:
   a nanoparticle carrier;
   a first nucleic acid sequence encoding a Cas13d; and
   one or more additional nucleic acid sequences comprising
   (i) one or more guide RNA (gRNA) or pre-guide RNA (pre-gRNA) sequences targeting HoxB13,
      wherein the one or more pre-gRNAs comprise the sequence set forth in any one of SEQ ID NO: 1-SEQ ID NO: 4;
      wherein the one or more gRNAs comprise the sequence set forth in any one of SEQ ID NO: 55-SEQ ID NO: 58; and
   (ii) one or more direct repeat (DR) RNA sequences comprising the sequence of SEQ ID NO:60 or SEQ ID NO:61, wherein a pre-gRNA comprises flanking DR RNA sequences and wherein a gRNA comprises a 5' DR RNA sequence.

2. The NP of claim 1 wherein the NP carrier comprises a polymer-lipid, a lipid, or gold.

3. The NP of claim 1, further comprising a cationic cell penetrating peptide (cpp).

4. The NP of claim 1, further comprising a nucleic acid aptamer (Apt) immobilized on the surface of the NP.

5. The NP of claim 4 wherein the Apt targets castration resistant prostate cancer (CRPC) cells or neuroendocrine prostate cancer (NEPC) cells.

6. The NP of claim 1, wherein the nanoparticle carrier comprises a core encapsulating the first nucleic acid sequence and the one or more additional nucleic acid sequences, and a shell surrounding the core.

7. The NP of claim 6 wherein the core comprises polylactic-co-glycolic acid (PLGA), and/or wherein the shell comprises polyethyleneglycol (PEG).

8. The NP of claim 6 wherein the core comprises a first plasmid comprising the first nucleic acid sequence encoding the Cas13d and a second plasmid comprising the one or more additional nucleic acid sequences encoding the one or more DR RNA sequences and the one or more gRNA or pre-gRNA sequences.

9. The NP of claim 6 wherein the core comprises a plasmid comprising the first nucleic acid sequence encoding the Cas13d and the one or more additional nucleic acid sequences encoding the one or more DR RNA sequences and the one or more gRNA or pre-gRNA sequences.

10. The NP of claim 1 wherein the Cas13d is CasRx.

11. The NP of claim 1 wherein the NP carrier is formulated with selective organ targeting (SORT) technology to be lung-selective, spleen-selective or liver-selective.

12. A composition comprising the NP of claim 1 and a pharmaceutically acceptable carrier or excipient.

13. A nanoparticle (NP) for targeted delivery of a CRISPR/Cas13 system comprising:
   a nanoparticle carrier;
   a first nucleic acid sequence encoding a Cas13; and
   one or more additional nucleic acid sequences comprising
   (i) one or more guide RNA (gRNA) or pre-guide RNA (pre-gRNA) sequences targeting HoxB13,
      wherein the one or more pre-gRNAs comprise the sequence set forth in any one of SEQ ID NO: 1-SEQ ID NO: 4;
      wherein the one or mor gRNAs comprise the sequence set forth in any one of SEQ ID NO: 55-SEQ ID NO: 58; and
   (ii) one or more direct repeat (DR) RNA sequences comprising the sequence of SEQ ID NO:60 or SEQ ID NO:61, wherein a pre-gRNA comprises flanking DR RNA sequences and wherein a gRNA comprises a 5' DR RNA sequence.

14. The NP of claim 13 wherein the NP carrier comprises a polymer-lipid, a lipid, or gold.

15. The NP of claim 13, further comprising a cationic cell penetrating peptide (cpp).

16. The NP of claim 13, further comprising a nucleic acid aptamer (Apt) immobilized on the surface of the NP, and wherein the Apt targets castration resistant prostate cancer (CRPC) cells or neuroendocrine prostate cancer (NEPC) cells.

17. The NP of claim 13, wherein the NP carrier comprises a core encapsulating the first nucleic acid sequence and the one or more additional nucleic acid sequences, and a shell surrounding the core, and wherein the core comprises polylactic-co-glycolic acid (PLGA), and/or wherein the shell comprises polyethyleneglycol (PEG).

18. The NP of claim 17 wherein the core comprises a first plasmid comprising the first nucleic acid sequence encoding the Cas13d and a second plasmid comprising the one or more additional nucleic acid sequences encoding the one or more DR RNA sequences and the one or more gRNA or pre-gRNA sequences.

19. The NP of claim 17 wherein the core comprises a plasmid comprising the first nucleic acid sequence encoding the Cas13d and the one or more additional nucleic acid sequences encoding the one or more DR RNA sequences and the one or more gRNA or pre-gRNA sequences.

20. The NP of claim 13 wherein the NP carrier is formulated with selective organ targeting (SORT) technology to be lung-selective, spleen-selective or liver-selective.

* * * * *

SEQUENCE LISTING

<160> NUMBER OF SEQ ID NOS: 78

<210> SEQ ID NO 1
<211> LENGTH: 30
<212> TYPE: DNA
<213> ORGANISM: Artificial Sequence

```
<220> FEATURE:
<223> OTHER INFORMATION: Synthetic oligonucleotide

<400> SEQUENCE: 1
tcccggatag aaggcaaact cagtggggcg                                        30

<210> SEQ ID NO 2
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 2
agatctctta aggggtagcg ctgttcttca                                        30

<210> SEQ ID NO 3
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 3 aggggggcata gttgacagca ggcatcagcg                                       30

<210> SEQ ID NO 4
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 4
caaaagggac ctggtgggtt ctgttctccc                                        30

<210> SEQ ID NO 5
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 5
atcgacattg ccggcacttg tgttcagttt                                        30

<210> SEQ ID NO 6
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 6
taatttggat gagaaatcac tttttctact                                        30

<210> SEQ ID NO 7
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 7 tggtttcat agtaaggtcc aatagctggt                                         30
```

```
<210> SEQ ID NO 8
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 8 ccccctatcag ccaccagata ttgttcttcg                              30

<210> SEQ ID NO 9
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 9
ctgaggcaat tccacaatgg tttctccggt                               30

<210> SEQ ID NO 10
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 10
ttattgttat ctgattctgt gctttcaaat                               30

<210> SEQ ID NO 11
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 11
acaccatgat ccatgtcttc actgctacag                               30

<210> SEQ ID NO 12
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 12
cctgcatcaa tagcaacaga aatgggcccc                               30

<210> SEQ ID NO 13
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 13
tctcagaatt cccgcaaatg ccgtccagta                               30

<210> SEQ ID NO 14
<211> LENGTH: 30
<212> TYPE: DNA
<213> ORGANISM: Artificial Sequence
<220> FEATURE:
<223> OTHER INFORMATION: synthetic oligonucleotide
```

<400> SEQUENCE: 14
tgagagcaat gtcgttattc ttggtcttag                                      30

<210> SEQ ID NO 15
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 15
cgtcacgttc ccgtatactc caggtctgag                                      30

<210> SEQ ID NO 16
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 16
cagactgata cccgtggttc tcatagcaag                                      30

<210> SEQ ID NO 17
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 17
cctcattacc gctacccatc aattcacgac                                      30

<210> SEQ ID NO 18
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 18
gccgtgctgc ccgttgctgt attccccgtt                                      30

<210> SEQ ID NO 19
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 19
ttgccttgag cgtgagaaca gtccacaagg                                      30

<210> SEQ ID NO 20
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 20
cacagcgaac tcggctctgt atttacaaga                                      30

<210> SEQ ID NO 21

<210> SEQ ID NO 21
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 21
tcctggtaca cgtcccgttt agtccgtcgc                                       30

<210> SEQ ID NO 22
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 22
gttttcaatc tctaggaccc actcgccaga                                       30

<210> SEQ ID NO 23
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 23
gcccagtcat taaacccatc tgcggagtag                                       30

<210> SEQ ID NO 24
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 24
cgaaaactaa agccagagcg cagctgcagg                                       30

<210> SEQ ID NO 25
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 25
cacctctagc cgtttgccga tgtccttggg                                       30

<210> SEQ ID NO 26
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 26
tgcctgctag gtcgggatga ttcttctcaa                                       30

<210> SEQ ID NO 27
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 27
cgtagccata cgaatggctc actttccggc                30

<210> SEQ ID NO 28
<211> LENGTH: 30
<212> TYPE: DNA
<213> ORGANISM: Artificial Sequence
<220> FEATURE:
<223> OTHER INFORMATION: synthetic oligonucleotide

<400> SEQUENCE: 28
cagggcacat tgccgaactg tgtggcgctg                30

<210> SEQ ID NO 29
<211> LENGTH: 22
<212> TYPE: DNA
<213> ORGANISM: Artificial Sequence
<220> FEATURE:
<223> OTHER INFORMATION: synthetic oligonucleotide

<400> SEQUENCE: 29
acagaaccca ccaggtccct tt                22

<210> SEQ ID NO 30
<211> LENGTH: 22
<212> TYPE: DNA
<213> ORGANISM: Artificial Sequence
<220> FEATURE:
<223> OTHER INFORMATION: synthetic oligonucleotide

<400> SEQUENCE: 30
tacggaatgc gtttcttgcg gc                22

<210> SEQ ID NO 31
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 31
gtccccactg tctacgaggt                20

<210> SEQ ID NO 32
<211> LENGTH: 19
<212> TYPE: DNA
<213> ORGANISM: Artificial Sequence
<220> FEATURE:
<223> OTHER INFORMATION: synthetic oligonucleotide

<400> SEQUENCE: 32
cagacgacgg ggttggaag                19

<210> SEQ ID NO 33
<211> LENGTH: 21
<212> TYPE: DNA
<213> ORGANISM: Artificial Sequence
<220> FEATURE:
<223> OTHER INFORMATION: synthetic oligonucleotide

<400> SEQUENCE: 33
gagaaccgtt gtgttcgtct c                21

<210> SEQ ID NO 34
<211> LENGTH: 21
<212> TYPE: DNA

```
<213> ORGANISM: Artificial Sequence
<220> FEATURE:
<223> OTHER INFORMATION: synthetic oligonucleotide

<400> SEQUENCE: 34
gctctggtct ggtatccctt g                                              21

<210> SEQ ID NO 35
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 35
gtcagtgtgg ttcttgttgg                                                20

<210> SEQ ID NO 36
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 36
aaggactcat gacctgcatc                                                20

<210> SEQ ID NO 37
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 37
atggcacgaa tgaggaagag                                                20

<210> SEQ ID NO 38
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 38
gaaaaagcct cccttcttg                                                 20

<210> SEQ ID NO 39
<211> LENGTH: 21
<212> TYPE: DNA
<213> ORGANISM: Artificial Sequence
<220> FEATURE:
<223> OTHER INFORMATION: synthetic oligonucleotide

<400> SEQUENCE: 39
cctggttgct atgggtggta g                                              21

<210> SEQ ID NO 40
<211> LENGTH: 22
<212> TYPE: DNA
<213> ORGANISM: Artificial Sequence
<220> FEATURE:
<223> OTHER INFORMATION: synthetic oligonucleotide

<400> SEQUENCE: 40
aagtggtaat agtccccgaa ga                                             22
```

<210> SEQ ID NO 41
<211> LENGTH: 23
<212> TYPE: DNA
<213> ORGANISM: Artificial Sequence
<220> FEATURE:
<223> OTHER INFORMATION: synthetic oligonucleotide

<400> SEQUENCE: 41
tcggtgacta ttaccacttc tgg                                     23

<210> SEQ ID NO 42
<211> LENGTH: 21
<212> TYPE: DNA
<213> ORGANISM: Artificial Sequence
<220> FEATURE:
<223> OTHER INFORMATION: synthetic oligonucleotide

<400> SEQUENCE: 42
ctcctgatac acgtccctct t                                       21

<210> SEQ ID NO 43
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 43
cctgaaccct aaggccaacc                                         20

<210> SEQ ID NO 44
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 44
atggcgtgag ggagagcata                                         20

<210> SEQ ID NO 45
<211> LENGTH: 17
<212> TYPE: DNA
<213> ORGANISM: Artificial Sequence
<220> FEATURE:
<223> OTHER INFORMATION: synthetic oligonucleotide

<400> SEQUENCE: 45
aggcaccagg gcgtgat                                            17

<210> SEQ ID NO 46
<211> LENGTH: 23
<212> TYPE: DNA
<213> ORGANISM: Artificial Sequence
<220> FEATURE:
<223> OTHER INFORMATION: synthetic oligonucleotide

<400> SEQUENCE: 46
gcccacatag gaatccttct gac                                     23

<210> SEQ ID NO 47
<211> LENGTH: 21
<212> TYPE: DNA
<213> ORGANISM: Artificial Sequence
<220> FEATURE:

<223> OTHER INFORMATION: synthetic oligonucleotide

<400> SEQUENCE: 47
ttgcgagatg aagtggaaag g                                    21

<210> SEQ ID NO 48
<211> LENGTH: 23
<212> TYPE: DNA
<213> ORGANISM: Artificial Sequence
<220> FEATURE:
<223> OTHER INFORMATION: synthetic oligonucleotide

<400> SEQUENCE: 48
caagaagtga aaggtgactg gtt                                  23

<210> SEQ ID NO 49
<211> LENGTH: 22
<212> TYPE: DNA
<213> ORGANISM: Artificial Sequence
<220> FEATURE:
<223> OTHER INFORMATION: synthetic oligonucleotide

<400> SEQUENCE: 49
aacagagagg atttcgtttc cg                                   22

<210> SEQ ID NO 50
<211> LENGTH: 23
<212> TYPE: DNA
<213> ORGANISM: Artificial Sequence
<220> FEATURE:
<223> OTHER INFORMATION: synthetic oligonucleotide

<400> SEQUENCE: 50
tttgacctga gggtaagact tct                                  23

<210> SEQ ID NO 51
<211> LENGTH: 20
<212> TYPE: DNA
<213> ORGANISM: Artificial Sequence
<220> FEATURE:
<223> OTHER INFORMATION: synthetic oligonucleotide

<400> SEQUENCE: 51
gggatcagct ccgtggatct                                      20

<210> SEQ ID NO 52
<211> LENGTH: 23
<212> TYPE: DNA
<213> ORGANISM: Artificial Sequence
<220> FEATURE:
<223> OTHER INFORMATION: synthetic oligonucleotide

<400> SEQUENCE: 52
tgcactttgg tactcttgaa gtt                                  23

<210> SEQ ID NO 53
<211> LENGTH: 23
<212> TYPE: DNA
<213> ORGANISM: Artificial Sequence
<220> FEATURE:
<223> OTHER INFORMATION: synthetic oligonucleotide

<400> SEQUENCE: 53
atgactgagt acaaactggt ggt                                  23

```
<210> SEQ ID NO 54
<211> LENGTH: 23
<212> TYPE: DNA
<213> ORGANISM: Artificial Sequence
<220> FEATURE:
<223> OTHER INFORMATION: synthetic oligonucleotide

<400> SEQUENCE: 54
catgtattgg tctctcatgg cac                                          23

<210> SEQ ID NO 55
<211> LENGTH: 22
<212> TYPE: DNA
<213> ORGANISM: Artificial Sequence
<220> FEATURE:
<223> OTHER INFORMATION: synthetic oligonucleotide

<400> SEQUENCE: 55
tcccggatag aaggcaaact ca                                           22

<210> SEQ ID NO 56
<211> LENGTH: 22
<212> TYPE: DNA
<213> ORGANISM: Artificial Sequence
<220> FEATURE:
<223> OTHER INFORMATION: synthetic oligonucleotide

<400> SEQUENCE: 56
agatctctta aggggtagcg ct                                           22

<210> SEQ ID NO 57
<211> LENGTH: 22
<212> TYPE: DNA
<213> ORGANISM: Artificial Sequence
<220> FEATURE:
<223> OTHER INFORMATION: synthetic oligonucleotide

<400> SEQUENCE: 57 aggggggcata gttgacagca gg                                          22

<210> SEQ ID NO 58
<211> LENGTH: 22
<212> TYPE: DNA
<213> ORGANISM: Artificial Sequence
<220> FEATURE:
<223> OTHER INFORMATION: synthetic oligonucleotide

<400> SEQUENCE: 58
caaaagggac ctggtgggtt ct                                           22

<210> SEQ ID NO 59
<211> LENGTH: 11
<212> TYPE: PRT
<213> ORGANISM: Artificial Sequence
<220> FEATURE:
<223> OTHER INFORMATION: synthetic cell-penetrating TAT peptide

<400> SEQUENCE: 59

Tyr Gly Arg Lys Lys Arg Arg Gln Arg Arg Arg
1               5                   10

<210> SEQ ID NO 60
<211> LENGTH: 30
<212> TYPE: DNA
<213> ORGANISM: Artificial Sequence
<220> FEATURE:
<223> OTHER INFORMATION: synthetic oligonucleotide
```

```
<400> SEQUENCE: 60
aaccccuacc aacuggucgg ggutuugaaac                                           30

<210> SEQ ID NO 61
<211> LENGTH: 36
<212> TYPE: DNA
<213> ORGANISM: Artificial Sequence
<220> FEATURE:
<223> OTHER INFORMATION: synthetic oligonucleotide

<400> SEQUENCE: 61
caagtaaacc cctaccaact ggtcggggtt tgaaac                                     36

<210> SEQ ID NO 62
<211> LENGTH: 102
<212> TYPE: RNA
<213> ORGANISM: Artificial Sequence
<220> FEATURE:
<223> OTHER INFORMATION: synthetic oligonucleotide
<220> FEATURE:
<221> NAME/KEY: misc_feature
<222> LOCATION: (1)..(3)
<223> OTHER INFORMATION: 2'-OMe
<220> FEATURE:
<221> NAME/KEY: misc_feature
<222> LOCATION: (1)..(2)
<223> OTHER INFORMATION: phosphorothioate linkage
<220> FEATURE:
<221> NAME/KEY: misc_feature
<222> LOCATION: (2)..(3)
<223> OTHER INFORMATION: phosphorothioate linkage
<220> FEATURE:
<221> NAME/KEY: misc_feature
<222> LOCATION: (3)..(4)
<223> OTHER INFORMATION: phosphorothioate linkage
<220> FEATURE:
<221> NAME/KEY: misc_feature
<222> LOCATION: (7)..(8)
<223> OTHER INFORMATION: phosphorothioate linkage
<220> FEATURE:
<221> NAME/KEY: misc_feature
<222> LOCATION: (7)..(9)
<223> OTHER INFORMATION: 2'-OMe
<220> FEATURE:
<221> NAME/KEY: misc_feature
<222> LOCATION: (8)..(9)
<223> OTHER INFORMATION: phosphorothioate linkage
<220> FEATURE:
<221> NAME/KEY: misc_feature
<222> LOCATION: (9)..(10)
<223> OTHER INFORMATION: phosphorothioate linkage
<220> FEATURE:
<221> NAME/KEY: misc_feature
<222> LOCATION: (46)..(48)
<223> OTHER INFORMATION: 2'-OMe
<220> FEATURE:
<221> NAME/KEY: misc_feature
<222> LOCATION: (51)..(51)
<223> OTHER INFORMATION: 2'-OMe
<220> FEATURE:
<221> NAME/KEY: misc_feature
<222> LOCATION: (55)..(58)
<223> OTHER INFORMATION: 2'-OMe
<220> FEATURE:
<221> NAME/KEY: misc_feature
<222> LOCATION: (99)..(100)
<223> OTHER INFORMATION: phosphorothioate linkage
<220> FEATURE:
<221> NAME/KEY: misc_feature
<222> LOCATION: (99)..(101)
<223> OTHER INFORMATION: 2'-OMe
<220> FEATURE:
<221> NAME/KEY: misc_feature
<222> LOCATION: (100)..(101)
```

<223> OTHER INFORMATION: phosphorothioate linkage
<220> FEATURE:
<221> NAME/KEY: misc_feature
<222> LOCATION: (101)..(102)
<223> OTHER INFORMATION: phosphorothioate linkage

<400> SEQUENCE: 62
caaguaaacc ccuaccaacu ggucggggu ugaaaccaaa agggaccugg uggguucugu    60 ucucccaag uaaaccccua ccaacugguc ggggu uugaa ac                     102

<210> SEQ ID NO 63
<211> LENGTH: 102
<212> TYPE: RNA
<213> ORGANISM: Artificial Sequence
<220> FEATURE:
<223> OTHER INFORMATION: synthetic oligonucleotide
<220> FEATURE:
<221> NAME/KEY: misc_feature
<222> LOCATION: (1)..(3)
<223> OTHER INFORMATION: 2'-OMe
<220> FEATURE:
<221> NAME/KEY: misc_feature
<222> LOCATION: (1)..(2)
<223> OTHER INFORMATION: phosphorothioate linkage
<220> FEATURE:
<221> NAME/KEY: misc_feature
<222> LOCATION: (2)..(3)
<223> OTHER INFORMATION: phosphorothioate linkage
<220> FEATURE:
<221> NAME/KEY: misc_feature
<222> LOCATION: (3)..(4)
<223> OTHER INFORMATION: phosphorothioate linkage
<220> FEATURE:
<221> NAME/KEY: misc_feature
<222> LOCATION: (7)..(8)
<223> OTHER INFORMATION: phosphorothioate linkage
<220> FEATURE:
<221> NAME/KEY: misc_feature
<222> LOCATION: (7)..(9)
<223> OTHER INFORMATION: 2'-OMe
<220> FEATURE:
<221> NAME/KEY: misc_feature
<222> LOCATION: (8)..(9)
<223> OTHER INFORMATION: phosphorothioate linkage
<220> FEATURE:
<221> NAME/KEY: misc_feature
<222> LOCATION: (9)..(10)
<223> OTHER INFORMATION: phosphorothioate linkage
<220> FEATURE:
<221> NAME/KEY: misc_feature
<222> LOCATION: (37)..(37)
<223> OTHER INFORMATION: 2'-OMe
<220> FEATURE:
<221> NAME/KEY: misc_feature
<222> LOCATION: (40)..(42)
<223> OTHER INFORMATION: 2'-OMe
<220> FEATURE:
<221> NAME/KEY: misc_feature
<222> LOCATION: (46)..(46)
<223> OTHER INFORMATION: 2'-OMe
<220> FEATURE:
<221> NAME/KEY: misc_feature
<222> LOCATION: (53)..(54)
<223> OTHER INFORMATION: 2'-OMe
<220> FEATURE:
<221> NAME/KEY: misc_feature
<222> LOCATION: (56)..(59)
<223> OTHER INFORMATION: 2'-OMe
<220> FEATURE:
<221> NAME/KEY: misc_feature
<222> LOCATION: (99)..(100)
<223> OTHER INFORMATION: phosphorothioate linkage
<220> FEATURE:
<221> NAME/KEY: misc_feature
<222> LOCATION: (99)..(101)
<223> OTHER INFORMATION: 2'-OMe
<220> FEATURE:
<221> NAME/KEY: misc_feature
<222> LOCATION: (100)..(101)
<223> OTHER INFORMATION: phosphorothioate linkage
<220> FEATURE:
<221> NAME/KEY: misc_feature
<222> LOCATION: (100)..(102)
<223> OTHER INFORMATION: phosphorothioate linkage

<400> SEQUENCE: 63
caaguaaacc ccuaccaacu ggucggggu ugaaacuaau uuggaugaga aaucacuuuu    60
ucuacucaag uaaaccccua ccaacugguc gggguuugaa ac    102

<210> SEQ ID NO 64
<211> LENGTH: 102
<212> TYPE: RNA
<213> ORGANISM: Artificial Sequence
<220> FEATURE:
<223> OTHER INFORMATION: synthetic oligonucleotide
<220> FEATURE:
<221> NAME/KEY: misc_feature
<222> LOCATION: (1)..(3)
<223> OTHER INFORMATION: 2'-OMe
<220> FEATURE:
<221> NAME/KEY: misc_feature
<222> LOCATION: (1)..(2)
<223> OTHER INFORMATION: phosphorothioate linkage
<220> FEATURE:
<221> NAME/KEY: misc_feature
<222> LOCATION: (2)..(3)
<223> OTHER INFORMATION: phosphorothioate linkage
<220> FEATURE:
<221> NAME/KEY: misc_feature
<222> LOCATION: (3)..(4)
<223> OTHER INFORMATION: phosphorothioate linkage
<220> FEATURE:
<221> NAME/KEY: misc_feature
<222> LOCATION: (7)..(8)
<223> OTHER INFORMATION: phosphorothioate linkage
<220> FEATURE:
<221> NAME/KEY: misc_feature
<222> LOCATION: (7)..(9)
<223> OTHER INFORMATION: 2'-OMe
<220> FEATURE:
<221> NAME/KEY: misc_feature
<222> LOCATION: (8)..(9)
<223> OTHER INFORMATION: phosphorothioate linkage
<220> FEATURE:
<221> NAME/KEY: misc_feature
<222> LOCATION: (9)..(10)
<223> OTHER INFORMATION: phosphorothioate linkage
<220> FEATURE:
<221> NAME/KEY: misc_feature
<222> LOCATION: (37)..(39)
<223> OTHER INFORMATION: 2'-OMe
<220> FEATURE:
<221> NAME/KEY: misc_feature
<222> LOCATION: (41)..(41)
<223> OTHER INFORMATION: 2'-OMe
<220> FEATURE:
<221> NAME/KEY: misc_feature
<222> LOCATION: (43)..(44)
<223> OTHER INFORMATION: 2'-OMe
<220> FEATURE:
<221> NAME/KEY: misc_feature
<222> LOCATION: (47)..(47)
<223> OTHER INFORMATION: 2'-OMe
<220> FEATURE:
<221> NAME/KEY: misc_feature
<222> LOCATION: (50)..(50)
<223> OTHER INFORMATION: 2'-OMe
<220> FEATURE:
<221> NAME/KEY: misc_feature
<222> LOCATION: (56)..(56)
<223> OTHER INFORMATION: 2'-OMe
<220> FEATURE:

```
<221> NAME/KEY: misc_feature
<222> LOCATION: (99)..(100)
<223> OTHER INFORMATION: phosphorothioate linkage
<220> FEATURE:
<221> NAME/KEY: misc_feature
<222> LOCATION: (99)..(101)
<223> OTHER INFORMATION: 2'-OMe
<220> FEATURE:
<221> NAME/KEY: misc_feature
<222> LOCATION: (100)..(101)
<223> OTHER INFORMATION: phosphorothioate linkage
<220> FEATURE:
<221> NAME/KEY: misc_feature
<222> LOCATION: (101)..(102)
<223> OTHER INFORMATION: phosphorothioate linkage

<400> SEQUENCE: 64
caaguaaacc ccuaccaacu ggucgggguu ugaaacccug caucaauagc aacagaaaug      60
ggcccccaag uaaaccccua ccaacugguc gggguuugaa ac                       102

<210> SEQ ID NO 65
<211> LENGTH: 102
<212> TYPE: RNA
<213> ORGANISM: Artificial Sequence
<220> FEATURE:
<223> OTHER INFORMATION: synthetic oligonucleotide
<220> FEATURE:
<221> NAME/KEY: misc_feature
<222> LOCATION: (1)..(3)
<223> OTHER INFORMATION: 2'-OMe
<220> FEATURE:
<221> NAME/KEY: misc_feature
<222> LOCATION: (1)..(2)
<223> OTHER INFORMATION: phosphorothioate linkage
<220> FEATURE:
<221> NAME/KEY: misc_feature
<222> LOCATION: (2)..(3)
<223> OTHER INFORMATION: phosphorothioate linkage
<220> FEATURE:
<221> NAME/KEY: misc_feature
<222> LOCATION: (3)..(4)
<223> OTHER INFORMATION: phosphorothioate linkage
<220> FEATURE:
<221> NAME/KEY: misc_feature
<222> LOCATION: (7)..(8)
<223> OTHER INFORMATION: phosphorothioate linkage
<220> FEATURE:
<221> NAME/KEY: misc_feature
<222> LOCATION: (7)..(9)
<223> OTHER INFORMATION: 2'-OMe
<220> FEATURE:
<221> NAME/KEY: misc_feature
<222> LOCATION: (8)..(9)
<223> OTHER INFORMATION: phosphorothioate linkage
<220> FEATURE:
<221> NAME/KEY: misc_feature
<222> LOCATION: (9)..(10)
<223> OTHER INFORMATION: phosphorothioate linkage
<220> FEATURE:
<221> NAME/KEY: misc_feature
<222> LOCATION: (37)..(37)
<223> OTHER INFORMATION: 2'-OMe
<220> FEATURE:
<221> NAME/KEY: misc_feature
<222> LOCATION: (41)..(42)
<223> OTHER INFORMATION: 2'-OMe
<220> FEATURE:
<221> NAME/KEY: misc_feature
<222> LOCATION: (45)..(45)
<223> OTHER INFORMATION: 2'-OMe
<220> FEATURE:
<221> NAME/KEY: misc_feature
<222> LOCATION: (47)..(49)
<223> OTHER INFORMATION: 2'-OMe
<220> FEATURE:
<221> NAME/KEY: misc_feature
```

```
<222> LOCATION: (51)..(51)
<223> OTHER INFORMATION: 2'-OMe
<220> FEATURE:
<221> NAME/KEY: misc_feature
<222> LOCATION: (54)..(58)
<223> OTHER INFORMATION: 2'-OMe
<220> FEATURE:
<221> NAME/KEY: misc_feature
<222> LOCATION: (99)..(100)
<223> OTHER INFORMATION: phosphorothioate linkage
<220> FEATURE:
<221> NAME/KEY: misc_feature
<222> LOCATION: (99)..(101)
<223> OTHER INFORMATION: 2'-OMe
<220> FEATURE:
<221> NAME/KEY: misc_feature
<222> LOCATION: (100)..(101)
<223> OTHER INFORMATION: phosphorothioate linkage
<220> FEATURE:
<221> NAME/KEY: misc_feature
<222> LOCATION: (101)..(102)
<223> OTHER INFORMATION: phosphorothioate linkage

<400> SEQUENCE: 65
caaguaaacc ccuaccaacu ggucgggguu ugaaaccaga cugauacccg ugguucucau    60
agcaagcaag uaaaccccua ccaacugguc ggguuugaa ac                      102

<210> SEQ ID NO 66
<211> LENGTH: 102
<212> TYPE: RNA
<213> ORGANISM: Artificial Sequence
<220> FEATURE:
<223> OTHER INFORMATION: synthetic oligonucleotide
<220> FEATURE:
<221> NAME/KEY: misc_feature
<222> LOCATION: (1)..(3)
<223> OTHER INFORMATION: 2'-OMe
<220> FEATURE:
<221> NAME/KEY: misc_feature
<222> LOCATION: (1)..(2)
<223> OTHER INFORMATION: phosphorothioate linkage
<220> FEATURE:
<221> NAME/KEY: misc_feature
<222> LOCATION: (2)..(3)
<223> OTHER INFORMATION: phosphorothioate linkage
<220> FEATURE:
<221> NAME/KEY: misc_feature
<222> LOCATION: (3)..(4)
<223> OTHER INFORMATION: phosphorothioate linkage
<220> FEATURE:
<221> NAME/KEY: misc_feature
<222> LOCATION: (7)..(8)
<223> OTHER INFORMATION: phosphorothioate linkage
<220> FEATURE:
<221> NAME/KEY: misc_feature
<222> LOCATION: (7)..(9)
<223> OTHER INFORMATION: 2'-OMe
<220> FEATURE:
<221> NAME/KEY: misc_feature
<222> LOCATION: (8)..(9)
<223> OTHER INFORMATION: phosphorothioate linkage
<220> FEATURE:
<221> NAME/KEY: misc_feature
<222> LOCATION: (9)..(10)
<223> OTHER INFORMATION: phosphorothioate linkage
<220> FEATURE:
<221> NAME/KEY: misc_feature
<222> LOCATION: (37)..(38)
<223> OTHER INFORMATION: 2'-OMe
<220> FEATURE:
<221> NAME/KEY: misc_feature
<222> LOCATION: (40)..(43)
<223> OTHER INFORMATION: 2'-OMe
<220> FEATURE:
<221> NAME/KEY: misc_feature
<222> LOCATION: (47)..(47)
```

<223> OTHER INFORMATION: 2'-OMe
<220> FEATURE:
<221> NAME/KEY: misc_feature
<222> LOCATION: (49)..(49)
<223> OTHER INFORMATION: 2'-OMe
<220> FEATURE:
<221> NAME/KEY: misc_feature
<222> LOCATION: (55)..(55)
<223> OTHER INFORMATION: 2'-OMe
<220> FEATURE:
<221> NAME/KEY: misc_feature
<222> LOCATION: (58)..(59)
<223> OTHER INFORMATION: 2'-OMe
<220> FEATURE:
<221> NAME/KEY: misc_feature
<222> LOCATION: (99)..(100)
<223> OTHER INFORMATION: phosphorothioate linkage
<220> FEATURE:
<221> NAME/KEY: misc_feature
<222> LOCATION: (99)..(101)
<223> OTHER INFORMATION: 2'-OMe
<220> FEATURE:
<221> NAME/KEY: misc_feature
<222> LOCATION: (100)..(101)
<223> OTHER INFORMATION: phosphorothioate linkage
<220> FEATURE:
<221> NAME/KEY: misc_feature
<222> LOCATION: (101)..(102)
<223> OTHER INFORMATION: phosphorothioate linkage

<400> SEQUENCE: 66
caaguaaacc ccuaccaacu ggucgggguu ugaaacuugc cuugagcgug agaacagucc      60
acaaggcaag uaaacccccua ccaacugguc ggggguuugaa ac                     102

<210> SEQ ID NO 67
<211> LENGTH: 102
<212> TYPE: RNA
<213> ORGANISM: Artificial Sequence
<220> FEATURE:
<223> OTHER INFORMATION: synthetic oligonucleotide
<220> FEATURE:
<221> NAME/KEY: misc_feature
<222> LOCATION: (1)..(3)
<223> OTHER INFORMATION: 2'-OMe
<220> FEATURE:
<221> NAME/KEY: misc_feature
<222> LOCATION: (1)..(2)
<223> OTHER INFORMATION: phosphorothioate linkage
<220> FEATURE:
<221> NAME/KEY: misc_feature
<222> LOCATION: (2)..(3)
<223> OTHER INFORMATION: phosphorothioate linkage
<220> FEATURE:
<221> NAME/KEY: misc_feature
<222> LOCATION: (3)..(4)
<223> OTHER INFORMATION: phosphorothioate linkage
<220> FEATURE:
<221> NAME/KEY: misc_feature
<222> LOCATION: (7)..(8)
<223> OTHER INFORMATION: phosphorothioate linkage
<220> FEATURE:
<221> NAME/KEY: misc_feature
<222> LOCATION: (7)..(9)
<223> OTHER INFORMATION: 2'-OMe
<220> FEATURE:
<221> NAME/KEY: misc_feature
<222> LOCATION: (8)..(9)
<223> OTHER INFORMATION: phosphorothioate linkage
<220> FEATURE:
<221> NAME/KEY: misc_feature
<222> LOCATION: (9)..(10)
<223> OTHER INFORMATION: phosphorothioate linkage
<220> FEATURE:
<221> NAME/KEY: misc_feature
<222> LOCATION: (37)..(38)
<223> OTHER INFORMATION: 2'-OMe

```
<220> FEATURE:
<221> NAME/KEY: misc_feature
<222> LOCATION: (40)..(41)
<223> OTHER INFORMATION: 2'-OMe
<220> FEATURE:
<221> NAME/KEY: misc_feature
<222> LOCATION: (47)..(47)
<223> OTHER INFORMATION: 2'-OMe
<220> FEATURE:
<221> NAME/KEY: misc_feature
<222> LOCATION: (49)..(49)
<223> OTHER INFORMATION: 2'-OMe
<220> FEATURE:
<221> NAME/KEY: misc_feature
<222> LOCATION: (51)..(52)
<223> OTHER INFORMATION: 2'-OMe
<220> FEATURE:
<221> NAME/KEY: misc_feature
<222> LOCATION: (54)..(54)
<223> OTHER INFORMATION: 2'-OMe
<220> FEATURE:
<221> NAME/KEY: misc_feature
<222> LOCATION: (56)..(58)
<223> OTHER INFORMATION: 2'-OMe
<220> FEATURE:
<221> NAME/KEY: misc_feature
<222> LOCATION: (99)..(100)
<223> OTHER INFORMATION: phosphorothioate linkage
<220> FEATURE:
<221> NAME/KEY: misc_feature
<222> LOCATION: (99)..(101)
<223> OTHER INFORMATION: 2'-OMe
<220> FEATURE:
<221> NAME/KEY: misc_feature
<222> LOCATION: (100)..(101)
<223> OTHER INFORMATION: phosphorothioate linkage
<220> FEATURE:
<221> NAME/KEY: misc_feature
<222> LOCATION: (101)..(102)
<223> OTHER INFORMATION: phosphorothioate linkage

<400> SEQUENCE: 67
caaguaaacc ccuaccaacu ggucgggguu ugaaacucac cagaagcgua ccauacucac    60
gaacagcaag uaaaccccua ccaacugguc gggguuugaa ac                     102

<210> SEQ ID NO 68
<211> LENGTH: 102
<212> TYPE: RNA
<213> ORGANISM: Artificial Sequence
<220> FEATURE:
<223> OTHER INFORMATION: synthetic oligonucleotide
<220> FEATURE:
<221> NAME/KEY: misc_feature
<222> LOCATION: (1)..(3)
<223> OTHER INFORMATION: 2'-OMe
<220> FEATURE:
<221> NAME/KEY: misc_feature
<222> LOCATION: (1)..(2)
<223> OTHER INFORMATION: phosphorothioate linkage
<220> FEATURE:
<221> NAME/KEY: misc_feature
<222> LOCATION: (2)..(3)
<223> OTHER INFORMATION: phosphorothioate linkage
<220> FEATURE:
<221> NAME/KEY: misc_feature
<222> LOCATION: (3)..(4)
<223> OTHER INFORMATION: phosphorothioate linkage
<220> FEATURE:
<221> NAME/KEY: misc_feature
<222> LOCATION: (7)..(8)
<223> OTHER INFORMATION: phosphorothioate linkage
<220> FEATURE:
<221> NAME/KEY: misc_feature
<222> LOCATION: (7)..(9)
<223> OTHER INFORMATION: 2'-OMe
<220> FEATURE:
```

<221> NAME/KEY: misc_feature
<222> LOCATION: (8)..(9)
<223> OTHER INFORMATION: phosphorothioate linkage
<220> FEATURE:
<221> NAME/KEY: misc_feature
<222> LOCATION: (9)..(10)
<223> OTHER INFORMATION: phosphorothioate linkage
<220> FEATURE:
<221> NAME/KEY: misc_feature
<222> LOCATION: (38)..(40)
<223> OTHER INFORMATION: 2'-OMe
<220> FEATURE:
<221> NAME/KEY: misc_feature
<222> LOCATION: (43)..(44)
<223> OTHER INFORMATION: 2'-OMe
<220> FEATURE:
<221> NAME/KEY: misc_feature
<222> LOCATION: (46)..(47)
<223> OTHER INFORMATION: 2'-OMe
<220> FEATURE:
<221> NAME/KEY: misc_feature
<222> LOCATION: (51)..(53)
<223> OTHER INFORMATION: 2'-OMe
<220> FEATURE:
<221> NAME/KEY: misc_feature
<222> LOCATION: (55)..(57)
<223> OTHER INFORMATION: 2'-OMe
<220> FEATURE:
<221> NAME/KEY: misc_feature
<222> LOCATION: (59)..(59)
<223> OTHER INFORMATION: 2'-OMe
<220> FEATURE:
<221> NAME/KEY: misc_feature
<222> LOCATION: (99)..(100)
<223> OTHER INFORMATION: phosphorothioate linkage
<220> FEATURE:
<221> NAME/KEY: misc_feature
<222> LOCATION: (99)..(101)
<223> OTHER INFORMATION: 2'-OMe
<220> FEATURE:
<221> NAME/KEY: misc_feature
<222> LOCATION: (100)..(101)
<223> OTHER INFORMATION: phosphorothioate linkage
<220> FEATURE:
<221> NAME/KEY: misc_feature
<222> LOCATION: (101)..(102)
<223> OTHER INFORMATION: phosphorothioate linkage

<400> SEQUENCE: 68
caaguaaacc ccuaccaacu ggucgggguu ugaaacgccc agucauuaaa cccaucugcg    60
gaguagcaag uaaaccccua ccaacugguc gggguuugaa ac                      102

<210> SEQ ID NO 69
<211> LENGTH: 102
<212> TYPE: RNA
<213> ORGANISM: Artificial Sequence
<220> FEATURE:
<223> OTHER INFORMATION: synthetic oligonucleotide
<220> FEATURE:
<221> NAME/KEY: misc_feature
<222> LOCATION: (1)..(3)
<223> OTHER INFORMATION: 2'-OMe
<220> FEATURE:
<221> NAME/KEY: misc_feature
<222> LOCATION: (1)..(2)
<223> OTHER INFORMATION: phosphorothioate linkage
<220> FEATURE:
<221> NAME/KEY: misc_feature
<222> LOCATION: (2)..(3)
<223> OTHER INFORMATION: phosphorothioate linkage
<220> FEATURE:
<221> NAME/KEY: misc_feature
<222> LOCATION: (3)..(4)
<223> OTHER INFORMATION: phosphorothioate linkage
<220> FEATURE:
<221> NAME/KEY: misc_feature

```
<222> LOCATION: (7)..(8)
<223> OTHER INFORMATION: phosphorothioate linkage
<220> FEATURE:
<221> NAME/KEY: misc_feature
<222> LOCATION: (7)..(9)
<223> OTHER INFORMATION: 2'-OMe
<220> FEATURE:
<221> NAME/KEY: misc_feature
<222> LOCATION: (8)..(9)
<223> OTHER INFORMATION: phosphorothioate linkage
<220> FEATURE:
<221> NAME/KEY: misc_feature
<222> LOCATION: (9)..(10)
<223> OTHER INFORMATION: phosphorothioate linkage
<220> FEATURE:
<221> NAME/KEY: misc_feature
<222> LOCATION: (37)..(37)
<223> OTHER INFORMATION: 2'-OMe
<220> FEATURE:
<221> NAME/KEY: misc_feature
<222> LOCATION: (42)..(42)
<223> OTHER INFORMATION: 2'-OMe
<220> FEATURE:
<221> NAME/KEY: misc_feature
<222> LOCATION: (44)..(44)
<223> OTHER INFORMATION: 2'-OMe
<220> FEATURE:
<221> NAME/KEY: misc_feature
<222> LOCATION: (46)..(47)
<223> OTHER INFORMATION: 2'-OMe
<220> FEATURE:
<221> NAME/KEY: misc_feature
<222> LOCATION: (49)..(50)
<223> OTHER INFORMATION: 2'-OMe
<220> FEATURE:
<221> NAME/KEY: misc_feature
<222> LOCATION: (54)..(55)
<223> OTHER INFORMATION: 2'-OMe
<220> FEATURE:
<221> NAME/KEY: misc_feature
<222> LOCATION: (57)..(57)
<223> OTHER INFORMATION: 2'-OMe
<220> FEATURE:
<221> NAME/KEY: misc_feature
<222> LOCATION: (59)..(59)
<223> OTHER INFORMATION: 2'-OMe
<220> FEATURE:
<221> NAME/KEY: misc_feature
<222> LOCATION: (99)..(100)
<223> OTHER INFORMATION: phosphorothioate linkage
<220> FEATURE:
<221> NAME/KEY: misc_feature
<222> LOCATION: (99)..(101)
<223> OTHER INFORMATION: 2'-OMe
<220> FEATURE:
<221> NAME/KEY: misc_feature
<222> LOCATION: (100)..(101)
<223> OTHER INFORMATION: phosphorothioate linkage
<220> FEATURE:
<221> NAME/KEY: misc_feature
<222> LOCATION: (101)..(102)
<223> OTHER INFORMATION: phosphorothioate linkage

<400> SEQUENCE: 69
caaguaaacc ccuaccaacu ggucgggguu ugaaaccagg gcacauugcc gaacugugug      60
gcgcugcaag uaaacccccua ccaacugguc gggguuugaa ac                       102

<210> SEQ ID NO 70
<211> LENGTH: 3786
<212> TYPE: DNA
<213> ORGANISM: Artificial Sequence
<220> FEATURE:
<223> OTHER INFORMATION: NLS-CasRx-NLS-HA-T2A-EGFP portion of Addgene
      #109049

<400> SEQUENCE: 70
```

```
atgagcccca agaagaagag aaaggtggag gccagcatcg aaaaaaaaaa gtccttcgcc      60
aagggcatgg gcgtgaagtc cacactcgtg tccggctcca agtgtacat gacaaccttc      120 gccgaaggca gcgacgccag gctggaaaag atcgtggagg gcgacagcat caggagcgtg      180
aatgagggcg aggccttcag cgctgaaatg gccgataaaa acgccggcta taagatcggc      240
aacgccaaat tcagccatcc taagggctac gccgtggtgg ctaacaaccc tctgtataca      300
ggacccgtcc agcaggatat gctcggcctg aaggaaactc tggaaaagag gtacttcggc      360
gagagcgctg atggcaatga caatatttgt atccaggtga tccataacat cctggacatt      420
gaaaaaatcc tcgccgaata cattaccaac gccgcctacg ccgtcaacaa tatctccggc      480
ctggataagg acattattgg attcggcaag ttctccacag tgtataccta cgacgaattc      540
aaagaccccg agcaccatag ggccgctttc aacaataacg ataagctcat caacgccatc      600
aaggcccagt atgacgagtt cgacaacttc ctcgataacc ccagactcgg ctatttcggc      660
caggcctttt tcagcaagga gggcagaaat tacatcatca attacggcaa cgaatgctat      720
gacattctgg ccctcctgag cggactgagg cactgggtgg tccataacaa cgaagaagag      780
tccaggatct ccaggacctg gctctacaac ctcgataaga acctcgacaa cgaatacatc      840
tccaccctca actacctcta cgacaggatc accaatgagc tgaccaactc cttctccaag      900
aactccgccg ccaacgtgaa ctatattgcc gaaactctgg aatcaacccc tgccgaattc      960
gccgaacaat atttcagatt cagcattatg aaagagcaga aaacctcgg attcaatatc     1020 accaagctca gggaagtgat gctggacagg aaggatatgt ccgagatcag gaaaaatcat     1080
aaggtgttcg actccatcag gaccaaggtc tacaccatga tggactttgt gatttatagg     1140
tattacatcg aagaggatgc caaggtggct gccgccaata agtccctccc cgataatgag     1200
aagtccctga gcgagaagga tatctttgtg attaacctga ggggctcctt caacgacgac     1260
cagaaggatg ccctctacta cgatgaagct aatagaattt ggagaaagct cgaaaatatc     1320
atgcacaaca tcaaggaatt taggggaaac aagacaagag agtataagaa gaaggacgcc     1380
cctagactgc ccagaatcct gcccgctggc cgtgatgttt ccgccttcag caaactcatg     1440
tatgccctga ccatgttcct ggatggcaag agatcaacg acctcctgac caccctgatt     1500
aataaattcg ataacatcca gagcttcctg aaggtgatgc ctctcatcgg agtcaacgct     1560
aagttcgtgg aggaatacgc cttttttcaaa gactccgcca agatcgccga tgagctgagg     1620
ctgatcaagt ccttcgctag aatgggagaa cctattgccg atgccaggag ggccatgtat     1680
atcgacgcca tccgtatttt aggaaccaac ctgtcctatg atgagctcaa ggccctcgcc     1740
gacacctttt ccctggacga gaacggaaac aagctcaaga aaggcaagca cggcatgaga     1800
aatttcatta ttaataacgt gatcagcaat aaaaaggttcc actacctgat cagatacggt     1860
gatcctgccc acctccatga gatcgccaaa aacgaggccg tggtgaagtt cgtgctcggc     1920
aggatcgctg acatccagaa aaaacagggc cagaacggca agaaccagat cgacaggtac     1980
tacgaaactt gtatcggaaa ggataagggc aagagcgtga gcgaaaaggt ggacgctctc     2040
acaaagatca tcaccggaat gaactacgac caattcgaca agaaaaggag cgtcattgag     2100
gacaccggca gggaaaacgc cgagagggag aagtttaaaa agatcatcag cctgtacctc     2160
accgtgatct accacatcct caagaatatt gtcaatatca acgccaggta cgtcatcgga     2220
ttccattgcg tcgagcgtga tgctcaactg tacaaggaga aaggctacga catcaatctc     2280
aagaaactgg aagagaaggg attcagctcc gtcaccaagc tctgcgctgg cattgatgaa     2340
```

```
actgccccg ataagagaaa ggacgtggaa aaggagatgg ctgaaagagc caaggagagc    2400
attgacagcc tcgagagcgc caaccccaag ctgtatgcca attacatcaa atacagcgac    2460
gagaagaaag ccgaggagtt caccaggcag attaacaggg agaaggccaa aaccgccctg    2520
aacgcctacc tgaggaacac caagtggaat gtgatcatca gggaggacct cctgagaatt    2580
gacaacaaga catgtaccct gttcagaaac aaggccgtcc acctggaagt ggccaggtat    2640
gtccacgcct atatcaacga cattgccgag gtcaattcct acttccaact gtaccattac    2700
atcatgcaga gaattatcat gaatgagagg tacgagaaaa gcagcggaaa ggtgtccgag    2760
tacttcgacg ctgtgaatga cgagaagaag tacaacgata ggctcctgaa actgctgtgt    2820
gtgcctttcg gctactgtat ccccaggttt aagaacctga gcatcgaggc cctgttcgat    2880
aggaacgagg ccgccaagtt cgacaaggag aaaaagaagg tgtccggcaa ttccggatcc    2940
ggacctaaga aaaagaggaa ggtggcggcc gcttacccat acgatgttcc agattacgct    3000
gctagcggca gtggagaggg cagaggaagt ctgctaacat gcggtgacgt cgaggagaat    3060
cctggcccag tgagcaaggg cgaggagctg ttcaccgggg tggtgcccat cctggtcgag    3120
ctggacggcg acgtaaacgg ccacaagttc agcgtgtccg gcgagggcga gggcgatgcc    3180
acctacggca agctgaccct gaagttcatc tgcaccaccg gcaagctgcc cgtgccctgg    3240 cccacctcg tgaccaccct gacctacggc gtgcagtgct tcagccgcta ccccgaccac    3300
atgaagcagc acgacttctt caagtccgcc atgcccgaag ctacgtcca ggagcgcacc    3360 atcttcttca aggacgacgg caactacaag acccgcgccg aggtgaagtt cgagggcgac    3420
accctggtga accgcatcga gctgaagggc atcgacttca aggaggacgg caacatcctg    3480
gggcacaagc tggagtacaa ctacaacagc cacaacgtct atatcatggc cgacaagcag    3540
aagaacggca tcaaggtgaa cttcaagatc cgccacaaca tcgaggacgg cagcgtgcag    3600
ctcgccgacc actaccagca gaacacccc atcggcgacg ccccgtgct gctgcccgac    3660 aaccactacc tgagcaccca gtccgccctg agcaaagacc ccaacgagaa gcgcgatcac    3720
atggtcctgc tggagttcgt gaccgccgcc gggatcactc tcggcatgga cgagctgtac    3780
aagtaa                                                                3786
```

```
<210> SEQ ID NO 71
<211> LENGTH: 24
<212> TYPE: DNA
<213> ORGANISM: Artificial Sequence
<220> FEATURE:
<223> OTHER INFORMATION: NLS sequence from NLS-CasRx-NLS-HA-T2A-EGFP
      (Addgene #109049)

<400> SEQUENCE: 71
agccccaaga agaagagaaa ggtg                                              24

<210> SEQ ID NO 72
<211> LENGTH: 2916
<212> TYPE: DNA
<213> ORGANISM: Artificial Sequence
<220> FEATURE:
<223> OTHER INFORMATION: CasRx sequence from NLS-CasRx-NLS-HA-T2A-EGFP
      (Addgene #109049)

<400> SEQUENCE: 72
gaggccagca tcgaaaaaaa aaagtccttc gccaagggca tgggcgtgaa gtccacactc      60
gtgtccggct ccaaagtgta catgacaacc ttcgccgaag cagcgacgc caggctggaa      120 aagatcgtgg agggcgacag catcaggagc gtgaatgagg gcgaggcctt cagcgctgaa      180
```

```
atggccgata aaaacgccgg ctataagatc ggcaacgcca aattcagcca tcctaagggc    240
tacgccgtgg tggctaacaa ccctctgtat acaggacccg tccagcagga tatgctcggc    300
ctgaaggaaa ctctggaaaa gaggtacttc ggcgagagcg ctgatggcaa tgacaatatt    360
tgtatccagg tgatccataa catcctggac attgaaaaaa tcctcgccga atacattacc    420
aacgccgcct acgccgtcaa caatatctcc ggcctggata aggacattat tggattcggc    480
aagttctcca cagtgtatac ctacgacgaa ttcaaagacc ccgagcacca tagggccgct    540
ttcaacaata acgataagct catcaacgcc atcaaggccc agtatgacga gttcgacaac    600
ttcctcgata accccagact cggctatttc ggccaggcct ttttcagcaa ggagggcaga    660
aattacatca tcaattacgg caacgaatgc tatgacattc tggccctcct gagcggactg    720
aggcactggg tggtccataa caacgaagaa gagtccagga tctccaggac ctggctctac    780
aacctcgata agaacctcga caacgaatac atctccaccc tcaactacct ctacgacagg    840
atcaccaatg agctgaccaa ctccttctcc aagaactccg ccgccaacgt gaactatatt    900
gccgaaactc tgggaatcaa ccctgccgaa ttcgccgaac aatatttcag attcagcatt    960
atgaaagagc agaaaaacct cggattcaat atcaccaagc tcagggaagt gatgctggac   1020
aggaaggata tgtccgagat caggaaaaat cataaggtgt tcgactccat caggaccaag   1080
gtctacacca tgatggactt tgtgatttat aggtattaca tcgaagagga tgccaaggtg   1140
gctgccgcca ataagtccct ccccgataat gagaagtccc tgagcgagaa ggatatcttt   1200
gtgattaacc tgaggggctc cttcaacgac gaccagaagg atgccctcta ctacgatgaa   1260
gctaatagaa tttggagaaa gctcgaaaat atcatgcaca acatcaagga atttaggga   1320 aacaagacaa gagagtataa gaagaaggac gcccctagac tgcccagaat cctgcccgct   1380
ggccgtgatg tttccgcctt cagcaaactc atgtatgccc tgaccatgtt cctggatggc   1440
aaggagatca cgacctcct gaccaccctg attaataaat tcgataacat ccagagcttc   1500
ctgaaggtga tgcctctcat cggagtcaac gctaagttcg tggaggaata cgcctttttc   1560
aaagactccg ccaagatcgc cgatgagctg aggctgatca agtccttcgc tagaatggga   1620
gaacctattg ccgatgccag gagggccatg tatatcgacg ccatccgtat tttaggaacc   1680
aacctgtcct atgatgagct caaggccctc gccgacacct tttccctgga cgagaacgga   1740
aacaagctca gaaaggcaa gcacggcatg agaaatttca ttattaataa cgtgatcagc   1800
aataaaaggt tccactacct gatcagatac ggtgatcctg cccacctcca tgagatcgcc   1860
aaaaacgagg ccgtggtgaa gttcgtgctc ggcaggatcc tgacatcca gaaaaaacag   1920 ggccagaacg gcaagaacca gatcgacagg tactacgaaa cttgtatcgg aaaggataag   1980
ggcaagagcg tgagcgaaaa ggtggacgct ctcacaaaga tcatcaccgg aatgaactac   2040
gaccaattcg acaagaaaag gagcgtcatt gaggacaccg gcagggaaaa cgccgagagg   2100
gagaagttta aaaagatcat cagcctgtac ctcaccgtga tctaccacat cctcaagaat   2160
attgtcaata tcaacgccag gtacgtcatc ggattccatt gcgtcgagcg tgatgctcaa   2220
ctgtacaagg agaaggcta cgacatcaat ctcaagaaac tggaagagaa gggattcagc   2280
tccgtcacca agctctgcgc tggcattgat gaaactgccc ccgataagag aaaggacgtg   2340
gaaaaggaga tggctgaaag agccaaggag agcattgaca gcctcgagag cgccaacccc   2400
aagctgtatg ccaattacat caaatacagc gacgagaaga agccgagga gttcaccagg   2460 cagattaaca gggagaaggc caaaaccgcc ctgaacgcct acctgaggaa caccaagtgg   2520
```

```
aatgtgatca tcagggagga cctcctgaga attgacaaca agacatgtac cctgttcaga      2580
aacaaggccg tccacctgga agtggccagg tatgtccacg cctatatcaa cgacattgcc      2640
gaggtcaatt cctacttcca actgtaccat tacatcatgc agagaattat catgaatgag      2700
aggtacgaga aaagcagcgg aaaggtgtcc gagtacttcg acgctgtgaa tgacgagaag      2760
aagtacaacg ataggctcct gaaactgctg tgtgtgcctt tcggctactg tatccccagg      2820
tttaagaacc tgagcatcga ggccctgttc gataggaacg aggccgccaa gttcgacaag      2880
gagaaaaaga aggtgtccgg caattccgga tccgga                                2916
```

<210> SEQ ID NO 73
<211> LENGTH: 36
<212> TYPE: DNA
<213> ORGANISM: Artificial Sequence
<220> FEATURE:
<223> OTHER INFORMATION: HA sequence from NLS-CasRx-NLS-HA-T2A-EGFP
      (Addgene #109049)

<400> SEQUENCE: 73

```
gcggccgctt acccatacga tgttccagat tacgct                                36
```

<210> SEQ ID NO 74
<211> LENGTH: 54
<212> TYPE: DNA
<213> ORGANISM: Artificial Sequence
<220> FEATURE:
<223> OTHER INFORMATION: T2A sequence from NLS-CasRx-NLS-HA-T2A-EGFP
      (Addgene #109049)

<400> SEQUENCE: 74

```
gagggcagag gaagtctgct aacatgcggt gacgtcgagg agaatcctgg ccca            54
```

<210> SEQ ID NO 75
<211> LENGTH: 714
<212> TYPE: DNA
<213> ORGANISM: Artificial Sequence
<220> FEATURE:
<223> OTHER INFORMATION: EGFP sequence from NLS-CasRx-NLS-HA-T2A-EGFP
      (Addgene #109049)

<400> SEQUENCE: 75

```
gtgagcaagg gcgaggagct gttcaccggg gtggtgccca tcctggtcga gctggacggc       60
gacgtaaacg gccacaagtt cagcgtgtcc ggcgagggcg agggcgatgc cacctacggc      120
aagctgaccc tgaagttcat ctgcaccacc ggcaagctgc ccgtgccctg gcccaccctc      180
gtgaccaccc tgacctacgg cgtgcagtgc ttcagccgct accccgacca catgaagcag      240
cacgacttct tcaagtccgc catgcccgaa ggctacgtcc aggagcgcac catcttcttc      300
aaggacgacg gcaactacaa gacccgcgcc gaggtgaagt tcgagggcga cacccctggtg      360 aaccgcatcg agctgaaggg catcgacttc aaggaggacg gcaacatcct ggggcacaag      420
ctggagtaca actacaacag ccacaacgtc tatatcatgg ccgacaagca gaagaacggc      480
atcaaggtga acttcaagat ccgccacaac atcgaggacg gcagcgtgca gctcgccgac      540
cactaccagc agaacacccc catcggcgac ggccccgtgc tgctgcccga caaccactac      600
ctgagcaccc agtccgccct gagcaaagac cccaacgaga gcgcgatca tggtcctg        660 ctggagttcg tgaccgccgc cgggatcact ctcggcatgg acgagctgta caag            714
```

<210> SEQ ID NO 76
<211> LENGTH: 2903
<212> TYPE: DNA

<213> ORGANISM: Artificial Sequence
<220> FEATURE:
<223> OTHER INFORMATION: CasRx gRNA cloning backbone (Addgene #109053)

<400> SEQUENCE: 76

```
gctagcgagg gcctatttcc catgattcct tcatatttgc atatacgata caaggctgtt      60
agagagataa ttggaattaa tttgactgta aacacaaaga tattagtaca aaatacgtga     120
cgtagaaagt aataatttct tgggtagttt gcagttttaa aattatgttt taaaatggac     180
tatcatatgc ttaccgtaac ttgaaagtat ttcgatttct tggctttata tatcttgtgg     240
aaaggacgaa acaccgaacc cctaccaact ggtcggggtt tgaaacgggt cttcgagaag     300
accttttttt tgaattctga tgcggtattt tctccttacg catctgtgcg gtatttcaca     360
ccgcatacgt caaagcaacc atagtacgcg ccctgtagcg gcgcattaag cgcggcgggt     420
gtggtggtta cgcgcagcgt gaccgctaca cttgccagcg ccttagcgcc cgctcctttc     480
gctttcttcc cttcctttct cgccacgttc gccggctttc cccgtcaagc tctaaatcgg     540
gggctccctt tagggttccg atttagtgct ttacggcacc tcgaccccaa aaaacttgat     600
ttgggtgatg gttcacgtag tgggccatcg ccctgataga cggttttttcg ccctttgacg     660
ttggagtcca cgttctttaa tagtggactc ttgttccaaa ctggaacaac actcaactct     720
atctcgggct attcttttga tttataaggg attttgccga tttcggtcta ttggttaaaa     780
aatgagctga tttaacaaaa atttaacgcg aattttaaca aaatattaac gtttacaatt     840
ttatggtgca ctctcagtac aatctgctct gatgccgcat agttaagcca gccccgacac     900
ccgccaacac ccgctgacgc gccctgacgg gcttgtctgc tcccggcatc cgcttacaga     960
caagctgtga ccgtctccgg gagctgcatg tgtcagaggt tttcaccgtc atcaccgaaa    1020
cgcgcgagac gaaagggcct cgtgatacgc ctatttttat aggttaatgt catgataata    1080
atggtttctt agacgtcagg tggcactttt cggggaaatg tgcgcggaac ccctatttgt    1140
ttatttttct aaatacattc aaatatgtat ccgctcatga caataaccc ctgataaatg    1200
cttcaataat attgaaaaag gaagagtatg agtattcaac atttccgtgt cgcccttatt    1260
ccctttttg cggcattttg ccttcctgtt tttgctcacc cagaaacgct ggtgaaagta    1320
aaagatgctg aagatcagtt gggtgcacga gtgggttaca tcgaactgga tctcaacagc    1380
ggtaagatcc ttgagagttt tcgccccgaa gaacgttttc caatgatgag cacttttaaa    1440
gttctgctat gtggcgcggt attatcccgt attgacgccg ggcaagagca actcggtcgc    1500
cgcatacact attctcagaa tgacttggtt gagtactcac cagtcacaga aaagcatctt    1560
acggatggca tgacagtaag agaattatgc agtgctgcca taaccatgag tgataacact    1620
gcggccaact tacttctgac aacgatcgga ggaccgaagg agctaaccgc ttttttgcac    1680
aacatggggg atcatgtaac tcgccttgat cgttgggaac cggagctgaa tgaagccata    1740
ccaaacgacg agcgtgacac cacgatgcct gtagcaatgg caacaacgtt gcgcaaacta    1800
ttaactggcg aactacttac tctagcttcc cggcaacaat taatagactg gatggaggcg    1860
gataaagttg caggaccact tctgcgctcg gcccttccgg ctggctggtt tattgctgat    1920
aaatctggag ccggtgagcg tggaagccgc ggtatcattg cagcactggg gccagatggt    1980
aagccctccc gtatcgtagt tatctacacg acggggagtc aggcaactat ggatgaacga    2040
aatagacaga tcgctgagat aggtgcctca ctgattaagc attggtaact gtcagaccaa    2100
gtttactcat atatacttta gattgattta aaacttcatt tttaatttaa aaggatctag    2160
gtgaagatcc ttttttgataa tctcatgacc aaaatccctt aacgtgagtt tcgttccac    2220
```

```
tgagcgtcag accccgtaga aaagatcaaa ggatcttctt gagatccttt ttttctgcgc    2280
gtaatctgct gcttgcaaac aaaaaaacca ccgctaccag cggtggtttg tttgccggat    2340
caagagctac caactctttt tccgaaggta actggcttca gcagagcgca gataccaaat    2400
actgttcttc tagtgtagcc gtagttaggc caccacttca agaactctgt agcaccgcct    2460
acatacctcg ctctgctaat cctgttacca gtggctgctg ccagtggcga taagtcgtgt    2520
cttaccgggt tggactcaag acgatagtta ccggataagg cgcagcggtc gggctgaacg    2580
gggggttcgt gcacacagcc cagcttggag cgaacgacct acaccgaact gagatacccta   2640 cagcgtgagc tatgagaaag cgccacgctt cccgaaggga gaaaggcgga caggtatccg    2700
gtaagcggca gggtcggaac aggagagcgc acgagggagc ttccagggg aaacgcctgg    2760 tatctttata gtcctgtcgg gtttcgccac ctctgacttg agcgtcgatt tttgtgatgc    2820
tcgtcagggg ggcggagcct atggaaaaac gccagcaacg cggcctttt acggttcctg    2880 gccttttgct ggccttttgc tca                                             2903
```

<210> SEQ ID NO 77
<211> LENGTH: 2945
<212> TYPE: DNA
<213> ORGANISM: Artificial Sequence
<220> FEATURE:
<223> OTHER INFORMATION: CasRx pre-gRNA cloning backbone (Addgene #109054)

<400> SEQUENCE: 77

```
gctagcgagg gcctatttcc catgattcct tcatatttgc atatacgata caaggctgtt      60
agagagataa ttggaattaa tttgactgta aacacaaaga tattagtaca aaatacgtga     120
cgtagaaagt aataatttct tgggtagttt gcagttttaa aattatgttt taaaatggac     180
tatcatatgc ttaccgtaac ttgaaagtat ttcgatttct tggctttata tatcttgtgg     240
aaaggacgaa acaccgcaag taaacccta ccaactggtc ggggtttgaa acgggtcttc      300
gagaagacct caagtaaacc cctaccaact ggtcgggggtt tgaaactttt tttgaattct    360
gatgcggtat tttctcctta cgcatctgtg cggtatttca caccgcatac gtcaaagcaa    420
ccatagtacg cgccctgtag cggcgcatta agcgcggcgg gtgtggtggt tacgcgcagc    480
gtgaccgcta cacttgccag cgccttagcg cccgctcctt tcgctttctt cccttccttt   540
ctcgccacgt tcgccggctt tccccgtcaa gctctaaatc gggggctccc tttagggttc    600
cgatttagtg ctttacggca cctcgacccc aaaaaacttg atttgggtga tggttcacgt    660
agtgggccat cgccctgata cggtttttcg ccctttga cgttggagtc cacgttcttt      720
aatagtggac tcttgttcca aactggaaca cactcaact ctatctcggg ctattctttt     780
gatttataag ggattttgcc gatttcggtc tattggttaa aaaatgagct gatttaacaa     840
aaatttaacg cgaattttaa caaaatatta cgtttacaa ttttatggtg cactctcagt    900
acaatctgct ctgatgccgc atagttaagc cagccccgac acccgccaac acccgctgac    960
gcgccctgac gggcttgtct gctcccggca tccgcttaca gacaagctgt gaccgtctcc   1020
gggagctgca tgtgtcagag gttttcaccg tcatcaccga aacgcgcgag acgaaagggc    1080
ctcgtgatac gcctattttt ataggttaat gtcatgataa taatggtttc ttagacgtca   1140
ggtggcactt ttcggggaaa tgtgcgcgga acccctattt gtttatttt ctaaatacat    1200 tcaaatatgt atccgctcat gagacaataa ccctgataaa tgcttcaata atattgaaaa    1260
aggaagagta tgagtattca acatttccgt gtcgccctta ttcccttttt tgcggcattt    1320
```

| | |
|---|---|
| tgccttcctg tttttgctca cccagaaacg ctggtgaaag taaaagatgc tgaagatcag | 1380 |
| ttgggtgcac gagtgggtta catcgaactg gatctcaaca gcggtaagat ccttgagagt | 1440 |
| tttcgccccg aagaacgttt tccaatgatg agcactttta aagttctgct atgtggcgcg | 1500 |
| gtattatccc gtattgacgc cgggcaagag caactcggtc gccgcataca ctattctcag | 1560 |
| aatgacttgg ttgagtactc accagtcaca gaaaagcatc ttacggatgg catgacagta | 1620 |
| agagaattat gcagtgctgc cataaccatg agtgataaca ctgcggccaa cttacttctg | 1680 |
| acaacgatcg gaggaccgaa ggagctaacc gcttttttgc acaacatggg gatcatgta | 1740 |
| actcgccttg atcgttggga accggagctg aatgaagcca taccaaacga cgagcgtgac | 1800 |
| accacgatgc ctgtagcaat ggcaacaacg ttgcgcaaac tattaactgg cgaactactt | 1860 |
| actctagctt cccggcaaca attaatagac tggatggagg cggataaagt tgcaggacca | 1920 |
| cttctgcgct cggcccttcc ggctggctgg tttattgctg ataaatctgg agccggtgag | 1980 |
| cgtggaagcc gcggtatcat tgcagcactg gggccagatg gtaagccctc ccgtatcgta | 2040 |
| gttatctaca cgacggggag tcaggcaact atggatgaac gaaatagaca gatcgctgag | 2100 |
| ataggtgcct cactgattaa gcattggtaa ctgtcagacc aagtttactc atatatactt | 2160 |
| tagattgatt taaaacttca tttttaattt aaaaggatct aggtgaagat cctttttgat | 2220 |
| aatctcatga ccaaaatccc ttaacgtgag ttttcgttcc actgagcgtc agaccccgta | 2280 |
| gaaaagatca aggatcttc ttgagatcct ttttttctgc gcgtaatctg ctgcttgcaa | 2340 |
| acaaaaaaac caccgctacc agcggtggtt tgtttgccgg atcaagagct accaactctt | 2400 |
| tttccgaagg taactggctt cagcagagcg cagataccaa atactgttct tctagtgtag | 2460 |
| ccgtagttag gccaccactt caagaactct gtagcaccgc ctacatacct cgctctgcta | 2520 |
| atcctgttac cagtggctgc tgccagtggc gataagtcgt gtcttaccgg gttggactca | 2580 |
| agacgatagt taccggataa ggcgcagcgg tcgggctgaa cggggggttc gtgcacacag | 2640 |
| cccagcttgg agcgaacgac ctacaccgaa ctgagatacc tacagcgtga gctatgagaa | 2700 |
| agcgccacgc ttcccgaagg gagaaaggcg gacaggtatc cggtaagcgg cagggtcgga | 2760 |
| acaggagagc gcacgaggga gcttccaggg ggaaacgcct ggtatcttta tagtcctgtc | 2820 |
| gggtttcgcc acctctgact tgagcgtcga ttttgtgat gctcgtcagg ggggcggagc | 2880 |
| ctatggaaaa acgccagcaa cgcggccttt ttacggttcc tggccttttg ctggcctttt | 2940 |
| gctca | 2945 |

<210> SEQ ID NO 78
<211> LENGTH: 12990
<212> TYPE: DNA
<213> ORGANISM: Artificial Sequence
<220> FEATURE:
<223> OTHER INFORMATION: Full length sequence for Addgene #109049 containing, in part, NLS-CasRx-NLS-HA-T2A-EGFP

<400> SEQUENCE: 78

| | |
|---|---|
| gtcgacggat cgggagatct cccgatcccc tatggtgcac tctcagtaca atctgctctg | 60 |
| atgccgcata gttaagccag tatctgctcc ctgcttgtgt gttggaggtc gctgagtagt | 120 |
| gcgcgagcaa aatttaagct acaacaaggc aaggcttgac cgacaattgc atgaagaatc | 180 |
| tgcttagggt taggcgtttt gcgctgcttc gcgatgtacg ggccagatat acgcgttgac | 240 |
| attgattatt gactagttat taatagtaat caattacggg gtcattagtt catagcccat | 300 |
| atatggagtt ccgcgttaca taacttacgg taaatggccc gcctggctga ccgcccaacg | 360 |

```
accccccgccc attgacgtca ataatgacgt atgttcccat agtaacgcca atagggactt    420
tccattgacg tcaatgggtg gagtatttac ggtaaactgc ccacttggca gtacatcaag    480
tgtatcatat gccaagtacg cccctattg acgtcaatga cggtaaatgg cccgcctggc    540
attatgccca gtacatgacc ttatgggact ttcctacttg gcagtacatc tacgtattag    600
tcatcgctat taccatggtg atgcggtttt ggcagtacat caatgggcgt ggatagcggt    660
ttgactcacg gggatttcca agtctccacc ccattgacgt caatgggagt ttgttttggc    720
accaaaatca acgggacttt ccaaaatgtc gtaacaactc cgccccattg acgcaaatgg    780
gcggtaggcg tgtacggtgg gaggtctata taagcagcgc gttttgcctg tactgggtct    840
ctctggttag accagatctg agcctgggag ctctctggct aactagggaa cccactgctt    900
aagcctcaat aaagcttgcc ttgagtgctt caagtagtgt gtgcccgtct gttgtgtgac    960
tctggtaact agagatccct cagacccttt tagtcagtgt ggaaaatctc tagcagtggc   1020
gcccgaacag ggacttgaaa gcgaaaggga accagagga gctctctcga cgcaggactc    1080
ggcttgctga agcgcgcacg gcaagaggcg aggggcggcg actggtgagt acgccaaaaa   1140
ttttgactag cggaggctag aaggagagag atgggtgcga gagcgtcagt attaagcggg   1200
ggagaattag atcgcgatgg gaaaaaattc ggttaaggcc agggggaaag aaaaaatata   1260
aattaaaaca tatagtatgg gcaagcaggg agctagaacg attcgcagtt aatcctggcc   1320
tgttagaaac atcagaaggc tgtagacaaa tactgggaca gctacaacca tcccttcaga   1380
caggatcaga agaacttaga tcattatata atacagtagc aaccctctat tgtgtgcatc   1440
aaaggataga gataaaagac accaaggaag ctttagacaa gatagaggaa gagcaaaaca   1500
aaagtaagac caccgcacag caagcggccg ctgatcttca gacctggagg aggagatatg   1560
agggacaatt ggagaagtga attatataaa tataaagtag taaaaattga accattagga   1620
gtagcaccca ccaaggcaaa gagaagagtg gtgcagagag aaaaaagagc agtgggaata   1680
ggagctttgt tccttgggtt cttgggagca gcaggaagca ctatgggcgc agcgtcaatg   1740
acgctgacgg tacaggccag acaattattg tctggtatag tgcagcagca gaacaatttg   1800
ctgagggcta ttgaggcgca acagcatctg ttgcaactca cagtctgggg catcaagcag   1860
ctccaggcaa gaatcctggc tgtggaaaga tacctaaagg atcaacagct cctgggatt    1920 tggggttgct ctggaaaact catttgcacc actgctgtgc cttggaatgc tagttggagt   1980
aataaatctc tggaacagat ttggaatcac acgacctgga tggagtggga cagagaaatt   2040
aacaattaca caagcttaat acactcctta attgaagaat cgcaaaacca gcaagaaaag   2100
aatgaacaag aattattgga attagataaa tgggcaagtt tgtggaattg gtttaacata   2160
acaaattggc tgtggtatat aaaattattc ataatgatag taggaggctt ggtaggttta   2220
agaatagttt ttgctgtact ttctatagtg aatagagtta ggcagggata ttcaccatta   2280
tcgtttcaga cccacctccc aaccccgagg gacccgaca ggcccgaagg aatagaagaa    2340
gaaggtggag agagagacag agacagatcc attcgattag tgaacggatc ggcactgcgt   2400
gcgccaattc tgcagacaaa tggcagtatt catccacaat tttaaaagaa aagggggggat   2460 tggggggtac agtgcagggg aaagaatagt agacataata gcaacagaca tacaaactaa   2520
agaattacaa aaacaaatta caaaaattca aaattttcgg gtttattaca gggacagcag   2580
agatccagtt tggttaatta atgcaaagat ggataaagtt ttaaacagag aggaatcttt   2640
gcagctaatg gaccttctag gtcttgaaag gagtgggaat tggctccggt gcccgtcagt   2700
```

```
gggcagagcg cacatcgccc acagtccccg agaagttggg gggaggggtc ggcaattgaa    2760
ccggtgccta gagaaggtgg cgcggggtaa actgggaaag tgatgtcgtg tactggctcc    2820 gccttttttcc cgagggtggg ggagaaccgt atataagtgc agtagtcgcc gtgaacgttc    2880
tttttcgcaa cgggtttgcc gccagaacac aggtaagtgc cgtgtgtggt tcccgcgggc    2940
ctggcctctt tacgggttat ggcccttgcg tgccttgaat tacttccact ggctgcagta    3000
cgtgattctt gatcccgagc ttcgggttgg aagtgggtgg gagagttcga ggccttgcgc    3060
ttaaggagcc ccttcgcctc gtgcttgagt tgaggcctgg cctgggcgct ggggccgccg    3120
cgtgcgaatc tggtggcacc ttcgcgcctg tctcgctgct ttcgataagt ctctagccat    3180
ttaaaatttt tgatgacctg ctgcgacgct tttttctgg caagatagtc ttgtaaatgc      3240
gggccaagat ctgcacactg gtatttcggt ttttggggcc gcgggcggcg acggggcccg    3300
tgcgtcccag cgcacatgtt cggcgaggcg gggcctgcga gcgcggccac cgagaatcgg    3360 acggggtag tctcaagctg gccggcctgc tctggtgcct ggcctcgcgc cgccgtgtat     3420
cgccccgccc tgggcggcaa ggctggcccg gtcggcacca gttgcgtgag cggaaagatg    3480
gccgcttccc ggccctgctg cagggagctc aaaatggagg acgcggcgct cgggagagcg    3540
ggcgggtgag tcacccacac aaaggaaaag gccttttccg tcctcagccg tcgcttcatg    3600
tgactccacg gagtaccggg cgccgtccag gcacctcgat tagttctcga gcttttggag    3660
tacgtcgtct ttaggttggg gggaggggtt ttatgcgatg gagtttcccc acactgagtg    3720
ggtggagact gaagttaggc cagcttggca cttgatgtaa ttctccttgg aatttgccct    3780
ttttgagttt ggatcttggt tcattctcaa gcctcagaca gtggttcaaa gttttttttct   3840 tccatttcag gtgtcgtgac gtacggccac catgagcccc aagaagaaga gaaaggtgga    3900
ggccagcatc gaaaaaaaaa agtccttcgc caagggcatg ggcgtgaagt ccacactcgt    3960
gtccggctcc aaagtgtaca tgacaacctt cgccgaaggc agcgacgcca ggctggaaaa    4020
gatcgtggag ggcgacagca tcaggagcgt gaatgagggc gaggccttca gcgctgaaat    4080
ggccgataaa aacgccggct ataagatcgg caacgccaaa ttcagccatc ctaagggcta    4140
cgccgtggtg gctaacaacc ctctgtatac aggacccgtc cagcaggata tgctcggcct    4200
gaaggaaact ctggaaaaga ggtacttcgg cgagagcgct gatggcaatg acaatatttg    4260
tatccaggtg atccataaca tcctggacat tgaaaaaatc ctcgccgaat acattaccaa    4320
cgccgcctac gccgtcaaca atatctccgg cctggataag gacattattg gattcggcaa    4380
gttctccaca gtgtatacct acgacgaatt caaagacccc gagcaccata gggccgcttt    4440
caacaataac gataagctca tcaacgccat caaggcccag tatgacgagt cgacaacttt    4500
cctcgataac cccagactcg gctatttcgg ccaggccttt ttcagcaagg agggcagaaa    4560
ttacatcatc aattacggca acgaatgcta tgacattctg gccctcctga gcggactgag    4620
gcactgggtg gtccataaca acgaagaaga gtccaggatc tccaggacct ggctctacaa    4680
cctcgataag aacctcgaca acgaatacat ctccacccctc aactacctct acgacaggat   4740
caccaatgag ctgaccaact ccttctccaa gaactccgcc gccaacgtga actatattgc    4800
cgaaactctg ggaatcaacc ctgccgaatt cgccgaacaa tatttcagat tcagcattat    4860
gaaagagcag aaaaacctcg gattcaatat caccaagctc agggaagtga tgctggacag    4920
gaaggatatg tccgagatca ggaaaaatca taaggtgttc gactccatca ggaccaaggt    4980
ctacaccatg atggacttg tgatttatag gtattacatc gaagaggatg ccaaggtggc    5040
tgccgccaat aagtccctcc ccgataatga gaagtccctg agcgagaagg atatctttgt    5100
```

```
gattaacctg aggggctcct tcaacgacga ccagaaggat gccctctact acgatgaagc    5160
taatagaatt tggagaaagc tcgaaaatat catgcacaac atcaaggaat ttaggggaaa    5220
caagacaaga gagtataaga agaaggacgc ccctagactg cccagaatcc tgcccgctgg    5280
ccgtgatgtt tccgccttca gcaaactcat gtatgccctg accatgttcc tggatggcaa    5340
ggagatcaac gacctcctga ccaccctgat taataaattc gataacatcc agagcttcct    5400
gaaggtgatg cctctcatcg gagtcaacgc taagttcgtg gaggaatacg ccttttttcaa   5460 agactccgcc aagatcgccg atgagctgag gctgatcaag tccttcgcta gaatgggaga    5520
acctattgcc gatgccagga gggccatgta tatcgacgcc atccgtattt taggaaccaa    5580
cctgtcctat gatgagctca aggccctcgc cgacaccttt tccctggacg agaacggaaa    5640
caagctcaag aaaggcaagc acggcatgag aaatttcatt attaataacg tgatcagcaa    5700
taaaaggttc cactacctga tcagatacgg tgatcctgcc cacctccatg agatcgccaa    5760
aaacgaggcc gtggtgaagt tcgtgctcgg caggatcgct gacatccaga aaaacaggg    5820 ccagaacggc aagaaccaga tcgacaggta ctacgaaact tgtatcggaa aggataaggg    5880
caagagcgtg agcgaaaagg tggacgctct cacaaagatc atcaccggaa tgaactacga    5940
ccaattcgac aagaaaagga gcgtcattga ggacaccggc agggaaaacg ccgagaggga    6000
gaagtttaaa aagatcatca gcctgtacct caccgtgatc taccacatcc tcaagaatat    6060
tgtcaatatc aacgccaggt acgtcatcgg attccattgc gtcgagcgtg atgctcaact    6120
gtacaaggag aaaggctacg acatcaatct caagaaactg gaagagaagg gattcagctc    6180
cgtcaccaag ctctgcgctg gcattgatga aactgccccc gataagagaa aggacgtgga    6240
aaaggagatg gctgaaagag ccaaggagag cattgacagc ctcgagagcg ccaaccccaa    6300
gctgtatgcc aattacatca aatacagcga cgagaagaaa gccgaggagt tcaccaggca    6360
gattaacagg gagaaggcca aaccgcccct gaacgcctac ctgaggaaca ccaagtggaa    6420
tgtgatcatc agggaggacc tcctgagaat tgacaacaag acatgtaccc tgttcagaaa    6480
caaggccgtc cacctggaag tggccaggta tgtccacgcc tatatcaacg acattgccga    6540
ggtcaattcc tacttccaac tgtaccatta catcatgcag agaattatca tgaatgagag    6600
gtacgagaaa gcagcggaa aggtgtccga gtacttcgac gctgtgaatg acgagaagaa     6660
gtacaacgat aggctcctga aactgctgtg tgtgcctttc ggctactgta tccccaggtt    6720
taagaacctg agcatcgagg ccctgttcga taggaacgag gccgccaagt tcgacaagga    6780 gaaaagaag gtgtccggca ttccggatc cggacctaag aaaaagagga aggtggcggc     6840
cgcttaccca tacgatgttc cagattacgc tgctagcggc agtggagagg gcagaggaag    6900
tctgctaaca tgcggtgacg tcgaggagaa tcctggccca gtgagcaagg gcgaggagct    6960
gttcaccggg gtggtgccca tcctggtcga gctggacggc gacgtaaacg gccacaagtt    7020
cagcgtgtcc ggcgagggcg agggcgatgc cacctacggc aagctgaccc tgaagttcat    7080
ctgcaccacc ggcaagctgc ccgtgccctg gcccaccctc gtgaccaccc tgacctacgg    7140
cgtgcagtgc ttcagccgct accccgacca catgaagcag cacgacttct tcaagtccgc    7200
catgcccgaa ggctacgtcc aggagcgcac catcttcttc aaggacgacg gcaactacaa    7260
gacccgcgcc gaggtgaagt tcgagggcga caccctggtg aaccgcatcg agctgaaggg    7320
catcgacttc aaggaggacg gcaacatcct ggggcacaag ctggagtaca actacaacag    7380
ccacaacgtc tatatcatgg ccgacaagca gaagaacggc atcaaggtga acttcaagat    7440
```

```
ccgccacaac atcgaggacg gcagcgtgca gctcgccgac cactaccagc agaacacccc    7500
catcggcgac ggccccgtgc tgctgcccga caaccactac ctgagcaccc agtccgccct    7560
gagcaaagac cccaacgaga agcgcgatca catggtcctg ctggagttcg tgaccgccgc    7620
cgggatcact ctcggcatgg acgagctgta caagtaagaa ttcgatatca agcttatcga    7680
taatcaacct ctggattaca aaatttgtga agattgact  ggtattctta actatgttgc    7740
tccttttacg ctatgtggat acgctgcttt aatgcctttg tatcatgcta ttgcttcccg    7800
tatggctttc attttctcct ccttgtataa atcctggttg ctgtctcttt atgaggagtt    7860
gtggcccgtt gtcaggcaac gtggcgtggt gtgcactgtg tttgctgacg caaccccccac   7920 tggttggggc attgccacca cctgtcagct ccttt ccggg actttcgctt tccccctccc    7980
tattgccacg gcggaactca tcgccgcctg ccttgcccgc tgctggacag gggctcggct    8040
gttgggcact gacaattccg tggtgttgtc ggggaaatca tcgtccttt c cttggctgct    8100 cgcctgtgtt gccacctgga ttctgcgcgg gacgtcct tc tgctacgtcc cttcggccct    8160
caatccagcg gaccttcctt cccgcggcct gctgccggct ctgcgccctc ttccgcgtct    8220
tcgccttcgc cctcagacga gtcggatctc cctttgggcc gcctccccgc atcgataccg    8280
tcgacctcga gacctagaaa aacatggagc aatcacaagt agcaatacag cagctaccaa    8340
tgctgattgt gcctggctag aagcacaaga ggaggaggag gtgggttttc cagtcacacc    8400
tcaggtacct ttaagaccaa tgacttacaa ggcagctgta gatcttagcc acttttaaa     8460 agaaaagggg ggactggaag ggctaattca ctcccaacga agacaagata tccttgatct    8520
gtggatctac cacacacaag gctacttccc tgattggcag aactacacac cagggccagg    8580
gatcagatat ccactgacct ttggatggtg ctacaagcta gtaccagttg agcaagagaa    8640
ggtagaagaa gccaatgaag gagagaacac ccgcttgtta cacctgtga gcctgcatgg    8700 gatggatgac ccggagagag aagtattaga gtggaggttt gacagccgcc tagcatttca    8760
tcacatggcc cgagagctgc atccggactg tactgggtct ctctggttag accagatctg    8820
agcctgggag ctctctggct aactagggaa cccactgctt aagcctcaat aaagcttgcc    8880
ttgagtgctt caagtagtgt gtgcccgtct gttgtgtgac tctggtaact agagatccct    8940 cagaccct tt tagtcagtgt ggaaaatctc tagcagggcc cgtt taaacc cgctgatcag    9000 cctcgactgt gccttctagt tgccagccat ctgttgtttg ccc ctccccc gtgccttcct    9060 tgaccctgga aggtgccact cccactgtcc tttcctaata aaatgaggaa attgcatcgc    9120
attgtctgag taggtgtcat tctattctgg ggggtgggggt ggggcaggac agcaagggg    9180 aggattggga agacaatagc aggcatgctg gggatgcggt gggctctatg gcttctgagg    9240
cggaaagaac cagctggggc tctagggggt atccccacgc gccctgtagc ggcgcattaa    9300
gcgcggcggg tgtggtggtt acgcgcagcg tgaccgctac acttgccagc gccctagcgc    9360
ccgctccttt cgctttcttc ccttcctttc tcgccacgtt cgccggcttt ccccgtcaag    9420
ctctaaatcg gggct ccct ttagggttcc gatttagtgc tttacggcac ctcgacccca    9480
aaaaacttga ttagggtgat ggttcacgta gtgggccatc gccctgatag acggtttttc    9540
gccctttgac gttggagtcc acgttcttta atagtggact cttgttccaa actggaacaa    9600
cactcaaccc tatctcggtc tattcttttg atttataagg gattttgccg atttcggcct    9660
attggttaaa aaatgagctg atttaacaaa aatttaacgc gaattaattc tgtggaatgt    9720
gtgtcagtta gggtgtggaa agtccccagg ctccccagca ggcagaagta tgcaaagcat    9780
gcatctcaat tagtcagcaa ccaggtgtgg aaagtcccca ggctccccag caggcagaag    9840
```

```
tatgcaaagc atgcatctca attagtcagc aaccatagtc ccgcccctaa ctccgcccat   9900
cccgcccta  actccgccca gttccgccca ttctccgccc catggctgac taatttttttt  9960
tatttatgca gaggccgagg ccgcctctgc ctctgagcta ttccagaagt agtgaggagg  10020
cttttttgga ggcctaggct tttgcaaaaa gctcccggga gcttgtatat ccattttcgg  10080
atctgatcag cacgtgttga caattaatca tcggcatagt atatcggcat agtataatac  10140
gacaaggtga ggaactaaac catggccaag ttgaccagtg ccgttccggt gctcaccgcg  10200
cgcgacgtcg ccggagcggt cgagttctgg accgaccggc tcgggttctc ccgggacttc  10260
gtggaggacg acttcgccgg tgtggtccgg acgacgtga  ccctgttcat cagcgcggtc  10320
caggaccagg tggtgccgga caacaccctg gcctgggtgt gggtgcgcgg cctggacgag  10380
ctgtacgccg agtggtcgga ggtcgtgtcc acgaacttcc gggacgcctc cgggccggcc  10440
atgaccgaga tcggcgagca gccgtggggg cgggagttcg ccctgcgcga cccggccggc  10500
aactgcgtgc acttcgtggc cgaggagcag gactgacacg tgctacgaga tttcgattcc  10560
accgccgcct tctatgaaag gttgggcttc ggaatcgttt ccgggacgc  cggctggatg  10620
atcctccagc gcggggatct catgctggag ttcttcgccc accccaactt gtttattgca  10680
gcttataatg gttacaaata aagcaatagc atcacaaatt tcacaaataa agcatttttt  10740
tcactgcatt ctagttgtgg tttgtccaaa ctcatcaatg tatcttatca tgtctgtata  10800
ccgtcgacct ctagctagag cttggcgtaa tcatggtcat agctgtttcc tgtgtgaaat  10860
tgttatccgc tcacaattcc acacaacata cgagccggaa gcataaagtg taaagcctgg  10920
ggtgcctaat gagtgagcta actcacatta attgcgttgc gctcactgcc cgcttttcag  10980
tcgggaaacc tgtcgtgcca gctgcattaa tgaatcggcc aacgcgcggg gagaggcggt  11040
ttgcgtattg ggcgctcttc cgcttcctcg ctcactgact cgctgcgctc ggtcgttcgg  11100
ctgcggcgag cggtatcagc tcactcaaag gcggtaatac ggttatccac agaatcaggg  11160
gataacgcag gaaagaacat gtgagcaaaa ggccagcaaa aggccaggaa ccgtaaaaag  11220
gccgcgttgc tggcgttttt ccataggctc cgcccccctg acgagcatca caaaaatcga  11280
cgctcaagtc agaggtggcg aaacccgaca ggactataaa gataccaggc gtttccccct  11340
ggaagctccc tcgtgcgctc tcctgttccg accctgccgc ttaccggata cctgtccgcc  11400
tttctccctt cgggaagcgt ggcgctttct catagctcac gctgtaggta tctcagttcg  11460
gtgtaggtcg ttcgctccaa gctgggctgt gtgcacgaac cccccgttca gcccgaccgc  11520
tgcgccttat ccggtaacta tcgtcttgag tccaacccgg taagacacga cttatcgcca  11580
ctggcagcag ccactggtaa caggattagc agagcgaggt atgtaggcgg tgctacagag  11640
ttcttgaagt ggtggcctaa ctacggctac actagaagaa cagtatttgg tatctgcgct  11700
ctgctgaagc cagttacctt cggaaaaaga gttggtagct cttgatccgg caaacaaacc  11760
accgctggta gcggtggttt ttttgtttgc aagcagcaga ttacgcgcag aaaaaaagga  11820
tctcaagaag atcctttgat cttttctacg gggtctgacg ctcagtggaa cgaaaactca  11880
cgttaaggga ttttggtcat gagattatca aaaaggatct tcacctagat ccttttaaat  11940
taaaaatgaa gttttaaatc aatctaaagt atatatgagt aaacttggtc tgacagttac  12000
caatgcttaa tcagtgaggc acctatctca gcgatctgtc tatttcgttc atccatagtt  12060
gcctgactcc ccgtcgtgta gataactacg atacgggagg gcttaccatc tggccccagt  12120
gctgcaatga taccgcgaga cccacgctca ccggctccag atttatcagc aataaaccag  12180
```

```
ccagccggaa gggccgagcg cagaagtggt cctgcaactt tatccgcctc catccagtct    12240
attaattgtt gccgggaagc tagagtaagt agttcgccag ttaatagttt gcgcaacgtt    12300
gttgccattg ctacaggcat cgtggtgtca cgctcgtcgt ttggtatggc ttcattcagc    12360
tccggttccc aacgatcaag gcgagttaca tgatccccca tgttgtgcaa aaaagcggtt    12420
agctccttcg gtcctccgat cgttgtcaga agtaagttgg ccgcagtgtt atcactcatg    12480
gttatggcag cactgcataa ttctcttact gtcatgccat ccgtaagatg cttttctgtg    12540
actggtgagt actcaaccaa gtcattctga gaatagtgta tgcggcgacc gagttgctct    12600
tgcccggcgt caatacggga taataccgcg ccacatagca gaactttaaa agtgctcatc    12660
attggaaaac gttcttcggg gcgaaaactc tcaaggatct taccgctgtt gagatccagt    12720
tcgatgtaac ccactcgtgc acccaactga tcttcagcat cttttacttt caccagcgtt    12780
tctgggtgag caaaaacagg aaggcaaaat gccgcaaaaa agggaataag ggcgacacgg    12840
aaatgttgaa tactcatact cttccttttt caatattatt gaagcattta tcagggttat    12900
tgtctcatga gcggatacat atttgaatgt atttagaaaa ataaacaaat aggggttccg    12960
cgcacatttc cccgaaaagt gccacctgac                                    12990
```